United States Patent
Hillel et al.

(10) Patent No.: US 12,204,474 B2
(45) Date of Patent: Jan. 21, 2025

(54) COMMUNICATIONS FOR COMPUTATIONAL MEMORY MODULES

(71) Applicant: NEUROBLADE LTD., Tel Aviv (IL)

(72) Inventors: Eliad Hillel, Herzliya (IL); Gal Dayan, Hod Hasharon (IL); Elad Sity, Tel Aviv (IL)

(73) Assignee: NeuroBlade Ltd., Tel-Aviv (IL)

( * ) Notice: Subject to any disclaimer, the term of this patent is extended or adjusted under 35 U.S.C. 154(b) by 0 days.

(21) Appl. No.: 18/297,172

(22) Filed: Apr. 7, 2023

(65) Prior Publication Data

US 2023/0244618 A1   Aug. 3, 2023

Related U.S. Application Data

(63) Continuation of application No. PCT/US2021/055472, filed on Oct. 18, 2021.

(Continued)

(51) Int. Cl.
*G06F 13/16* (2006.01)
*G06F 9/50* (2006.01)
(Continued)

(52) U.S. Cl.
CPC ........ *G06F 13/1694* (2013.01); *G06F 9/5016* (2013.01); *G06F 11/1044* (2013.01);
(Continued)

(58) Field of Classification Search
CPC .............. G06F 13/1694; G06F 9/5016; G06F 11/1044; G06F 13/1668; G06F 13/404; G06F 17/16
(Continued)

(56) References Cited

U.S. PATENT DOCUMENTS 9,432,298 B1 *  8/2016  Smith ................. H04L 49/9057
10,956,342 B1 *  3/2021  MacLaren ........... G06F 12/1425
(Continued)

FOREIGN PATENT DOCUMENTS

| WO | 2019/025862 A1 | 2/2019 |
| WO | 2019/025864 A2 | 2/2019 |
| WO | 2020/049363 A2 | 3/2020 |

OTHER PUBLICATIONS

Intel 440BX AGPset: 92443BX Host Bridge Controller Datasheet, Apr. 1998. (Year: 1998).*

(Continued)

*Primary Examiner* — Than Nguyen
(74) *Attorney, Agent, or Firm* — Finnegan, Henderson, Farabow, Garrett & Dunner LLP

(57) ABSTRACT

An information transfer system may include: a master controller (XMC) configured to issue a command in the form of a memory protocol data packet, and wherein the master controller is configured to generate routing information indicating whether the memory protocol data packet is to be processed according to a first protocol or according to a second protocol different from the first protocol. The information transfer system may also include a slave controller (XSC) configured to receive the memory protocol data packet from the master controller, wherein the slave controller is configured to use the routing information to selectively cause the memory protocol data packet to be processed according to the first protocol or according to the second protocol.

20 Claims, 34 Drawing Sheets

Related U.S. Application Data

(60) Provisional application No. 63/230,212, filed on Aug. 6, 2021, provisional application No. 63/198,429, filed on Oct. 16, 2020, provisional application No. 63/198,426, filed on Oct. 16, 2020, provisional application No. 63/093,968, filed on Oct. 20, 2020, provisional application No. 63/092,689, filed on Oct. 16, 2020, provisional application No. 63/092,682, filed on Oct. 16, 2020, provisional application No. 63/092,671, filed on Oct. 16, 2020, provisional application No. 63/092,658, filed on Oct. 16, 2020, provisional application No. 63/092,647, filed on Oct. 16, 2020.

(51) Int. Cl.
  *G06F 11/10* (2006.01)
  *G06F 13/40* (2006.01)
  *G06F 17/16* (2006.01)

(52) U.S. Cl.
  CPC ........ *G06F 13/1668* (2013.01); *G06F 13/404* (2013.01); *G06F 17/16* (2013.01)

(58) Field of Classification Search
  USPC .......................................... 711/105
  See application file for complete search history.

(56) References Cited

U.S. PATENT DOCUMENTS

| | | | |
|---|---|---|---|
| 2008/0235444 A1* | 9/2008 | Gower | G11C 5/04 711/105 |
| 2014/0095665 A1* | 4/2014 | Mathur | H04N 21/44008 709/219 |
| 2020/0242258 A1* | 7/2020 | Smith | H04L 9/3268 |
| 2021/0406165 A1* | 12/2021 | Lindberg | G06F 3/0613 |

OTHER PUBLICATIONS

Communication pursuant to Article 94(3) EPC in counterpart European Application No. 21 810 182.2-1224 dated Jan. 29, 2024 (6 pages).

International Search Report and Written Opinion, dated Feb. 11, 2022, issued in PCT/US2021/055472 (11 pages).

Joint Electron Device Engineering Council (JEDEC) Standard No. 79-4C; DDR SRAM; Jedec Solid State Technology Association; Jan. 2020 (266 pages).

Intel 440BX AGPset: 82443BX Host Bridge/Controller Datasheet; Apr. 1998 (132 pages).

* cited by examiner

| TIME | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| CONTROLLER | POLL | D0 | D1 | D2 | D3 | D4 | D5 | POLL | D6 | D7 | D8 | D9 | D10 | ... |
| USER APP. |  |  |  |  |  |  |  |  | D0 | D1 | D2 | D3 | D4 | ... |

FIG. 14

| TIME | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| CONTROLLER | POLL | D0 | D1 | D2 | D3 | D4 | D5 | POLL | D6 | D7 | D8 | D9 | D10 | ... |
| USER APP. |  |  | D0 | D1 | D2 | D3 | D4 |  | D5 | D6 | D7 | D8 | D9 | ... |

FIG. 15

| TIME | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| CONTROLLER | D0 | D1 | D2 | D3 | D4 | D5 | D6 | CODE | POLL | D7 | D8 | D9 | D10 | ... |
| USER APP. |  | D0 | D1 | D2 | D3 | D4 | D5 |  |  | D6 | D7 | D8 | D9 | ... |

FIG. 16

| TIME | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| CONTROLLER | D0 | D1 | D2 | D3 | D4 | D5 | D6 | CODE | POLL | D7 | D8 | D9 | D10 | ... |
| USER APP. |  | D0 | D1 | D2 | D3 | D4 | D5 | D6 |  | D7 | D8 | D9 | D10 | ... |

FIG. 17

COMMUNICATIONS FOR COMPUTATIONAL MEMORY MODULES

CROSS REFERENCES TO RELATED APPLICATIONS

This application is a continuation of International Application No. PCT/US2021/055472 filed on Oct. 18, 2021, which claims the benefit of priority of U.S. Provisional Patent Application No. 63/198,426, filed on Oct. 16, 2020; U.S. Provisional Patent Application No. 63/198,429, filed on Oct. 16, 2020; U.S. Provisional Patent Application No. 63/230,212, filed 5 on Aug. 6, 2021; U.S. Provisional Patent Application No. 63/092,647, filed on Oct. 16, 2020; U.S. Provisional Patent Application No. 63/092,658, filed on Oct. 16, 2020; U.S. Provisional Patent Application No. 63/092,671, filed on Oct. 16, 2020; U.S. Provisional Patent Application No. 63/092,682, filed on Oct. 16, 2020; U.S. Provisional Patent Application No. 63/092,689, filed on Oct. 16, 2020; and U.S. Provisional Patent Application No. 63/093,968, 10 filed on Oct. 20, 2020; all of which are incorporated herein by reference in their entirety.

BACKGROUND

Technical Field

The present disclosure relates generally to apparatuses for facilitating memory-intensive operations. In particular, the present disclosure relates to memory appliances that include hardware chips comprising both processing elements and dedicated memory banks.

Background Information

As processor speeds and memory sizes both continue to increase, a significant limitation on effective processing speeds is the von Neumann bottleneck. The von Neumann bottleneck results from throughput limitations resulting from conventional computer architecture. In particular, data transfer from memory to the processor is often bottlenecked compared to actual computations undertaken by the processor. Accordingly, the number of clock cycles to read and write from memory increases significantly with memory-intensive processes. These clock cycles result in lower effective processing speeds because reading and writing from memory consumes clock cycles that cannot be used for performing operations on data. Moreover, the computational bandwidth of the processor is generally larger than the bandwidth of the buses that the processor uses to access the memory.

These bottlenecks are particularly pronounced for memory-intensive processes, such as neural network and other machine learning algorithms; database construction, indexing searching, and querying; and other tasks that include more reading and writing operation than data processing operations.

Additionally, the rapid growth in volume and granularity of available digital data has created opportunities to develop machine learning algorithms and has enabled new technologies. However, it has also brought cumbersome challenges to the world of data bases and parallel computing. For example, the rise of social media and the Internet of Things (IoT) creates digital data at a record rate. This new data can be used to create algorithms for a variety of purposes, ranging from new advertising techniques to more precise control methods of industrial processes. However, the new data has been difficult to store, process, analyze and handle.

New data resources can be massive, sometimes in the order of peta- to zettabytes. Moreover, the growth rate of these data resources may exceed data processing capabilities. Therefore, data scientists have turned to parallel data processing techniques, to tackle these challenges. In an effort to increase computation power and handle the massive amount of data, scientists have attempted to create systems and methods capable of parallel intensive computing. But these existing systems and methods have not kept up with the data processing requirements, often because the techniques employed are limited by their demand of additional resources for data management, integration of segregated data, and analysis of the sectioned data.

The present disclosure describes solutions for mitigating or overcoming one or more of the problems set forth above, among other problems in the prior art.

SUMMARY

In an embodiment, an information transfer system may include a master controller (XMC) configured to issue a command in the form of a memory protocol data packet, and wherein the master controller is configured to generate routing information indicating whether the memory protocol data packet is to be processed according to a first protocol or according to a second protocol different from the first protocol. The information transfer system may also include a slave controller (XSC) configured to receive the memory protocol data packet from the master controller, wherein the slave controller is configured to use the routing information to selectively cause the memory protocol data packet to be processed according to the first protocol or according to the second protocol.

In an embodiment, a computational memory system may include a master controller configured to receive a configuration function from a host CPU and convert the received configuration function into one or more lower level configuration functions. The system may also include at least one computational memory chip, wherein the at least one computational memory chip includes a plurality of processor subunits and a plurality of memory banks formed on a common substrate; wherein the master controller is adapted to configure the at least one computational memory chip using the one or more lower level configuration functions.

In an embodiment, a computational memory system may include a controller configured to receive a configuration function from a host CPU. The system may also include at least one computational memory chip, wherein the at least one computational memory chip includes a plurality of processor subunits and a plurality of memory banks formed on a common substrate; wherein the controller is adapted to multicast the configuration function to two or more of the plurality of processor subunits.

In an embodiment, a computational memory system may comprise at least one computational memory chip including one or more processor subunits and one or more memory banks formed on a common substrate. The at least one computational memory chip may be configured to store one or more portions of an embedding table in the one or more memory banks, the embedding table including one or more feature vectors. The one or more processor subunits may be configured to receive a sparse vector indicator from a host external to the at least one computational memory chip and, based on the received sparse vector indicator and the one or more portions of the embedding table, generate one or more vector sums.

In an embodiment, a data processing unit may include a data analysis unit configured to acquire a plurality of data elements from a memory, evaluate each of the plurality of data elements relative to at least one criteria, and generate an output that includes a plurality of validity indicators identifying a first plurality of data elements among the plurality of data elements that validly satisfy the at least one criteria and identifying a second plurality of data elements among the plurality of data elements that do not validly satisfy the criteria. The data processing unit may also include a data packer configured to generate, based on the output of the data analysis unit, a packed data output including the first plurality of data elements and omitting the second plurality of data elements.

In an embodiment, a processor-to-processor data transfer system may include a first processor programmed to: load data from a memory using a memory mapped interface; generate a data packet for transferring at least some of the loaded data via a non-memory mapped stream interface; and send the generated data packet, including at least some of the loaded data, to a second processor.

In an embodiment, a computational memory chip may include a plurality of processor subunits and a plurality of memory banks formed on a common substrate, and wherein each processor subunit among the plurality of processor subunits is associated with one or more dedicated memory banks from among the plurality of memory banks; at least one originating processor subunit among the plurality of processor subunits; at least one consumer processor subunit among the plurality of processor subunits; and a stream interface, wherein the stream interface is configured to transfer to the at least one consumer processor subunit data generated by the at least one originating processor subunit.

In an embodiment, a computational memory system is disclosed. The system may comprise: at least one computational memory chip including at least one processor subunit and at least one memory bank formed on a common substrate; and a data invalidity detector configured to receive a sequence of data units and invalidity metadata relating to the sequence of data units, and wherein the data invalidity detector is further configured to generate an invalidity bitmap associated with the sequence of data units based on the received invalidity metadata, and append the invalidity bitmap to the sequence of data units to provide a mapped data segment to be stored in the at least one memory bank of the at least one computational memory chip.

In an embodiment, a method of storing a sequence of data units in one or more of a plurality of memory banks may comprise: receiving, using a data invalidity detector, the sequence of data units and invalidity metadata relating to the sequence of data units; generating, using the data invalidity detector, an invalidity bitmap associated with the sequence of data units based on the received invalidity metadata; modifying the sequence of data units by appending the invalidity bitmap to the sequence of data units to provide a mapped data segment; and storing the modified sequence of data units in the one or more memory banks of at least one computational memory chip.

In an embodiment, a non-transitory computer readable medium may store instructions executable by at least one processor to cause the at least one processor to perform a method. The method may comprise receiving a sequence of data units and invalidity metadata relating to the sequence of data units; generating an invalidity bitmap associated with the sequence of data units based on the received invalidity metadata; and appending the invalidity bitmap to the sequence of data units to provide a mapped data segment to be stored in at least one memory bank of at least one computational memory chip.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 14-17 provide diagrammatic representations of error communications, according to exemplary disclosed embodiments.

DETAILED DESCRIPTION

Figure 1:
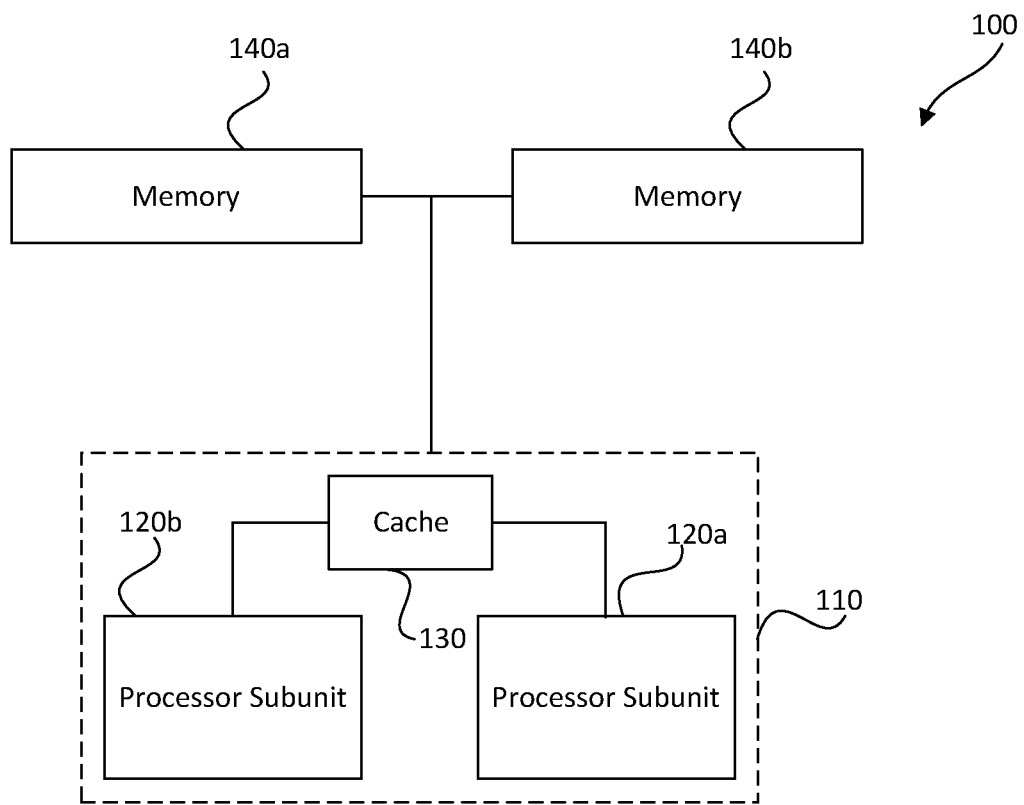
FIG. 1 is a diagrammatic representation of a central processing unit (CPU).

The following detailed description refers to the accompanying drawings. Wherever convenient, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Processor Architecture

As used throughout this disclosure, the term "hardware chip" refers to a semiconductor wafer (such as silicon or the like) on which one or more circuit elements (such as transistors, capacitors, resistors, and/or the like) are formed. The circuit elements may form processing elements or memory elements. A "processing element" refers to one or more hardware-based logic circuit elements that, together, perform at least one logic function (such as an arithmetic function, a logic gate, other Boolean operations, or the like). A processing element may be a general-purpose processing element (such as a configurable plurality of transistors) or a special-purpose processing element (such as a particular logic gate or a plurality of circuit elements designed to perform a particular logic function). A "memory element" refers to one or more circuit elements that can be used to store data. A "memory element" may also be referred to as a "memory cell." A memory element may be dynamic (such that electrical refreshes are required to maintain the data store), static (such that data persists for at least some time after power loss), or non-volatile memories.

One or more processing elements may form a processor subunit. A "processor subunit" may comprise a smallest grouping of processing elements (e.g., logic circuitry) that may execute at least one task or instructions (e.g., of a processor instruction set). For example, a processor subunit may comprise one or more general-purpose processing elements configured to execute instructions together, one or more general-purpose processing elements paired with one or more special-purpose processing elements configured to execute instructions in a complementary fashion, or the like. The processor subunits may be arranged on a substrate (e.g., a wafer) in an array. Although the "array" may comprise a rectangular shape, any arrangement of the subunits in the array may be formed on the substrate.

Memory elements may be joined to form memory banks. For example, a memory bank may comprise one or more lines of memory elements linked along at least one wire (or other conductive connection). Furthermore, the memory elements may be linked along at least one addition wire in another direction. For example, the memory elements may be arranged along wordlines and bitlines, as explained below. Although the memory bank may comprise lines, any arrangement of the elements in the bank may be used to form the bank on the substrate. Moreover, one or more banks may be electrically joined to at least one memory controller to form a memory array. Although the memory array may comprise a rectangular arrangement of the banks, any arrangement of the banks in the array may be formed on the substrate.

One or more processing elements (resources) paired together with one or more memory elements (resources) formed on a common substrate of a hardware chip may be referred to as a "memory processing module" (MPM), a "memory processing element," and/or "computational memory." The processing and memory elements of a memory processing module are fabricated on a common substrate, e.g., as an integrated circuit, and the processing elements may be spatially distributed among the memory elements. In a memory processing module, the processing elements can process data stored in associated local memory elements. The memory processing module may include other elements including, for example, at least one controller. A plurality of memory processing modules may be combined and manufactured on the same substrate to form a "memory processing chip."

A legacy controller (also referred to as memory controller) refers to a controller that is used to interface with memory resources such as memory chips using legacy memory interface protocols for reading and writing to and from the memory chips. A DDR family controller is an example of a legacy controller.

A memory processing module (MPM) unaware memory controller refers to a controller that communicates with an MPM without being aware of the processing resources of the MPM. In other words, the communication may occur independent from and without information relating to the processing resources of the MPM. A legacy controller or a memory controller is an example of such an unaware memory controller. In the context of this document, the terms "legacy controller," "MPM unaware controller," and "DDR4 controller" are used in an interchangeable manner. DDR4 is an example of a memory interface standard or protocol.

An MPM controller is a controller that is configured to access and/or communicate with and/or configure and/or command at least some of the processing resources and the memory resources of the MPM. In the context of this document, an MPM controller is referred to as a "master controller" (MC, XMC).

As further used throughout this disclose, a "bus" refers to any communicative connection between elements of a substrate. For example, a wire or a line (forming an electrical connection), an optical fiber (forming an optical connection), or any other connection conducting communications between components may be referred to as a "bus."

Conventional processors pair general-purpose logic circuits with shared memories. The shared memories may store both instruction sets for execution by the logic circuits as well as data used for and resulting from execution of the instruction sets. As described below, some conventional processors use a caching system to reduce delays in performing pulls from the shared memory; however, conventional caching systems remain shared. Conventional processors include central processing units (CPUs), graphics processing units (GPUs), various application-specific integrated circuits (ASICs), or the like. FIG. 1 shows an example of a CPU, and FIG. 2 shows an example of a GPU.

As shown in FIG. 1, a CPU 100 may comprise a processing unit 110 that includes one or more processor subunits, such as processor subunit 120*a* and processor subunit 120*b*. Although not depicted in FIG. 1, each processor subunit may comprise a plurality of processing elements. Moreover, the processing unit 110 may include one or more levels of on-chip cache. Such cache elements are generally formed on the same semiconductor die as processing unit 110 rather than being connected to processor subunits 120*a* and 120*b* via one or more buses formed in the substrate containing processor subunits 120*a* and 120*b* and the cache elements. An arrangement directly on the same die, rather than being connected via buses, is common for both first-level (L1) and second-level (L2) caches in conventional processors. Alternatively, in older processors, L2 caches were shared amongst processor subunits using back-side buses between the subunits and the L2 caches. Back-side buses are generally larger than front-side buses, described below. Accordingly, because cache is to be shared with all processor subunits on the die, cache 130 may be formed on the same die as processor subunits 120*a* and 120*b* or communicatively coupled to processor subunits 120*a* and 120*b* via one or more back-side buses. In both embodiments without buses (e.g., cache is formed directly on-die) as well as embodiments using back-side buses, the caches are shared between processor subunits of the CPU.

Moreover, processing unit 110 communicates with shared memory 140*a* and memory 140*b*. For example, memories 140*a* and 140*b* may represent memory banks of shared dynamic random access memory (DRAM). Although depicted with two banks, most conventional memory chips include between eight and sixteen memory banks. Accordingly, processor subunits 120*a* and 120*b* may use shared memories 140*a* and 140*b* to store data that is then operated upon by processor subunits 120*a* and 120*b*. This arrangement, however, results in the buses between memories 140*a* and 140*b* and processing unit 110 acting as a bottleneck when the clock speeds of processing unit 110 exceed data transfer speeds of the buses. This is generally true for conventional processors, resulting in lower effective processing speeds than the stated processing speeds based on clock rate and number of transistors.

Figure 2:
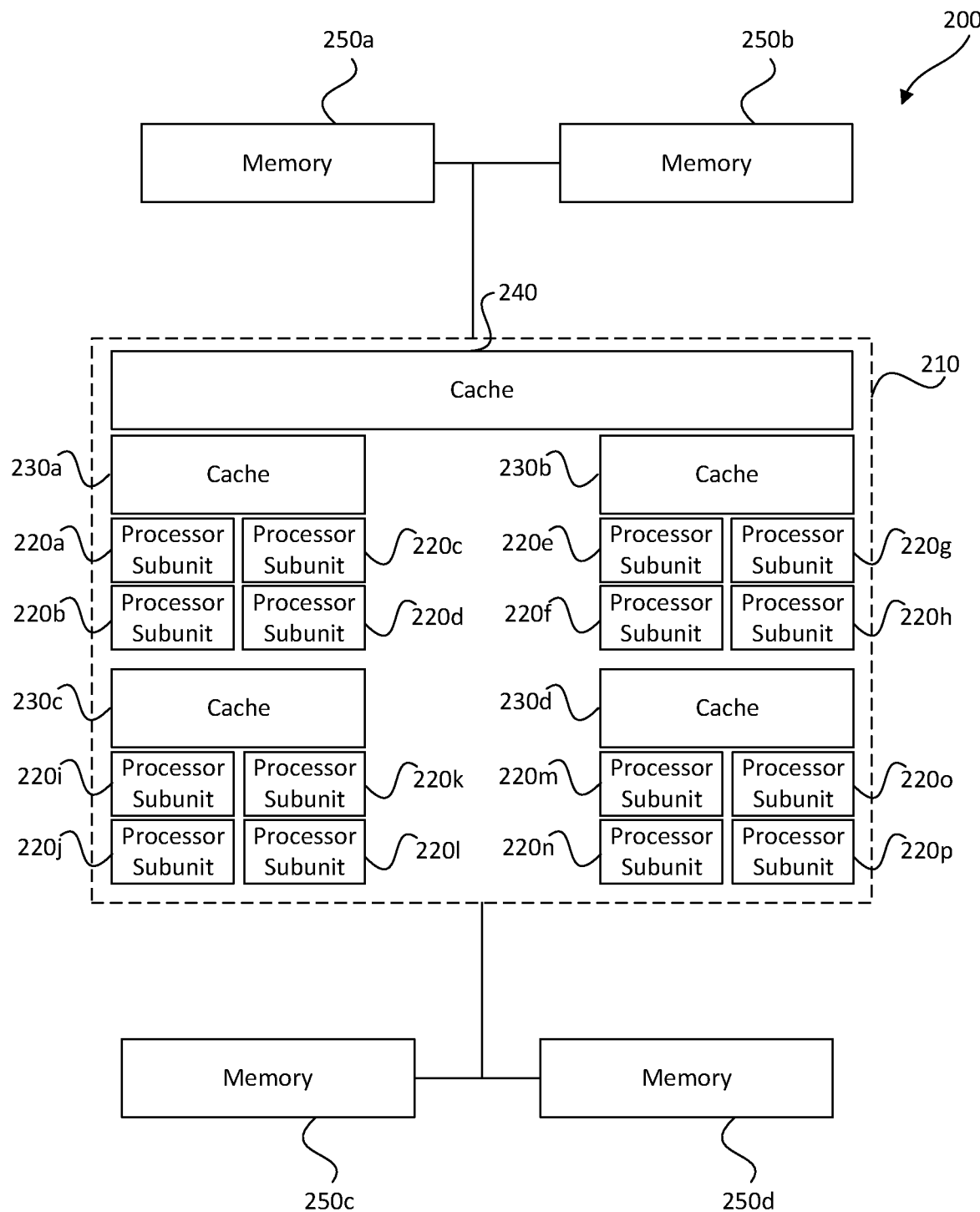
FIG. 2 is a diagrammatic representation of a graphics processing unit (GPU).

As shown in FIG. 2, similar deficiencies persist in GPUs. A GPU 200 may comprise a processing unit 210 that includes one or more processor subunits (e.g., subunits 220*a*, 220*b*, 220*c*, 220*d*, 220*e*, 220*f*, 220*g*, 220*h*, 220*i*, 220*j*, 220*k*, 220*l*, 220*m*, 220*n*, 220*o*, and 220*p*). Moreover, the processing unit 210 may include one or more levels of on-chip cache and/or register files. Such cache elements are generally formed on the same semiconductor die as processing unit 210. Indeed, in the example of FIG. 2, cache 210 is formed on the same die as processing unit 210 and shared amongst all of the processor subunits, while caches 230*a*, 230*b*, 230*c*, and 230*d* are formed on a subset of the processor subunits, respectively, and dedicated thereto.

Moreover, processing unit 210 communicates with shared memories 250*a*, 250*b*, 250*c*, and 250*d*. For example, memories 250*a*, 250*b*, 250*c*, and 250*d* may represent memory banks of shared DRAM. Accordingly, the processor subunits of processing unit 210 may use shared memories 250*a*, 250*b*, 250*c*, and 250*d* to store data that is then operated upon by the processor subunits. This arrangement, however, results in the buses between memories 250*a*, 250*b*, 250*c*, and 250*d* and processing unit 210 acting as a bottleneck, similar to the bottleneck described above for CPUs.

Figure 3:
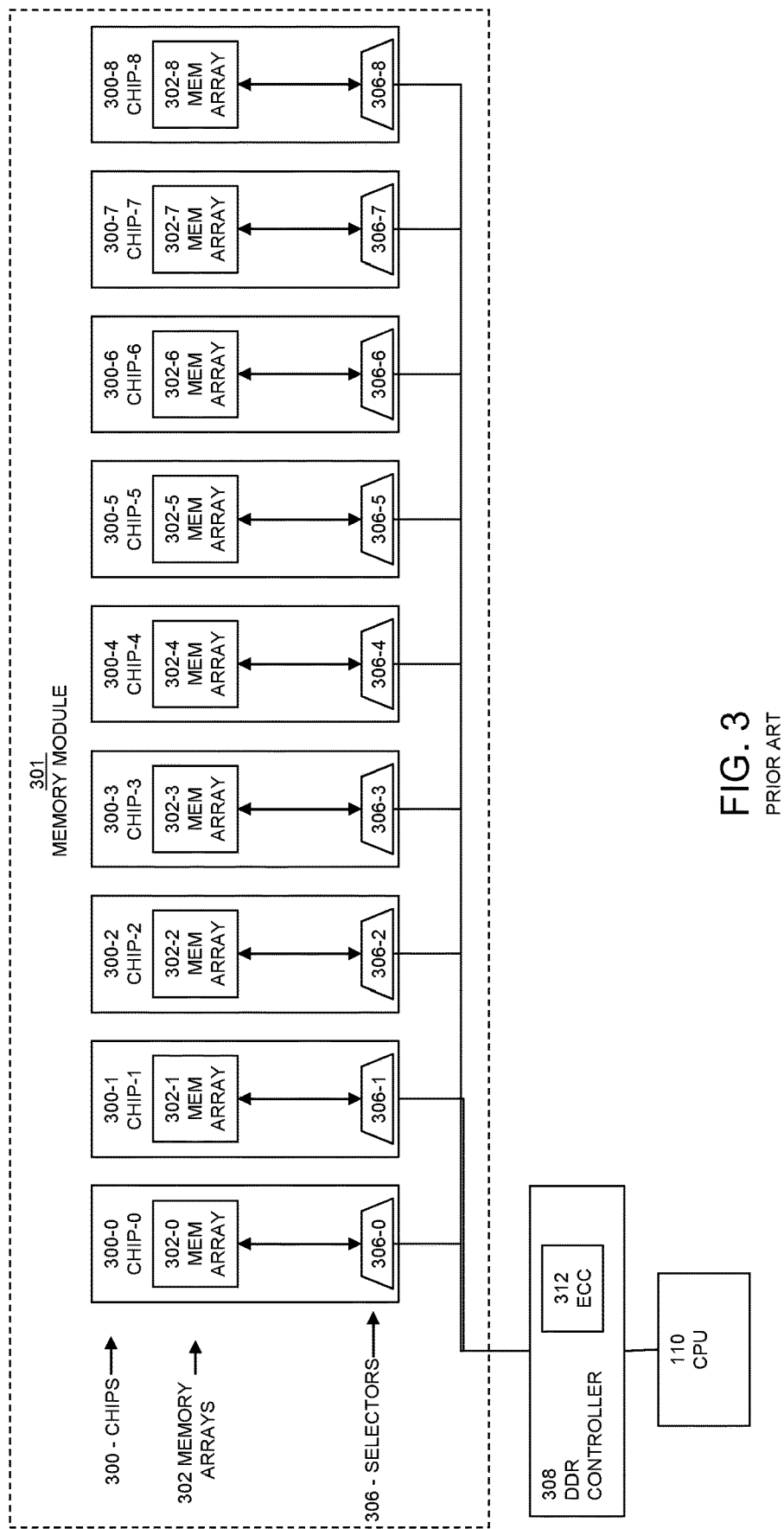
FIG. 3 provides a diagrammatic representation of a conventional computer memory with an error correction code (ECC) capability.

FIG. 3 provides a diagrammatic representation of a conventional computer memory with an error correction code (ECC) capability. As shown in FIG. 3, a memory module 301 includes an array of memory chips 300, shown as nine chips (i.e., chip-0, 100-0 through chip-8, 100-8, respectively). Each memory chip has respective memory arrays 302 (e.g., elements labelled 302-0 through 302-8) and corresponding address selectors 306 (shown as respective selector-0 106-0 through selector-8 106-8). Controller 308 is shown as a DDR controller. The DDR controller 308 is operationally connected to a CPU (processing unit) 110, receiving data from the CPU 110 for writing to memory, and retrieving data from the memory to send to the CPU 110. The DDR controller 308 also includes an error correction code (ECC) module that generates error correction codes that may be used in identifying and correcting errors in data transmissions between CPU 110 and components of memory module 301.

Figure 4:
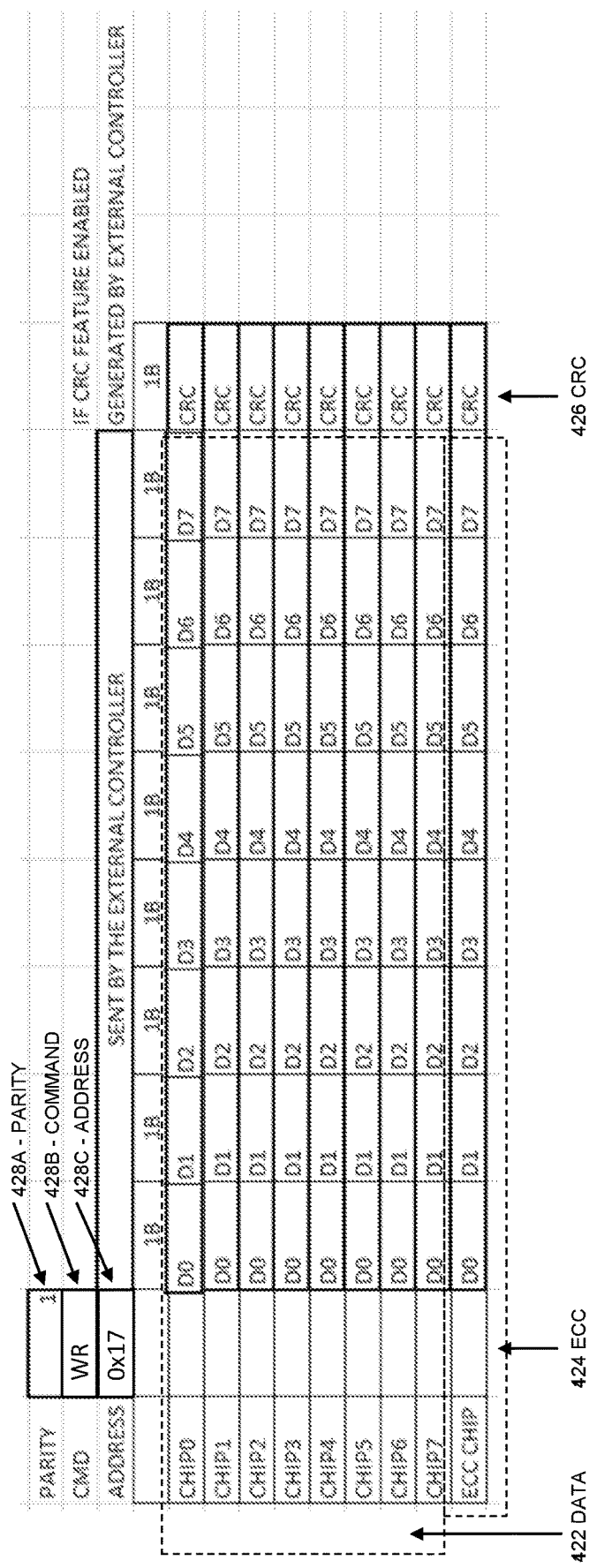
FIG. 4 provides a diagrammatic representation of a process for writing data to a conventional memory module.

FIG. 4 provides a diagrammatic representation of a process for writing data to the conventional memory module 301. Specifically, the process 420 of writing to the memory module 301 can include writing data 422 in bursts, each burst including 8 bytes for each chip being written to (in the current example, 8 of the memory chips 300, including chip-0, 100-0 to chip-7, 100-7). In a conventional implementation, an original error correction code (ECC) 424 is calculated in the ECC module 312 in the DDR controller 308. The ECC 424 is calculated across each of the chip's 8 bytes of data, resulting in an additional, original, 1-byte ECC for each byte of the burst across the 8 chips. The 8-byte (8×1-byte) ECC is written with the burst to a ninth memory chip serving as an ECC chip in the memory module 301, such as chip-8, 100-8.

The memory module 301 can activate a cyclic redundancy check (CRC) check for each chip's burst of data, to protect the chip interface. A cyclic redundancy check is an error-detecting code commonly used in digital networks and storage devices to detect accidental changes to raw data. Blocks of data get a short check value attached, based on the remainder of a polynomial division of the block's contents. In this case, an original CRC 426 is calculated by the DDR controller 308 over the 8 bytes of data 422 in a chip's burst (one row in the current figure) and sent with each data burst (each row/to a corresponding chip) as a ninth byte in the chip's burst transmission. When each chip 300 receives data, each chip 300 calculates a new CRC over the data and compares the new CRC to the received original CRC. If the CRCs match, the received data is written to the chip's memory 302. If the CRCs do not match, the received data is discarded, and an alert signal is activated. A conventional alert signal includes an ALERT_N signal.

Additionally, when writing data to a memory module 301, an original parity 428A is normally calculated over the (exemplary) transmitted command 428B and address 428C. Each chip 300 receives the command 428B and address 428C, calculates a new parity, and compares the original parity to the new parity. If the parities match, the received command 428B and address 428C are used to write the corresponding data 422 to the memory module 301. If the parities do not match, the received data 422 is discarded, and an alert signal (e.g., ALERT_N) is activated.

Figure 5:
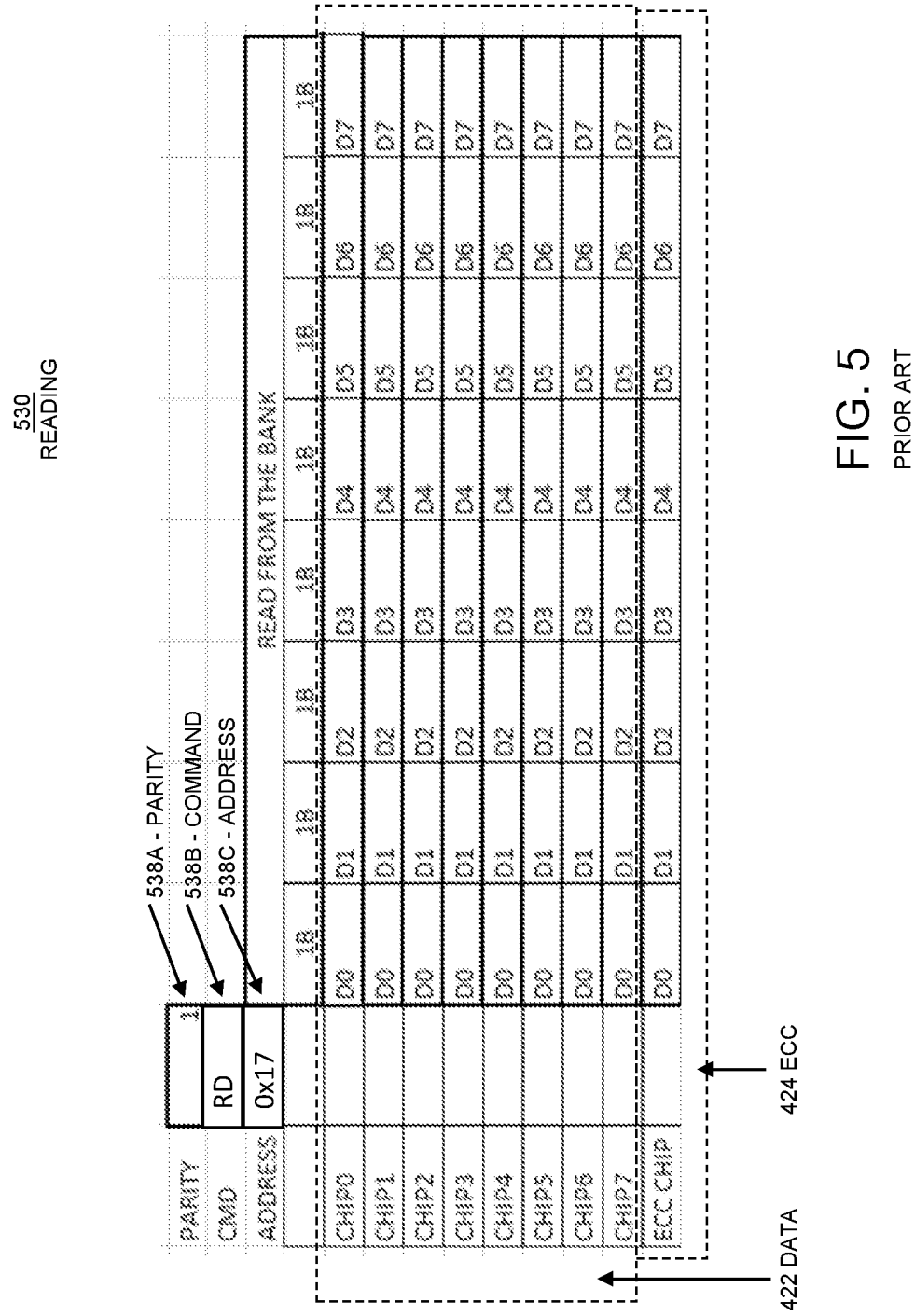
FIG. 5 provides a diagrammatic representation of a conventional process 130 for reading from memory.

FIG. 5 provides a diagrammatic representation of a conventional process 530 for reading from memory. When reading from the memory module 301, the original ECC 424 is read from the memory and sent with the data 422 to the ECC module 312. The ECC module 312 calculates a new ECC across each of the chips' 8 bytes of data. The new ECC is compared to the original ECC to determine (detect, correct) if an error has occurred in the data (transmission, storage). In addition, when reading data from memory module 301, an original parity 538A is normally calculated over the (exemplary) transmitted command 538B and address 538C (transmitted to the memory module 301 to tell the memory module 301 to read and from which address to read). Each chip 300 receives the command 538B and address 538C, calculates a new parity, and compares the original parity to the new parity. If the parities match, the received command 538B and address 538C are used to read the corresponding data 422 from the memory module 101. If the parities do not match, the received command 538B and address 538C are discarded and an alert signal (e.g., ALERT_N) is activated.

Overview of Disclosed Memory Processing Modules and Associated Appliances

Figure 6:
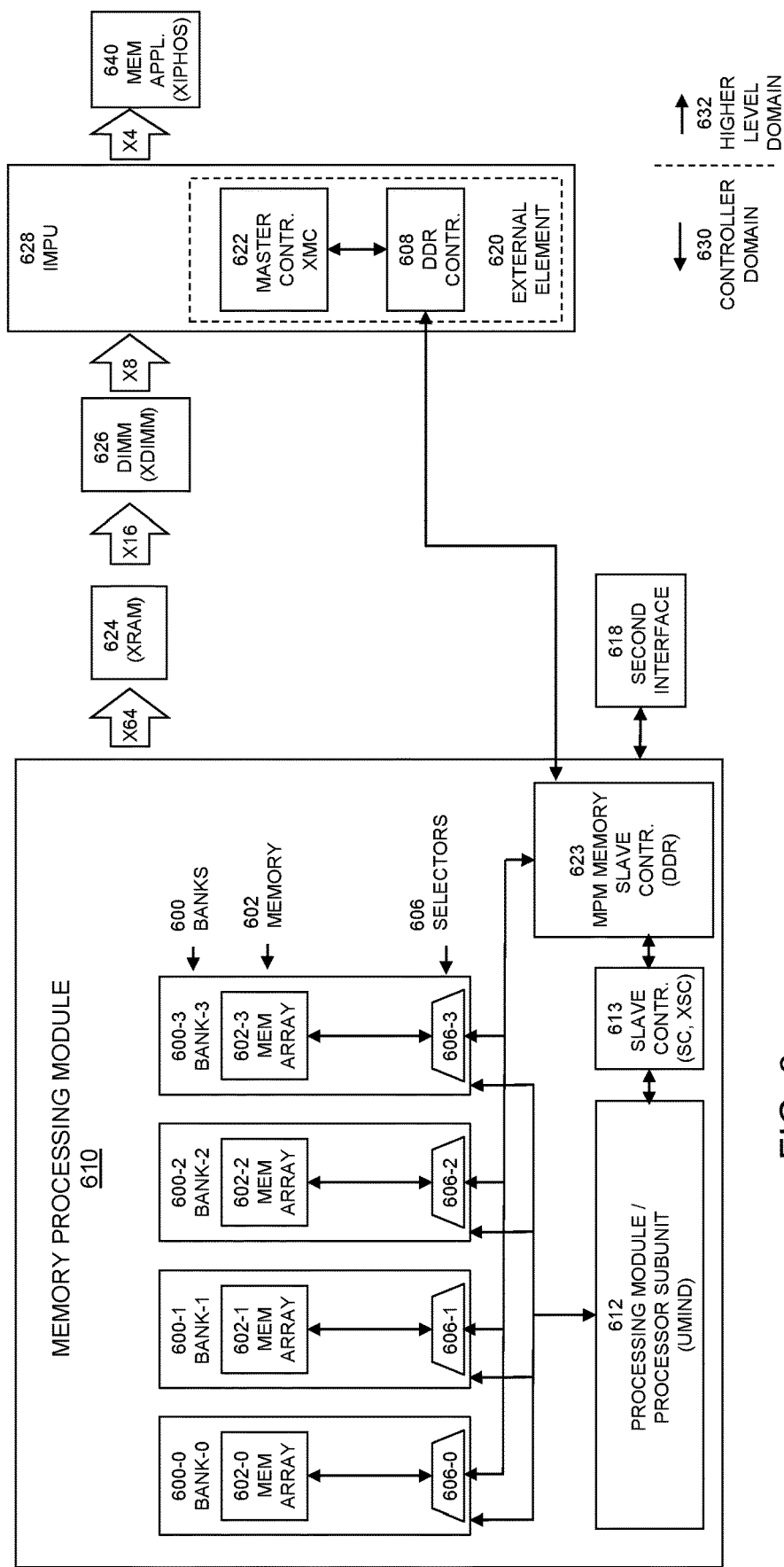
FIG. 6 is a diagrammatic representation of an architecture including the disclosed memory processing modules.

FIG. 6 is a diagrammatic representation of an architecture including the disclosed memory processing modules. For example, a memory processing module (MPM) 610, as described above, may be implemented on a chip to include at least one processing element (e.g., a processor subunit) local to associated memory elements formed on the chip. In some cases, an MPP 610 may include a plurality of processing elements spatially distributed on a common substrate among their associated memory elements within the MPM 610.

In the example of FIG. 6, the memory processing module 610 includes a processing module 612 coupled with four, dedicated memory banks 600 (shown as respective bank-0, 600-0 through bank-3, 600-3). Each bank includes a corresponding memory array 602 (shown as respective memory array-0, 602-0 through memory array-3, 602-3) along with selectors 606 (shown as selector-0 606-0 to selector-3 606-3). The memory arrays 602 may include memory elements similar to those described above relative to memory arrays 302. Local processing, including arithmetic operations, other logic-based operations, etc. can be performed by processing module 612 (also referred to as a "processing subunit," "processor subunit," "logic," "micro mind," or "UMIND") using data stored in the memory arrays 602, or provided from other sources, for example, from other of the processing modules 612. In some cases, one or more processing modules 612 of one or more MPMs 610 may include at least one arithmetic logic units (ALU). Processing module 612 is operationally connected to each of the memory banks 600.

A DDR controller 608 may also be operationally connected to each of the memory banks 600, e.g., via an MPM slave controller 623. Alternatively and/or in addition to the DDR controller 608, a master controller 622 can be operationally connected to each of the memory banks 600, e.g., via the DDR controller 608 and memory controller 623. The DDR controller 608 and the master controller 622 may be implemented in an external element 620. Additionally and/or alternatively, a second memory interface 618 may be provided for operational communication with the MPM 610.

While the MPM 610 of FIG. 6 pairs one processing module 612 with four, dedicated memory banks 600, more or fewer memory banks can be paired with a corresponding processing module to provide a memory processing module. For example, in some cases, the processing module 612 of MPM 610 may be paired with a single, dedicated memory bank 600. In other cases, the processing module 612 of MPM 610 may be paired with two or more dedicated memory banks 600, four or more dedicated memory banks 600, etc. Various MPMs 610, including those formed together on a common substrate or chip, may include different numbers of memory banks relative to one another. In some cases, an MPM 610 may include one memory bank 600. In other cases, an MPM may include two, four, eight, sixteen, or more memory banks 600. As a result, the number of memory banks 600 per processing module 612 may be the same throughout an entire MPM 610 or across MPMs included in an XRAM chip 624. Alternatively, at least one processing module 612 may control more memory banks 600 than another processing module 612 included within an MPM 610 or within an XRAM chip 624.

Each MPM 610 may include one processing module 612 or more than one processing module 610. In the example of FIG. 6, one processing module 612 is associated with four dedicated memory banks 600. In other cases, however, one or more memory banks of an MPM may be associated with two or more processing modules 612.

Each memory bank 600 may be configured with any suitable number of memory arrays 602. In some cases, a bank 600 may include only a single array. In other cases, a bank 600 may include two or more memory arrays 602, four or more memory arrays 602, etc. Each of the banks 600 may have the same number of memory arrays 602. Alternatively, different banks 600 may have different numbers of memory arrays 602.

Various numbers of MPMs 610 may be formed together on a single hardware chip. In some cases, a hardware chip may include just one MPM 610. In other cases, however, a single hardware chip may include two, four, eight, sixteen, 32, 64, etc. MPMs 610. In the particular example represented by FIG. 6, 64 MPMs 610 are combined together on a common substrate of a hardware chip to provide an XRAM chip 624, which may also be referred to as a memory processing chip or a computational memory chip. In some embodiments, each MPM 610 may include a slave controller 613 (e.g., an eXtreme/Xele or XSC slave controller (SC)) configured to communicate with a DDR controller 608 (e.g., via MPM slave controller 623), and/or a master controller 622. Alternately, fewer than all of the MPMs onboard an XRAM chip 624 may include a slave controller 613. In some cases, multiple MPMs (e.g., 64 MPMs) 610 may share a single slave controller 613 disposed on XRAM chip 624. Slave controller 613 can communicate data, commands, information, etc. to one or more processing modules 612 on XRAM chip 624 to cause various operations to be performed by the one or more processing modules 612.

One or more XRAM chips 624, typically a plurality of XRAM chips 624, such as sixteen XRAM chips 624, may be configured together to provide a dual in-line memory module (DIMM) 626. Traditional DIMMs may be referred to as a RAM stick, which typically includes eight or nine, etc., dynamic random-access memory chips (integrated circuits) constructed as/on a printed circuit board (PCB) and having a 64-bit data path. In contrast to traditional memory, the disclosed memory processing modules 610 include at least one computational component (e.g., processing module 612) coupled with local memory elements (e.g., memory banks 600). As multiple MPMs may be included on an XRAM chip 624, each XRAM chip 624 may include a plurality of processing modules 612 spatially distributed among associated memory banks 600. To acknowledge the inclusion of computational capabilities (together with memory) within the XRAM chip 624, each DIMM 626 including one or more XRAM chips (e.g., sixteen XRAM chips, as in the FIG. 6 example) on a single PCB may be referred to as an XDIMM (or eXtremeDIMM or XeleDIMM). Each XDIMM 626 may include any number of XRAM chips 624, and each XDIMM 624 may have the same or a different number of XRAM chips 624 as other XDIMMs 626. In the FIG. 6 example, each XDIMM 626 includes sixteen XRAM chips 624.

As shown in FIG. 6, the architecture may further include one or more memory processing units, such as an intense memory processing unit (IMPU) 628. Each IMPU 628 may include one or more XDIMMs 626. In the FIG. 6 example, each IMPU 628 includes four XDIMMs 626. In other cases, each IMPU 628 may include the same or a different number of XDIMMs as other IMPUs. The one or more XDIMMs included in IMPU 628 can be packaged together with or otherwise integrated with one or more DDR controllers 608 and/or one or more master controllers 622. For example, in some cases, each XDIMM included in IMPU 628 may include a dedicated DDR controller 608 and/or a dedicated master controller 622. In other cases, multiple XDIMMs included in IMPU 628 may share a DDR controller 608 and/or a master controller 622. In one particular example, IMPU 628 includes four XDIMMs 626 along with four master controllers 622 (each master controller 622 including a DDR controller 608), where each of the master controllers 622 is configured to control one associated XDIMM 626, including the MPMs 610 of the XRAM chips 624 included in the associated XDIMM 626.

The DDR controller 608 and the master controller 622 are examples of controllers in a controller domain 630. A higher level domain 632 may contain one or more additional devices, user applications, host computers, other devices, protocol layer entities, and the like. The controller domain 630 and related features are described in the sections below. In a case where multiple controllers and/or multiple levels of controllers are used, the controller domain 630 may serve as at least a portion of a multi-layered module domain, which is also further described in the sections below.

In the architecture represented by FIG. 6, one or more IMPUs 628 may be used to provide a memory appliance 640, which may be referred to as an XIPHOS appliance. In the example of FIG. 6, memory appliance 640 includes four IMPUs 628.

The location of processing elements 612 among memory banks 600 within the XRAM chips 624 (which are incorporated into XDIMMs 626 that are incorporated into IMPUs 628 that are incorporated into memory appliance 640) may significantly relieve the bottlenecks associated with CPUs, GPUs, and other conventional processors that operate using a shared memory. For example, a processor subunit 612 may be tasked to perform a series of instructions using data stored in memory banks 600. The proximity of the processing subunit 612 to the memory banks 600 can significantly reduce the time required to perform the prescribed instructions using the relevant data.

Figure 7:
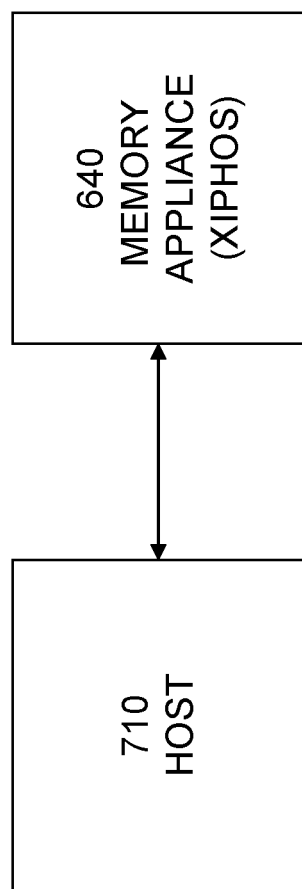
FIG. 7 provides a diagrammatic representation of a host and a memory appliance according to exemplary disclosed embodiments.

As shown in FIG. 7, a host 710 may provide instructions, data, and/or other input to memory appliance 640 and read output from the same. Rather than requiring the host to access a shared memory and perform calculations/functions relative to data retrieved from the shared memory, in the disclosed embodiments, the memory appliance 640 can perform the processing associated with a received input from host 710 within the memory appliance (e.g., within processing modules 612 of one or more MPMs 610 of one or more XRAM chips 624 of one or more XDIMMs 626 of one or more IMPUs). Such functionality is made possible by the distribution of processing modules 612 among and on the same hardware chips as the memory banks 600 where relevant data needed to perform various calculations/functions/etc. is stored.

The architecture described in FIG. 6 may be configured for execution of code. For example, each processor subunit 612 may individually execute code (defining a set of instructions) apart from other processor subunits in an XRAM chip 624 within memory appliance 640. Accordingly, rather than relying on an operating system to manage multithreading or using multitasking (which is concurrency rather than parallelism), the XRAM chips of the present disclosure may allow for processor subunits to operate fully in parallel.

In addition to a fully parallel implementation, at least some of the instructions assigned to each processor subunit may be overlapping. For example, a plurality of processor subunits 612 on an XRAM chip 624 (or within an XDIMM 626 or IMPU 628) may execute overlapping instructions as, for example, an implementation of an operating system or other management software, while executing non-overlapping instructions in order to perform parallel tasks within the context of the operating system or other management software.

For purposes of various structures discussed in more detail below, the Joint Electron Device Engineering Council (JEDEC) Standard No. 79-4C defines the DDR4 SDRAM specification, including features, functionalities, AC and DC characteristics, packages, and ball/signal assignments. The latest version at the time of this application is January 2020, available from JEDEC Solid State Technology Association, 3103 North 10th Street, Suite 240 South, Arlington, VA 22201-2107, www.jedec.org, and is incorporated by reference in its entirety herein.

The DDR4 "ALERT_n" is an input/output pin and signal having multiple functions such as CRC error flag, Command and Address Parity error, flag as output signal. If there is error in CRC, then ALERT_n goes LOW for the period time interval and goes back HIGH. If there is error in Command Address Parity Check, then ALERT_n goes LOW for relatively long period until ongoing SDRAM internal recovery transaction is complete. During Connectivity Test mode this pin functions as an input. (JEDEC 9-4C page 6).

Figure 8:
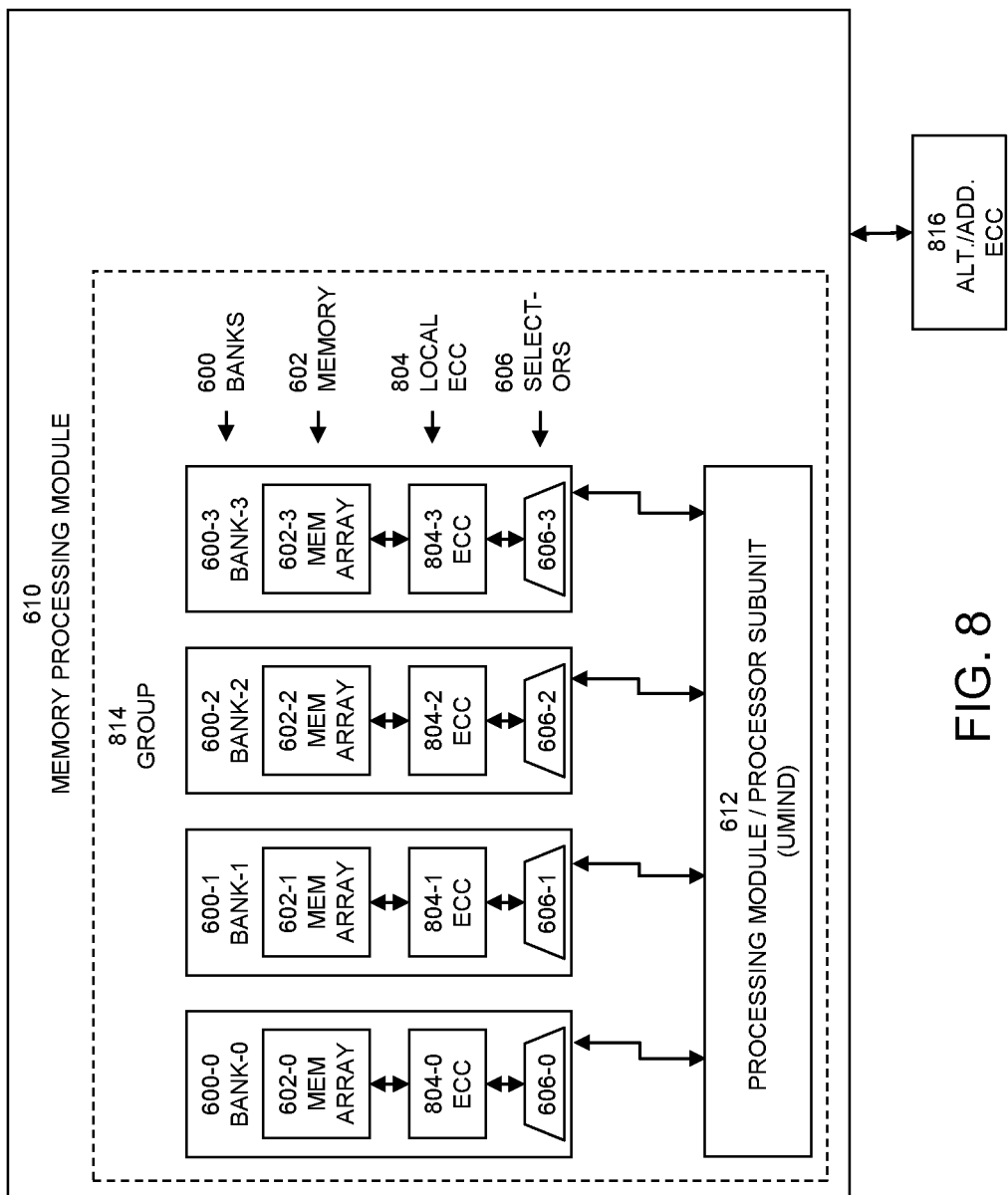
FIG. 8 provides a diagrammatic representation of a memory processing module, according to exemplary disclosed embodiments.

Referring to the drawings, FIG. 8 is a sketch of a memory processing module 610 architecture, including ECC implementation. The current figure is similar to FIG. 6, with the addition of local ECC modules 804 (shown as respective local ECC module-0 804-0 through local ECC module-3 804-3), and an alternative and/or additional ECC module 816 is in operational communication with the MPM 610. Features of the current embodiment may include calculating ECC internal to the memory (internal to the MPM 610), sending an interrupt on error detection, and methods for sending ECC data (including in-band and out-of-band).

The architecture of MPM 610 may lead to challenges that do not exist in conventional architecture implementations. Thus, new systems and methods are required to solve these new technical problems. One challenge that does not exist in conventional memory chips results at least in part from local processing of data that changes the data in memory. For example, the processing subunit 612 may read data from memory array-0 602-0, read data from memory array-1 602-1, perform a calculation on the read data, generate a result, and write the result to memory array-2 602-2. Thus, the previously stored data (e.g., not the entire data, but a portion) within the memory array-2 602-2 has changed from an originally stored value to a new value. As conventional ECC methods (for example, described above) are designed to detect changes in the data, these conventional methods fail (give false positives/indication of error) in the current case of intentionally changing the stored data.

One solution may be to perform ECC within each bank 600, when data is received for writing to each corresponding memory array 602. An original ECC is calculated by the local ECC module 804 across the received data, and then both the received data and corresponding original ECC are stored in each bank 600. When data is read from a memory array 602, the corresponding original ECC is also read from the memory array 602, a new ECC is calculated across the read data, and then the new ECC is compared to the original ECC (typically by the corresponding local ECC module 804) to determine (detect) if an error has occurred in the data (while stored). Note, this implementation is not limiting, and the ECC may be stored in any memory array/bank or an alternative location.

When the data in a memory array 602 (e.g., a portion) is changed, this is typically done by writing new data over the old data/data to be changed. The method is the same as described above for writing data to the memory array: An ECC is calculated by the local ECC module 804 across the received data, and then both the received data and corresponding original ECC are stored in each bank 600, in this case replacing the old ECC with a new ECC that is valid for the current data.

In alternative implementations, the ECC (original and/or new) can be calculated in any area, for example, within the MPM 610, by the processing module/processor subunit 612, within a multi-layered module, and by a controller (such as slave controller 1012).

In the context of this document, ECC modules are also referred to as "ECC calculators". In addition to the local ECC module 804 in the banks 600 and the ECC module 312 which may be included in the DDR controller 308, there may be provided other additional and/or alternative ECC modules (calculators) anywhere in the controller domain 630 and/or the higher-level domain 632.

The MPM local ECC module 804, the controller ECC module 312, and the one or more other ECC modules may perform the same ECC calculations, perform different ECC calculations, perform ECC calculations on the same type and/or sized of data units, perform calculations on different type and/or different sized data units, may be of the same complexity, may differ in complexity, may be of the same error correction capability, may differ in error correction capability, may be of the same error detection capabilities, and may be of different error correction capabilities. In a non-limiting example, an additional other ECC calculator may perform ECC calculating on larger data units (for example frame versus memory bank line or page), may detect more errors, may correct more errors, and the like, as compared to the local ECC module 804 and the ECC module 312. In another example, one or more other ECC modules may correct errors that were detected by the local ECC module 804, may be used to validate ECC error calculations or detection made by the local ECC module 804, and the like.

Errors occur in information stored in memory. Embodiments may provide effective solutions for error detection and error correction (ECC), especially with respect to the disclosed architecture. ECC information may indicate whether or not an error occurred. The ECC information may be of different resolutions, for example, an error found or detected in a memory address or a memory array 602, in a memory bank 600, and/or in a processing module 612 associated with an outcome of an ECC process. The latter is an example of ECC information that requires more access to the MPM 210 or more steps to find the exact ECC error.

The outcome of the ECC (ECC processing), an ECC indicator, may be output (transmitted) using any means available to the MPM 610. For example, in an implementation using a memory protocol over a first memory interface between the MPM 610 and the memory controller. One implementation of the first memory interface is described elsewhere in this document (in reference to FIG. 9), as the first signal S1. The first memory interface may be a shared communication path or a dedicated communication path. The ECC indicator may be output using the data link layer communication channel (DLL 1100), described elsewhere in this document in reference to FIG. 11) by embedding or otherwise utilizing memory protocols for communicating with the processing resources of the MPM 610, by using a communication protocol that may be used for communicating with both computational and memory resources of the MPM 610, by utilizing one or more dedicated ports or resources of the MPM 610 for communication, and the like.

In another implementation, additionally and/or alternatively to the first memory interface, a second memory interface (second channel) 618 is in operational communication with the MPM 610. The second memory interface 618 may be a second channel and may be a shared communication path or a dedicated communication path. The second interface 618 may be a wired or a wireless interface. The second interface 618 may communicate with the controller domain and/or with a higher-level domain. The second interface may provide out-of-band communication, may be a dedicated pin, and the like.

Figure 13:
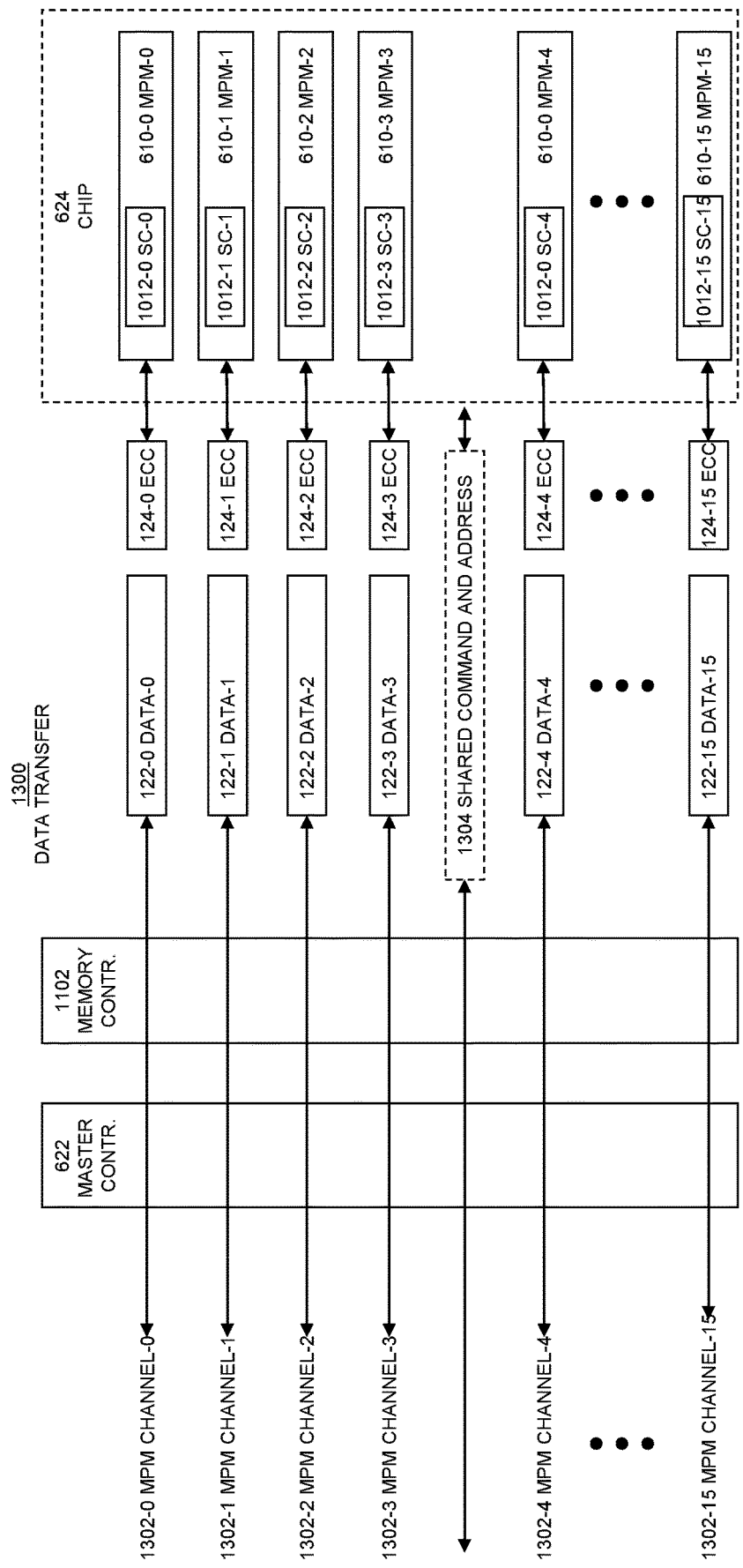
FIG. 13 provides a diagrammatic representation of writing to and reading from a memory processing module, according to exemplary disclosed embodiments.

Referring now to FIG. 13 a sketch of writing to and reading from MPMs 610. In the current non-limiting example, data transfer 1300 is implemented using 16 channels (respectively MPM channel-0 1302-0 to MPM channel-15 1302-15) to respectively communicate with 16 MPMs (respectively MPM-0 610-0 to MPM-15 610-15). The data units 122-n (respectively data-0 122-0 to data-15 122-15) optionally include or are associated with corresponding ECC (respectively ECC-0 124-0 to ECC-15 124-15). Typically, each MPM 610 includes a corresponding slave controller (respectively SC-0 1012-0 to SC-15 1012-15).

While shown as separate elements in the current figure, as described elsewhere in this description, the memory controller 1102 may be a sub-element of the master controller 622. Commands and addresses may be shared between all MPMs 610. The number of MPMs may differ from 16. Communication may be implemented using the DDR4 standard. Communication protocols other than DDR4 may be used.

In an alternative implementation, the communication may differ from the parallel communication using shared command and address channel 1304 of the current figure.

In the current figure, the data 122 is being sent with a corresponding ECC 124 to the MPMs 610. For example, each data unit 122 may be 64 bits with a corresponding 8 bits of ECC 124. In this case, the data unit and ECC can be received by the MPM 610 and written to memory. In comparison, in an alternative or additional implementation described in reference to FIG. 8, the MPM 610 may have local ECC modules 804. Where local ECC modules 804 are used, the ECC 124 can be received, checked, and stored as an original ECC. Alternatively, the data 122 can be sent without the ECC 124. If a location ECC module 804 is used, when the data is read from memory to be transferred as data units 122 from the MPM 610 to the controller (s) (1102, 622), the most recent, for example a new ECC, can be sent as the ECC 124 with the data unit 122.

If an error is detected in the MPM 610, for example an ECC error, a variety of techniques can be used to notify that an error has occurred. For example, notifying the controller domain 1106, such as the MPM controller (XMC, 1104) that a bit has flipped in memory/an ECC error has occurred using in-band communications (FIGS. 13—1302, 122, 124), out-of-band (FIGS. 13—1304), and/or the DLL communications channel 1100.

Refer to the drawings, FIG. 14 to FIG. 17 are sketches of error communications. In FIG. 14, there may be provided a method for storing ECC information about uncorrectable ECC errors that is outputted by polling uncorrectable ECC errors once every predefined number of transactions (in the current example, POLL at times 0 and 7). Multiple timeslots are allocated for transmitting data units D0-D5, a next time slot is allocated for conveying ECC info (POLL), then multiple time slots are allocated for transmitting data units D6-D10. D0-D5 are transmitted only when the ECC info (follows D0-D5) indicates that D0-D5 are not erroneous. If erroneous—D0-D5 may not be sent. Between polling, READ data (data to be read from the MPM 210, D0 to D5) having the uncorrectable ECC error can be stored in the MPM 610, 1010, for example in the slave controller 1012. If there was no uncorrectable ECC, then the data to be transmitted is error free, and the MPM 610, 1010 (slave controller 1012) can transmit the stored data (D0 to D5 at time 8 to 13) to a user application (higher level domain, connected to one or more of the MPM channels 1302). If there is an error, an uncorrectable ECC, then the data (D0 to D5) can remain untransmitted, and the user application can be notified.

In an alternative implementation, FIG. 15, the data 122 including the ECC 124 can be streamed (transmitted, for example, transmitted in-line with the data) from the MPM 610, 1010 and checking of the ECC 124 can be implemented by another module, for example by the user application, or by notifying the user application of an error so the user application can discard the already received data. D0-D5 are transmitted immediately after receiving them by MPM—and if the ECC info (follows D0-D5) indicates that D0-D5 are erroneous—the MPM controller notifies the higher-level domain.

In an alternative implementation, FIG. 16, in a case of uncorrectable error the alternate or additional ECC module 816 can transmit an agreeable code-word (CODE) instead of real data (the data 122). D0-D6 are transferred followed by a flag or indicator (CODE) whether the next time slot is allocated for transmission of data (for example D7) or ECC information. The MPM controller (1102) can poll (POLL) an MPM ECC register (not shown in the current diagram) if received data 122 matches the code-word. In a case of a false ECC failure, FIG. 17, the ECC poll indicates the code-word (CODE) was real data (D7), which is passed to the user application According to the teachings of the present embodiment there is provided a computational memory system including: at least one computational memory module (610) including one or more processor subunits (UMIND, 612) and one or more memory banks (600) formed on a common substrate, and one or more local error correction code (ECC) modules (804) operationally connected to the at least one computational memory module (610) and configured to calculate an original ECC based on received data.

In an optional embodiment, one or more of the local ECC modules (804) is formed on the common substrate. In another optional embodiment, one or more of the local ECC modules (804) is deployed respectively in one or more of the processor subunits (612). In another optional embodiment, each of the local ECC modules (804) is associated with one of the memory banks (600). In another optional embodiment, each of the one or more local ECC modules (804) is associated with each of one or more of the memory banks (600).

In another optional embodiment, the received data is from a slave controller (SC, 1122, XSC, 1124). In another optional embodiment, the received data is from the one or more processor subunits (612).

In another optional embodiment, one or more of the local ECC modules (804) are configured to store the original ECC in a location selected from the group consisting of: in one or more of the memory banks (600) that are associated with the ECC module (804), in one or more of the memory banks (600) other than memory banks that are associated with the ECC module (804), and in a location of the computational memory module (610) other than the memory banks (600).

In another optional embodiment, the received data is stored in one or more of the memory banks (600) as stored data, and one or more of the local ECC modules (804) are configured to store the original ECC in association with the stored data.

In another optional embodiment, one or more of the local ECC modules (804) are configured to calculate a new ECC based on the stored data, to determine if an error in memory has occurred and the stored data has changed to a new value. In another optional embodiment, one or more local ECC modules (804) are configured to generate an ECC indicator based on a comparison of the new ECC to the original ECC. In another optional embodiment, one or more local ECC modules (804) are configured to transmit the ECC using a method selected from the group consisting of: indicator in-band (124) with transmission of the stored data, out-of-band (1304) from transmission of the stored data, and via a second memory interface (218).

In another optional embodiment, one or more of the local ECC modules (804) are configured to transmit the ECC indicator using a data link layer communication channel (DLL 1100).

A present invention uses a memory protocol for conveying a signal to a controller, where the signal may have different meanings. The different meanings may include conventional error notification and innovative data transfer.

The following non-limiting example is provided now so the reader has a general overview of one implementation. When using a memory processing module/chip, an indication is needed that the memory processing module has data to output. In the current embodiment, the ALERT_N signal is used to indicate the memory processing module has data to output, for example that an H4 FIFO is not empty. This enables reads of the memory processing module by an external element to be done only when processed data (processed in the memory processing module) is ready, instead of an external element needing to poll the memory processing module. This implementation can save power consumption or/and to arbitrate accurately between reads/writes. One feature of the current embodiment using the ALERT_N signal is to keep the DDR4 chip and DIMM I/O compatible with the JEDEC standards.

Since the ALERT_N signal functionality has been changed, a solution is needed to indicate a data integrity error (for example a CRC or parity error) which are conventionally indicated by the ALERT_N signal). One solution described below is to convert data integrity error indications (of CRC or parity errors) to interrupt data link layer (DLL) frames.

Figure 9:
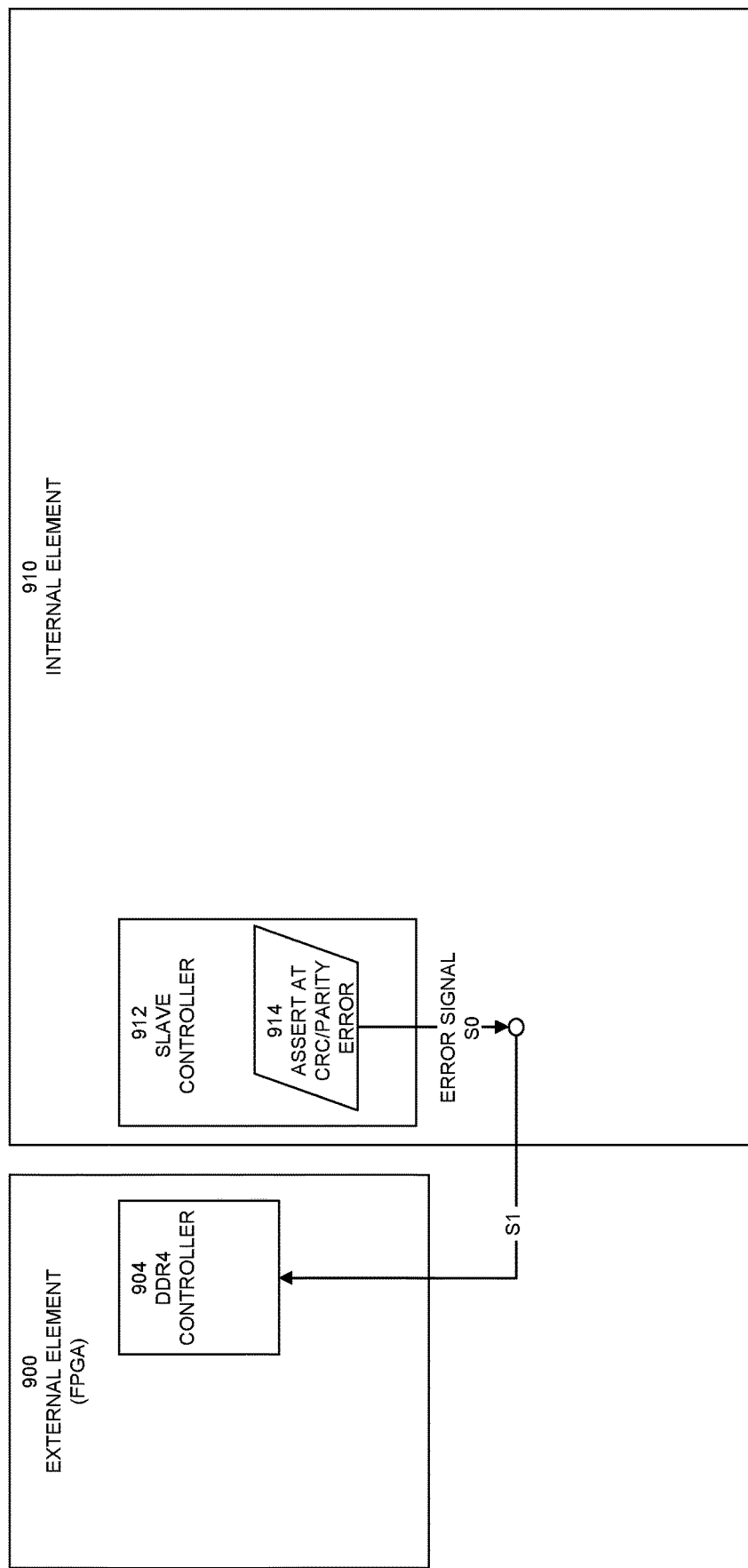
FIG. 9 provides a diagrammatic representation of a technique for handling ECC, CRC, and parity errors.

Referring again to the drawings, FIG. 9 is a sketch of handling conventional ECC, CRC, and parity errors. An external element 900, such as a non-limiting example of an FPGA, includes a DDR4 controller 904. An internal element 910 includes a slave controller (SC, 912) that can assert 914 an error signal S0 if there is a data integrity error (for example a CRC or parity error, in comparison with the ECC done in the ninth chip).

In general, if an error is detected, that is, if an error has occurred in transition to memory or in memory, the elements external to the memory must be informed, so the external elements can take appropriate action (for example, correct the error, or discard the data). In the conventional memory module 301 described above, the error signal S0 is activated (asserted 914) as a conventional alert signal, such as activating the DDR4 ALERT_N signal, and transmitted as a first signal S1 (error signal) to the external element 900 (to the DDR4 controller 904).

Figure 10:
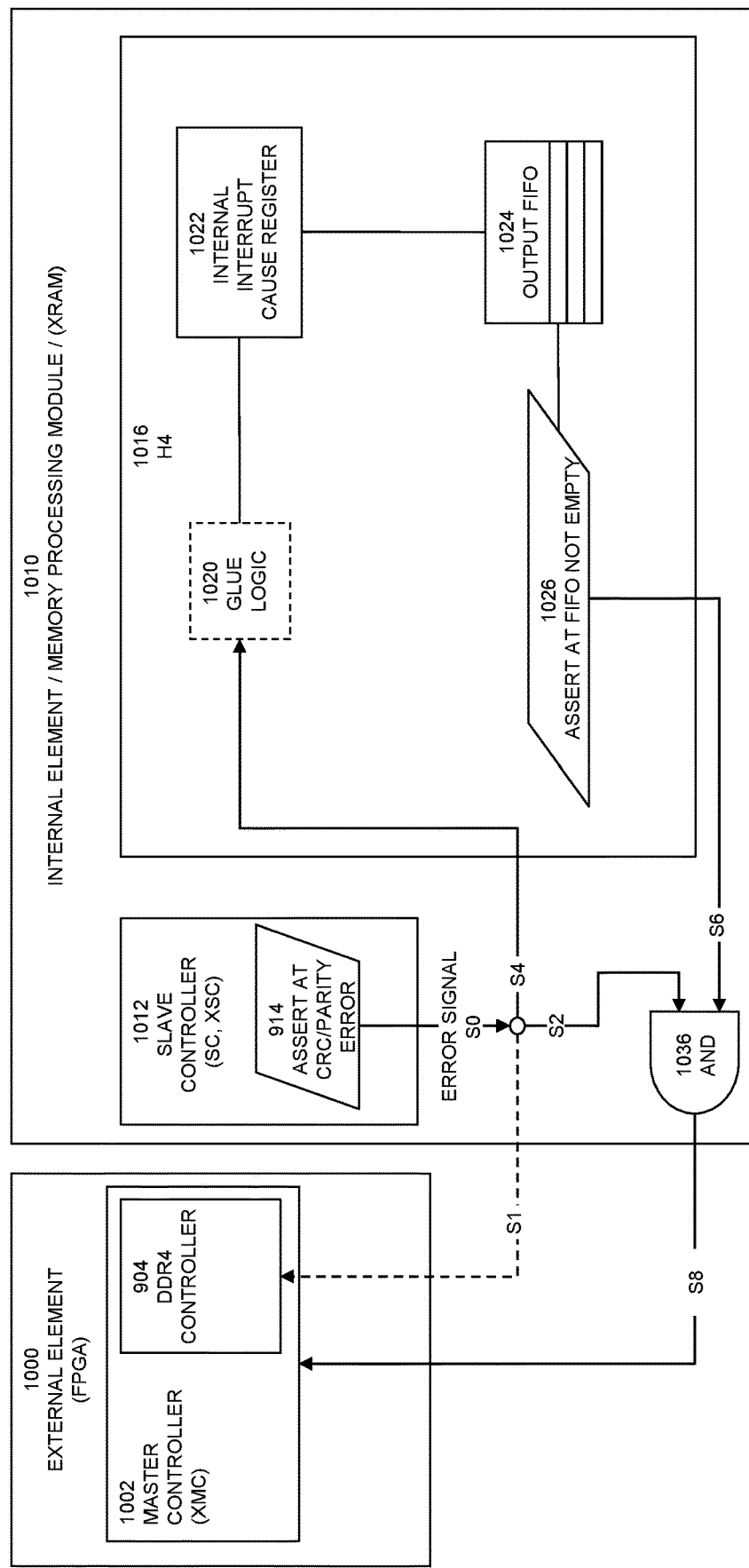
FIG. 10 provides a diagrammatic representation of a technique for using a memory protocol pin and error signal for handling of ECC, CRC, and parity errors with a memory processing module, according to exemplary disclosed embodiments.

Referring again to the drawings, FIG. 10 is a sketch of using a memory protocol pin and error signal for innovative handling of ECC, CRC, and parity errors with a memory processing module. An external element 1000, is similar to the above-described external element 900 and the external element 220. In the current non-limiting exemplary implementation, the external element 1000 is an FPGA, and includes a (an eXtreme/Xele) master controller (XMC, 1002) and a DDR4 controller 904. An internal element 1010 is similar to the above-described memory processing module 610, and additionally includes elements such as the slave controller (XSC, 1012) module that can assert 914 a first signal S0 if there is a data integrity error (for example a CRC or parity error). The internal element 1010 also includes several sub-controllers, such as H4 controller 1016. The H4 controller 1016 optionally includes modules such as glue logic 1020, and includes modules such as an internal interrupt cause register 1022, an output FIFO buffer 1024, and an assert if the FIFO is not empty (buffer has data to send) module 1026 that asserts a FIFO not empty signal (shown as sixth signal S6, a data ready signal, a notification signal).

In the current implementation, the internal element 1010 (for example the memory processing module 610) includes a data link layer (DLL) communication channel 1100 (not shown in the current figure). The DLL communications channel 1100 may notify the external element 1000 that data is waiting in the internal element 1010, for example, in the output FIFO 1024, for the external element 1000 to initiate a transfer of the data from the internal element 1010 to the external element 1000. In an exemplary implementation, an XRAM memory processing module 610 uses the ALERT_N hardware pin and signal to send a FIFO not empty signal (a data ready signal, asserting sixth signal S6) from the internal element 1010 to the XMC (master controller 1002) in the external element 1000. In the context of this document, references to "ALERT_N" are generally to the hardware pin and signal functionality, as one skilled in the art will be aware of based on context. As the ALERT_N signal is also needed to notify the external element 1000 of the assertion 914 of the error signal S0, a solution is needed to use a single, common hardware pin and signal for multiple signals, in this case both conventional error signaling S0 and data ready (FIFO not empty 1020) signal S6.

At least in part to solve this problem, the error signal S0 is not transmitted as the first signal S1 directly to the DDR4 controller 904 (shown in the current figure as a dashed line). Instead, the error signal S0 is transmitted as a fourth signal S4, e.g., optionally via the glue logic 1020 to the internal cause register 1022. Based on the received error signal (S0, S4) the cause register 1022 transfers error indication data to the output FIFO 1024 where the error indication data is enqueued in the output FIFO 1024 and awaits transfer from the internal element 1010 to the external element 1000. As there is now data in the output FIFO 1024, the data ready (FIFO is not empty) module 1026 asserts the data ready (FIFO not empty signal, sixth signal S6). The data ready signal S6 is transmitted via logic 1036 as an eighth signal S8 (standard alert signal) to the external element 1000, in this case to the XMC master controller 1002. The logic 1036 is used for backward compatibility, as the conventional error signal S0 can also be transferred, shown as a second signal (error signal) S2, via the logic 1036 to the external element 1000. Note, in the current exemplary implementation, the signals are active negative, so a logical AND can be used for the logic 1036.

When the XMC master controller 1002 receives the data ready signal (via the eighth signal S8), the XMC master controller 1002 can initiate a transfer of the data from the internal element 1010 to the external element 1000. This data transfer can be via the DLL communication channel 1100.

Note the signaling (such as the sixth signal S6) is an assertion notification, and separate from the transfer of data, such as error indication data, from the output FIFO 1024 (for example to the external element 1000). The transfer of data from the output FIFO 1024 is not shown in the current figure.

There may be provided a method for using a memory protocol pin of a memory processing module 610 (910, 1010) for conveying a signal to a controller, whereas the signal may have different meanings, whereas the controller may differentiate between the different meanings using context. The memory protocol pin is a pin that is/was used, at a legacy, conventional memory chip to convey a dedicated signal to the controller. The controller may be external to the memory processing module 610, such as the external element 1000 master controller 1002. The different meanings may, for example, flag different events or different statuses of the memory processing module 610. The context may be provided by the memory processing module 610 or otherwise be known by the controller. One example is using the ALERT_N signal and memory protocol pin for various purposes, such as conveying a signal having different meanings.

A memory processing module 610 may use the ALERT_N pin to output the ALERT_N signal to indicate that a CRC (optionally or a parity) error occurred. The memory processing module 610 may also use the ALERT_N to output the ALERT_N signal to indicate that the memory processing module 610 has content to output (for example the output FIFO 1024 is not empty). The memory processing module 610 controller (the slave controller 1012) may determine whether the ALERT_N signal is indicative of the data integrity (CRC or parity) error or the memory processing module 610 has content (data) to output based on other signals output by the memory processing module 610, based on timing (different time windows may be allocated for the different purposes of the ALERT_N signals), and the like.

This method of using the ALERT_N signal to indicate that an output element (for example a FIFO such as the output FIFO 1024) is not empty induces the external controller (the master controller 1002) to initiate transfer of the content (data). This indication method may save energy, for example, as the external element 1000 (master controller 1002) does not need to poll the internal element 1010 (output FIFO 1024) to determine a status of the internal element 1010. The ALERT_N signal and pin still can be used to provide an indication of a parity error in a chip testing mode and when CRC/Parity check is enabled.

In further detail, the XSC 1012 can check for CRC errors 426 when data is written via the conventional DDR4 interface and parity errors (428A, 438A) on the command and address lines (CMD+ADDR) over the DDR4 interface. In case of CRC or parity error, the ALERT_N error signal S0 is asserted for few cycles to notify the DDR4 controller 904 that an error has occurred. The XRAM 1010 modified functionality from conventional memory includes modifying the ALERT_N signal for two modes:
1. Chip testing mode
2. XRAM mode
1. During chip testing mode, the ALERT_N signal acts as a standard ALERT_N signal as defined in the DDR4 specification.
2. During XRAM mode, the ALERT_N signal can be set (asserted) when:
   2.1. H4 (1016) output FIFO (1024) is not empty
   2.1 The ALERT_N signal (as the eighth signal S8) is used to signal the XMC 1002 that there is data to fetch from the H4 (1016) output FIFO 1024. If the XMC 1002 would lack this indication, a conventional implementation would require the XMC 402 to continuously poll the H4 (1016) output FIFO 1024, which results in waste of resources and power.

For the XMC 1002 to catch events of CRC/parity errors, the CRC/parity error indication coming from the XSC 1012 (the error signal S0) can be connected as well (via the fourth signal S4) to the H4 (1016) interrupts cause register 1022 as an interrupt source (via optional glue logic 1020 to convert the signal (the error signal S0, S4) to a standard interrupt source behavior. Unless the CRC/parity interrupt cause is masked, the H4 (1016) will convert this interrupt into a message, and eventually the message will be put into an interrupt, for example in a DLL frame S10, for transfer from the internal element 1010 to the external element 1000.

A feature of using the ALERT_N pin to indicate "H4 FIFO not empty" retains compatibility with the chip+DIMM standard I/O. Alternatively, a pin other than the ALERT_N could be used, keeping the CRC+PARITY ERROR indications as-is via the ALERT_N pin. However, in this alternative case, compatibility with the standard chip+DIMM I/O may not be retained, and proprietary I/O will be needed.

According to the teachings of the present embodiment there is provided a computer communications alert system including: a slave controller (XSC, 1124), and a master controller (XMC, 1104) including a memory controller (DDR, 1102), the master controller (1104) configured for communication with the slave controller (1124). In a first mode (chip testing, conventional) the slave controller (1124) is configured to activate an error signal (S1, S2), and the memory controller (1104) is configured to handle the error signal. In a second mode (XRAM mode) the slave controller (1124) is configured to activate a data ready signal (S6), and the master controller (1104) is configured to handle the data ready signal. Both the error signal and the data ready signal are sent as a pre-defined alert signal (S8) from the slave controller (1124).

In an optional embodiment, further including: one or more processor subunits (UMIND, 612), and one or more memory banks 6200) formed on a common substrate. In another optional embodiment, the memory controller (1102) is a DDR4 controller.

In another optional embodiment, the first mode is a chip testing mode, and the slave controller (1124) is configured to activate the error signal as a pre-defined signal being a DDR4 ALERT_N signal. In another optional embodiment, the second mode is a data transfer mode, and the slave controller (1124) is configured to activate the data ready signal as the pre-defined signal being a DDR4 ALERT_N signal.

In another optional embodiment, the mode is a data transfer mode, and the slave controller (1124) is configured to activate the data ready signal when data is ready to be transferred to the master controller (1104). In another optional embodiment, the master controller (1104) is configured that based on receiving the data ready signal to initiate reading data from the slave controller (1124). In another optional embodiment, reading data is via a data link layer communication channel (DLL 1100).

In another optional embodiment, further including an output buffer (1024), and the slave controller (1124) is configured to activate the data ready signal based on the output buffer (1024) having data to send.

Figure 11:
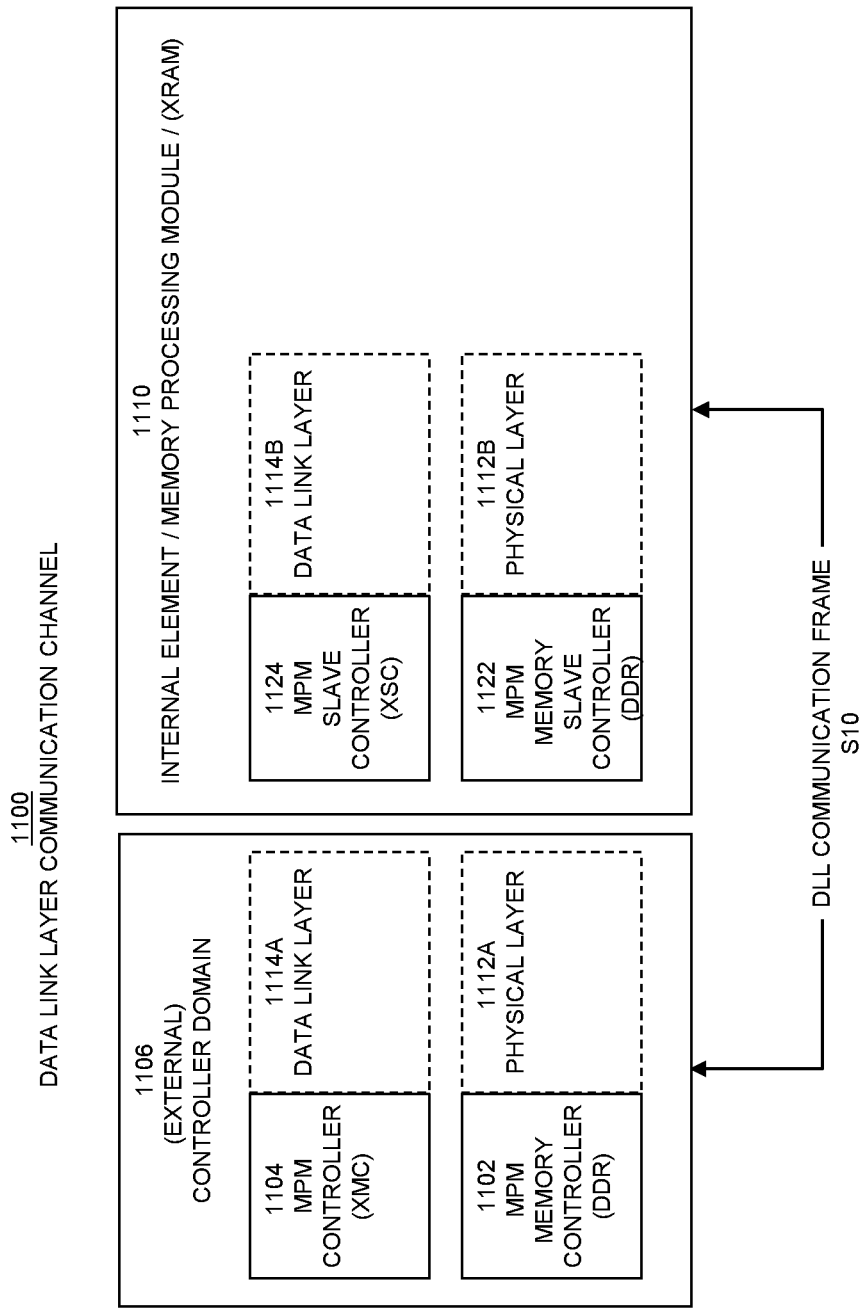
FIG. 11 provides a diagrammatic representation of a DLL communications channel, according to exemplary disclosed embodiments.

Refer to the drawings, FIG. 11 is a sketch of a DLL communications channel. The DLL communications channel 1100 is also referred to in the context of this document as "the DLL" and "the DLL channel". The DLL channel 1100 provides an innovative communication channel between an external controller 1106 (external controller domain 630) and an internal element 1110. The external controller 1106 may be the external element 1000 (external element 220) and the internal element 1110 may be the memory processing module 1010 (MPM 610, XRAM chip 624). The DLL channel may be used as a virtual port for communicating with processor subunits, for example, with a processing subunit 612. The external controller 1106 may communicate via the slave controller (XSC, 1012) with the processing module (UMIND, 612).

A feature of the current implementation is accessing processing modules 612 (processor subunits) using a redirection scheme in which one or more redirect addresses are allocated in each memory bank 600, and packets addressed to any of the redirect addresses is not written to the memory bank 600, but instead written to a virtual port (for example DLL port) for handling by the processing module 612. The DLL port can be implemented by hardware implemented in the processor subunit domain, for example, by the MPM slave controller (1012, 1124, XSC).

The external controller 1106 includes an MPM controller 1104 handling the OSI logical layer 2 data link layer (DLL) 1114A functionality and an MPM memory controller 1102 handling the OSI logical layer 1 physical layer 1112A functionality. The MPM controller 1104 may be implemented by the master controller 622 (XMC, 1002) and the MPM memory controller 1102 may be implemented by the DDR controller 904. As described elsewhere in this document, the master controller (622, 1003, 1104) may include a memory controller (DDR4 controller, 608, 1102). In this case, the DDR controller 608 handles conventional layer 1 physical functions. The master controller 622 is optional. When used, the master controller 622 can implement additional functionality such as DLL channel 1100. When the master controller 622 is not used, or bypassed, the DDR controller 608 can be used for conventional communications between the higher-level domain 632 via the external controller 1106 to the internal element 1110. The DDR controller 608 may be implemented as a sub-element of the MPM controller 1104 (a sub-element of the master controller XMC 622). The MPM controller 1104 and/or the MPM memory controller 1102 can be implemented in an FPGA as part of the IMPU 628. In a typical, non-limiting implementation, an IMPU 628 includes a single FPGA implementing 4 external controllers 1106, each external controller 1106 associated with a corresponding to a DIMM 626, and each external controller including a MPM controller 1104 (XMC 622) with an MPM memory controller 1102 sub-element.

The internal element 1110 includes an MPM slave controller 1124 handling the OSI data link layer (DLL) 1114B functionality and an MPM memory slave controller 1122 handling the physical layer 1112B functionality. Similar to the description of the external controller domain. The MPM slave controller 1124 may be implemented by the slave controller 1012 (XSC) and the MPM memory slave controller 1122 may be implemented by a DDR slave/internal controller (912, 608). In this case, the DDR slave/internal controller handles physical functions. The slave controller 1012 is optional. When used, the slave controller 1012 can implement additional functionality such as DLL channel 1100. When the slave controller 1012 is not used, or bypassed, the DDR slave/internal controller can be used for conventional communications between the higher-level domain 632 via the external controller 1106 to the internal element 1110. The DDR slave/internal controller may be implemented as a sub-element of the MPM slave controller 1124 (a sub-element of the slave controller XMC 1012). The MPM slave controller 1124 and/or the MPM memory slave controller 1102 can be implemented in an MPM 610 (XRAM chip 624). In a typical, non-limiting implementation, each MPM 610 includes one or more slave controllers 1012, each slave controller 1012 including the DDR slave/internal controller sub-element.

One or more DLL communications frames S10 are used to transmit information from the external controller 1106 to be received by the internal element 1110, and to transmit information from the internal element 1110 to be received by the external controller 1106. The information may include data, commands, and a combination of data and commands.

Note that the "DLL communications channel" or "DLL channel" 1100 of the current description is a protocol layer that communicates between nodes on a network segment across the physical layer. The innovative DLL channel 1100 can be implemented as a layer on top of an existing protocol, in this case the DDR layer protocol. Conventional DLL implementations communicate between nodes in the controller domain 630 and above, such as the higher-level domain 632, with legacy controllers (for example the DDR controller 608) being a last node which then sends data to memory (for example, the conventional memory module 301). In contrast, the memory processing module MPM 610 includes nodes (for example, the processing module UMIND 612), and the DLL channel 1100 can be used to communicate with the MPM 610, with nodes internal to the MPM 610 such as the processing module 612, and within the MPM 610 from one node to another (for example from a first processing module to a second processing module). That is, where conventional DLL is used to communicate with a memory controller 308, and then the received data is sent from the memory controller 308 to a memory address, the DLL channel 1100 can be used (for example, by the memory controller XMC 622) to communicate to the MPM 610. The DLL channel 1100 communication includes data write commands, data read commands, and instructions such as operations on memory, operations to be executed by the processing module 612, and similar as described elsewhere in this document and the referenced documents.

Figure 12:
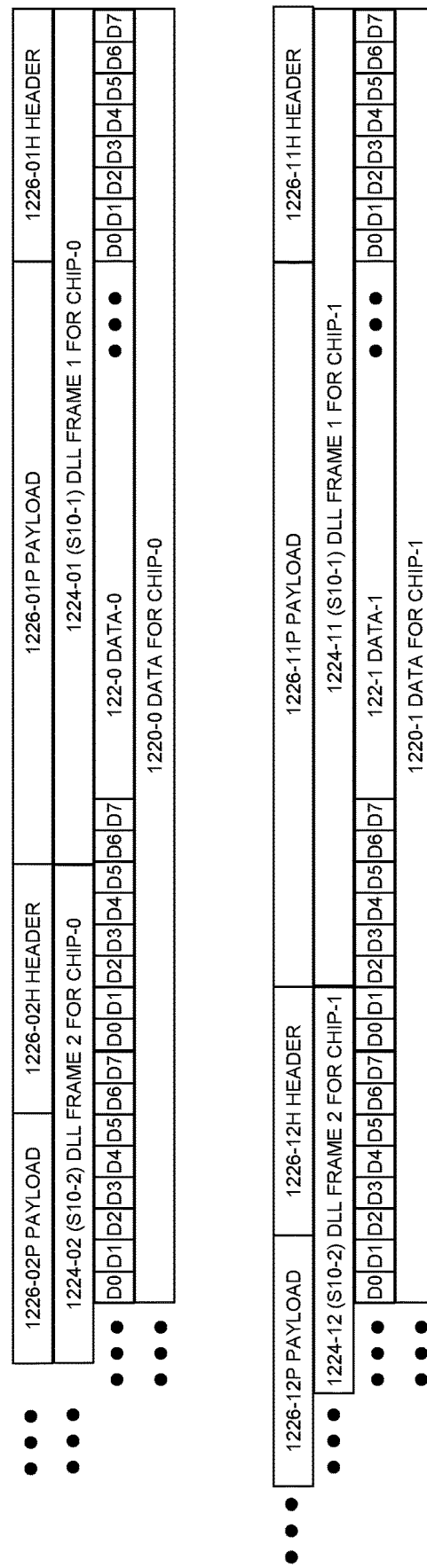
FIG. 12 provides a diagrammatic representation of a DLL communications channel framing, according to exemplary disclosed embodiments.

Referring to the drawings, FIG. 12 is a sketch of DLL communications channel framing 1130. The current figure is a non-limiting example, as will be appreciated to one skilled in the art. Based on this description, one skilled in the art will be able to implement details such as data frames, numbers of bits, words, framing, frame length, and frame format for a particular application. Data for two chips are shown as exemplary data for chip-0 1220-0 and data for chip-1 1220-1. The data (1220-0, 1220-1) may be broken into respective data units data-0 122-0 and data-1 122-1, in this case using 8-Byte units. Any number of bits from one or more data units 122-n can be used to construct (represent) a DLL communications channel frame 1124. The DLL communications channel frame 1224 is an exemplary implementation of the above-described DLL communications frame S10. That is, the DLL (frame size) is independent of size of underlying data (for example, DDR frame) being sent. For example, the DLL can be layered on top of DDR4 which writes 8 Bytes of data to each of the chips. For chip-0 two DLL frames are shown, a first DLL frame 1224-01 and a second DLL frame 1224-02. Similarly, for chip-1 two DLL frames are shown, a first DLL frame 1224-11 and a second DLL frame 1224-12. Note that the DLL frames can be the same size (length, number of bits), or the DLL frame sizes can vary from one frame to another for the same chip and for other chips. Each DLL frame has a structure. The structure of DLL frames can be the same from one from to another frame, or the structure can vary with the structure of one frame being different from the structure of another frame. A DLL frame structure may include a header and a payload. Examples are shown in the current figure as chip-0 DLL frame 1 1224-01 having a header 1226-01H and a payload 1226-01P, and DLL frame 2 1224-02 having a header 1226-02H and a payload 1226-02P. Similarly, chip-1 DLL frame 1 1224-11 having a header 1226-11H and a payload 1226-11P, and DLL frame 2 1224-12 having a header 1226-12H and a payload 1226-12P.

As noted above, in conventional implementations a legacy memory controller 1102 sends data write (and read) commands to a legacy memory slave controller 1122 which then writes to (or reads from) given memory address(es). In contrast, the DLL communications channel 1100 uses the DLL communications frame (S10, 1224) to communicate from the MPM controller XMC 1104 to the MPM slave controller XSC 1124. In a case where the DLL communication is a conventional write or read, the legacy memory slave controller SC 1122 can be modified to process the data 122, which in this case can be conventional data 122 (and not a DLL communications frame (S10, 1224)) and perform a conventional write to, or read from, memory. In a case where the data 122 is a DLL communications frame (S10, 1224), that is, is other than a conventional write or read, the legacy memory slave controller SC 1122 can pass/send the DLL communications for further processing. The DLL frame (S10, 1224) is then processed in the internal element 1110, typically in the MPM slave controller XSC 1124. Processing may include parsing the DLL frame (S10, 1224), reading the header, acting based on the header information, unpacking the frame, unpacking the payload, etc. Based on the DLL communication (header, payload, etc.) at least a portion of the DLL communication can be sent to one or more nodes internal to the MPM (610, 910, 1010) such as one or more processing modules 612. In particular, DLL communications that are instructions for execution and processing by the processing module UMIND 612.

In a preferred implementation, a memory address is used as a virtual DLL port. For example, using a predefined memory address, such as the memory address 0x3FF (last row of each memory bank). When the legacy memory slave controller SC 1122 processes the data units 122 and sees the address in the data 122 matches the predefined address (the external element 1000 is communicating on the DLL port), then the memory slave controller SC 1122 passes the DLL frame (S10, 1224) to the MPM slave controller XSC 1124 for handling. Correspondingly, if a memory address in the data 122 fails to match the pre-defined address, the data is processed by the legacy memory slave controller SC 1122. The MPM slave controller XSC 1124 processes the data 122 as a DLL frame (S10, 1224), converting the data to a DLL frame (S10, 1224) (generating a DLL frame (S10, 1224) from the data 122).

As described above, the current figure is exemplary. Other frames may be used for the DLL frame 1224. Additional, alternative, fewer, and more fields may be used to the header 1226-*nn*H and payload 1226-*nn*P fields.

The DLL frame 1224 may include a frame type indicator, access type field (for example read or write), one or more addresses (including memory address, processor subunit address, unicast address, multicast address, broadcast address, group identifier of a group of entities (processor subunits and/or memory banks or a combination thereof) that are the source or the target of the frame, source address indicative of the source of the frame, target address indicative of the target of the frame, length of frame field, protected indicator that indicates whether the frame or a part thereof is checksum or error protected, valid indicator indicative of which part of the payload is valid, frame control field, and the like. Different types of traffic may use the same type of DLL frames or other types of DLL frames. The header 1226-*nn*H may be used to indicate the frame type, or another portion of the DLL frame 1224 may indicate the frame type.

The DLL frame 1224 may be used to send a variety of communications between the external element 1000 (external domain 1106) and the internal element 1010 (internal element 1110). Some non-limiting examples include sending processed data, interrupts, flow control, and statistics. The external domain 1106 may use the DLL port to send DLL communications to the internal element 1110, the internal element 1110 may use the DLL port to send communications to the external domain 1106, and the internal element may use the DLL communications channel to communicate internally, for example from a first processing subunit 612 to a second processing subunit 612.

According to the teachings of the present embodiment there is provided an information transfer system including: a master controller (XMC, 1104) configured to issue a command in the form of a memory protocol data packet (122), and wherein the master controller (1104) is configured to generate routing information indicating whether the memory protocol data packet is to be processed according to a first protocol or according to a second protocol different from the first protocol, and a slave controller (XSC, 1124), configured to receive the memory protocol data packet from the master controller (1104). The slave controller (1124) is configured to use the routing information to selectively cause the memory protocol data packet to be processed according to the first protocol or according to the second protocol.

In an optional embodiment, the first protocol is a DDR4 protocol.

In another optional embodiment, the slave controller further includes a memory protocol controller (SC, 1122) configured to process the memory protocol data packet according to the first protocol. In another optional embodiment, the memory protocol controller is a DDR4 controller (1102, 904).

In another optional embodiment, the routing information is provided out-of-band from the data packet. In another optional embodiment, the routing information is provided in-band with the data packet. In another optional embodiment, the routing information is provided in the address field.

In another optional embodiment, the data packet includes at least an address field and a data field. In another optional embodiment, the data packet includes a data field, and the master controller (1104) generates an address field associated with the data packet. In another optional embodiment, the slave controller (1124) is configured to cause the memory protocol data packet to be processed according to the second protocol in response to detection of at least one re-route value in the address field. In another optional embodiment, the slave controller (1124) is configured to cause the memory protocol data packet to be processed according to the first protocol in response to detection in the address field of an address value not designated as a re-route value In another optional embodiment, the routing information is a memory address. In another optional embodiment, the routing information is a range of memory addresses. In another optional embodiment, the routing information is a command to configure a memory register in the slave controller (1124). For example, a command can be sent to the memory processing module (210) to set a register indicating that all subsequent communications are not reads or writes, but DLL communications, and should be handled as appropriate by the slave controller (XSC, 1124).

In another optional embodiment, the first protocol includes a physical layer protocol. In another optional embodiment, the second protocol is an Open Systems Interconnection (OSI) logical layer 2 protocol.

In another optional embodiment, further comprising a memory storage (602) operationally connected to the slave controller (1124), wherein the first protocol includes writing data from the data field to at least one memory address, from the address field, in the memory storage (602). In another optional embodiment, further comprising a processing subunit (612) operationally connected to the slave controller (1124). In another optional embodiment, the second protocol includes routing at least the data field to the processing unit.

In another optional embodiment, the second protocol includes: parsing the data field to extract a frame (DLL frame, 1224), parsing the frame to identify a frame header and a frame payload, and executing a function based on the frame header.

In another optional embodiment, further including a processing subunit (612) operationally connected to the slave controller (1124), and the function includes sending at least the frame payload to the processing subunit (612).

In another optional embodiment, the routing information is a memory address, and the second procedure includes re-directing the data field associated with the memory address to a processing subunit operationally connected to the slave controller (1124).

In another optional embodiment, the first protocol includes handling the data section via a first data path and the second protocol includes handling the data section via a second data path. In another optional embodiment, the first data path includes writing the data section to a memory storage (602) and the second data path includes processing the data section by a processing subunit (212).

According to the teachings of the present embodiment there is provided a computational memory system comprising at least one computational memory module (610) including one or more processor subunits (UMIND, 612) and one or more memory banks (600) formed on a common substrate. A slave controller (XSC, 1124) is in operational communication with the processor subunits (612) and memory banks (600). The slave controller (1124) is configured to receive a memory protocol data packet including a data field, receive an address field associated with the data packet, receive routing information indicating whether the memory protocol data packet is to be processed according to a first protocol or according to a second protocol, and based on the routing information, selectively cause the memory protocol data packet to be processed according to the first protocol or according to the second protocol.

In an optional embodiment, further including: a master controller (XMC, 1104) configured to generate the memory protocol data packet, generate the address field, generate the routing information, and in operational communication with the slave controller.

According to the teachings of the present embodiment there is provided an information transfer system including: a first slave controller (SC, 1122), a first master controller (MC, 1102) configured for communications with the first slave controller (1122) using a pre-defined protocol, a second slave controller (XSC, 1124), and a second master controller (XMC, 1104) configured for communications with the second slave controller (1124) via the first master controller (1102) and the first slave controller (1122) using a higher-level protocol (DLL 1100). The higher-level protocol lays on top of the predefined protocol, the pre-defined protocol using a data packet including an indicator (for example, an address) and a data section (for example, data). If the indicator has a first value the data section is processed according to a first procedure (for example, conventional DDR write/read). If the indicator has a second value, or lacks the first value, the data section is processed according to a second procedure (for example, the DLL communications channel 1100).

In an optional embodiment, the pre-defined protocol is selected from the group consisting of: a memory transfer protocol, DDR3, and DDR4. In another optional embodiment, the pre-defined protocol includes a physical layer protocol. In another optional embodiment, the higher-level protocol is a data link layer (DLL) protocol.

In another optional embodiment, the given indicator is selected from the group consisting of: a codeword, a memory address, and a range of memory addresses. In another optional embodiment, the first procedure includes the first slave controller (1122) and the first master controller (1102) processing the data according to predefined protocol [DDR4]. In another optional embodiment, the first slave controller (1122) and the first master controller (1102) implement the pre-defined protocol.

In another optional embodiment, further including a memory storage (202) operationally connected to the first slave controller (1122). In another optional embodiment, the first procedure includes parsing the data packet to extract a memory address and memory data and writing the memory data to the memory address in the memory storage (202).

In another optional embodiment, the second procedure includes the first slave controller (1122) passing the data to the second slave controller (1124) and the master controller (1102) passing the data to a second master controller (1104). In another optional embodiment, the second slave controller (1124) and the second master controller (1104) implement the higher-level protocol.

In another optional embodiment, including a processing subunit (612) operationally connected to the second slave controller (1124). In another optional embodiment, the second procedure includes parsing the data section to extract a higher-level protocol frame (DLL frame, 1224), and sending the higher-level protocol frame (1124) to the processing subunit (612), the higher-level protocol frame (1224) including a frame header (1226-*nn*H) and a frame payload (1225-*nn*P).

In another optional embodiment, the second procedure includes: parsing the data section to extract a higher-level protocol frame (DLL frame, 1224), parsing the higher-level protocol frame (1224) to identify a frame header and a frame payload, and executing a function based on the frame header.

In another optional embodiment, further including a processing subunit (612) operationally connected to the second slave controller (1124), and the function includes sending the frame payload to the processing subunit (612).

In another optional embodiment, the indicator is a memory address, and the second procedure includes re-directing the data section associated with the memory address to a processing subunit (612) operationally connected to the second slave controller (1124).

In another optional embodiment, the first procedure includes handling the data section via a first data path and the second procedure includes handling the data section via a second data path.

In another optional embodiment, the first data path includes writing the data section to a memory storage (602) and the second data path includes processing the data section by a processing subunit (612).

In another optional embodiment, the first procedure includes processing the data section according to the predefined protocol, and the second procedure includes processing the data section other than by the predefined protocol.

According to the teachings of the present embodiment there is provided a computational memory system including: at least one computational memory chip including one or more processor subunits (UMIND, 612) and one or more memory banks (602) formed on a common substrate, a slave controller (XSC, 1124) in operational communication with the processor subunits and memory banks, a master controller (XMC, 1104) configured to communicate data with the slave controller (1124). The slave controller (1124) processes the data, and if the data includes an indicator having a first value then the slave controller (1124) executes a first procedure including sending the data to one or more of the memory banks. If the indicator has a second value, or lacks the first value, the data section is processed according to a second procedure (for example, the DLL communications channel (1100).

According to the teachings of the present embodiment there is provided a data packet structure for use in transferring information between a master controller (1104) within a computer system and a slave controller (1124) within a memory processing module (610), the data packet structure including: an indicator and a data section. If the indicator has a first value the data section includes data for a predefined protocol, and if the indicator has a second value the data section is processed to extract from the data section a higher-level protocol frame header and frame payload.

Figure 18:
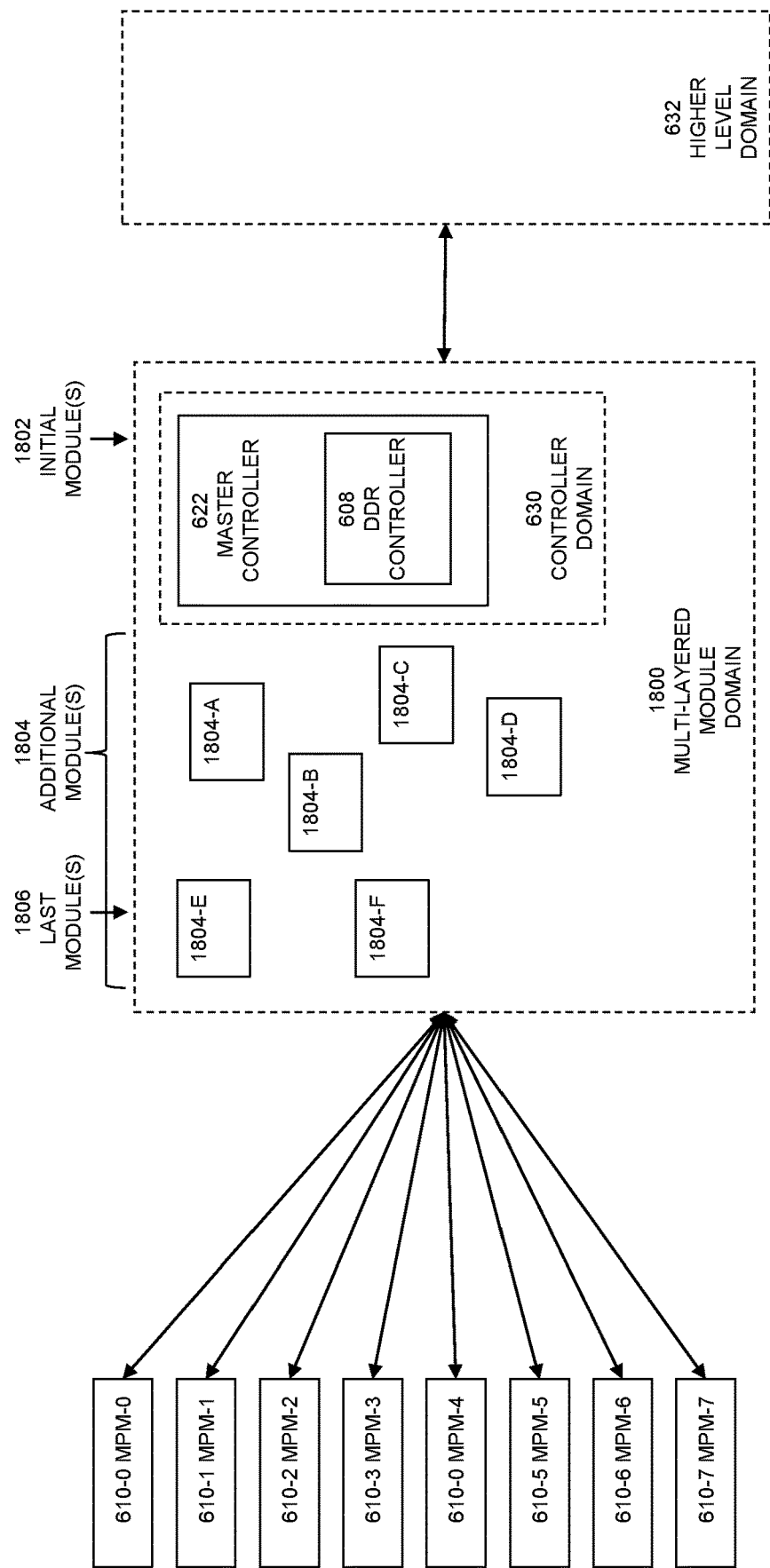
FIG. 18 provides a diagram of exemplary connectivity between controllers and memory processing units, according to exemplary disclosed embodiments.

Refer now to FIG. 18, a diagram of exemplary connectivity between controllers and memory processing units. One or more controllers, such as the master controllers 622 and/or the DDR controllers 608 can be in operational communication with one or more MPMs 610. As described elsewhere in this document, the controllers are in the controller domain 630 which is operationally connected to the higher-level domain 632. The controller domain 630 may include one or more controllers, for example, one MPM controller 622. In another example, the controller domain 630 may include one legacy controller, for example, one DDR controller 608. In another example, the controller domain 630 may include one MPM controller 622 and one legacy controller 608. In a case where multiple controllers and/or multiple levels of controllers are used, the controller domain 630 is at least a portion of a multi-layered module domain 1800. An implementation using a single controller, (including the case of a single master controller 622 that has as a sub-element a legacy DDR controller 608), is referred to in the context of this document as a single-layered module domain (see for example FIG. 6).

For simplicity, the current figure uses one of the master controllers 622, one of the DDR controllers 608, and eight of the MPMs (610-0 to 610-7). The master controller 622 may access the MPMs 610 directly. The DDR controller 608 may access the MPMs 610 directly. Alternatively, the master controller 622 may access the MPMs indirectly, for example via a legacy controller such as the DDR controller 608.

In a typical case where a number of MPMs 610 are configured in a chip 624, and a number of chips are configured into a DIMM 626, the DIMM 626 may communicate with the controller domain 630, which in turn communicates with the higher-level domain 632.

There may be provided a method for communicating with MPMs 610 using a legacy MPM unaware memory controller (for example, the DDR controller 608) and/or an MPM memory controller (for example, the master controller, XMC 622).

The MPM controller 622 may communicate with the MPM 610 using a memory protocol and/or by using other means such as by using dedicated communication paths, by using a communication protocol that may be used to communicate with the computational resources (for example, the processing module 612), by using a data link layer communication channel 1100, by embedding or otherwise utilizing memory protocols for communicating with the processing resources (for example, the processing module 612) of the MPM 610, by using a communication protocol that may be used for communicating with both computational and memory resources of the MPM 610, by utilizing one or more dedicated ports or resources of the MPM 610 for communication, and the like.

In a case where multiple controllers and/or multiple levels of controllers are used, the controller domain 630 is at least a portion of a multi-layered module domain 1800. In this case, a module that is closest to the first controller is the initial module 1802, other modules are termed additional modules 1804. The modules that are closest to the processor subunits are termed last additional modules 1806. In the current figure, the initial module is the master controller 622, the additional modules are 1804-A, 1804-B, 1804-C, 1804-D, 1804-E, and 1804-F, and the last modules are 1804-E, and 1804-F. An example of an additional module is the H4 controller 1016.

There may be two, three, or more layers of modules. A module in the multi-layered module domain may differ from another module. For example, a module of one domain may differ from a module of another domain by traffic management resources and/or processing resources, and the like. The modules may be arranged in any manner than differs from a multi layered domain. There may be any number of modules per layer, including more than one initial module, one or more than two intermediate additional modules, more or less than eight last additional modules, and the like. One or more initial modules 1802 may be coupled to zero, one, or a plurality of additional (1804, 1806) modules. In a case where there are three or more levels of modules, the additional modules between the initial module(s) 1802 and the last module(s) 1806 are also referred to as intermediate modules. The intermediate modules are additional modules 1804 other than the last modules 1806. In the current figure, the intermediate modules are 1804-A, 1804-B, 1804-C, 1804-D.

There may be provided more than one first controller (initial module 1802), the first controller may be merged or integrated with any of the modules, and the like. There may be any connectivity between modules, any relationship of modules of different layers, and the like. The first controller may interface with the exterior of the MPM 610. There may be any connectivity between the first controller, one or more modules, the processor subunits, and memory banks. For example—one or more memory banks may be dedicated to and coupled via one or more buses to each processor subunit. Processor subunits may be coupled to each other.

One or more elements, such as MPMs 610 may be coupled to a given controller module, which in turn one or more of the given controller modules may be coupled to a given additional module.

Examples of processor subunit, controllers, and memory banks are illustrated in PCT patent application publication WO2019025862, and/or PCT patent application PCT/IB2019/001005.

The processor subunit and/or the first controller and/or the modules may be configured and/or programmed in any one of the following manners for example—in advance (for example during a boot process, after the boot process), once per time period, in response to an event, in bursts, not in runtime, in runtime, by a host entity, and the like. Examples of non-runtime programming is illustrated in PCT patent application publication WO2019025862, and PCT patent application PCT/IB2019/001005. For example—the processor subunit and/or the first controller and/or the any module may be configured and/or programmed by receiving one or more commands and/or related data (for example a neural network module) that should be executed during a certain time period or maybe programmed one command after the other.

Any memory bank and/or anyone of the first controller and/or any module may receive and store commands and/or related data aimed to another entity (for example the processor subunit) and then send the commands and/or related data to the entity. The first controller may receive and store commands and/or related data for the any module. The first module may receive and store one or more commands and/or related data for the second modules.

Refer to other portions of this description where there are provided methods for communicating between the memory banks, processor subunits, modules, the first controller, and other entities such as the memory controller.

Figure 19:
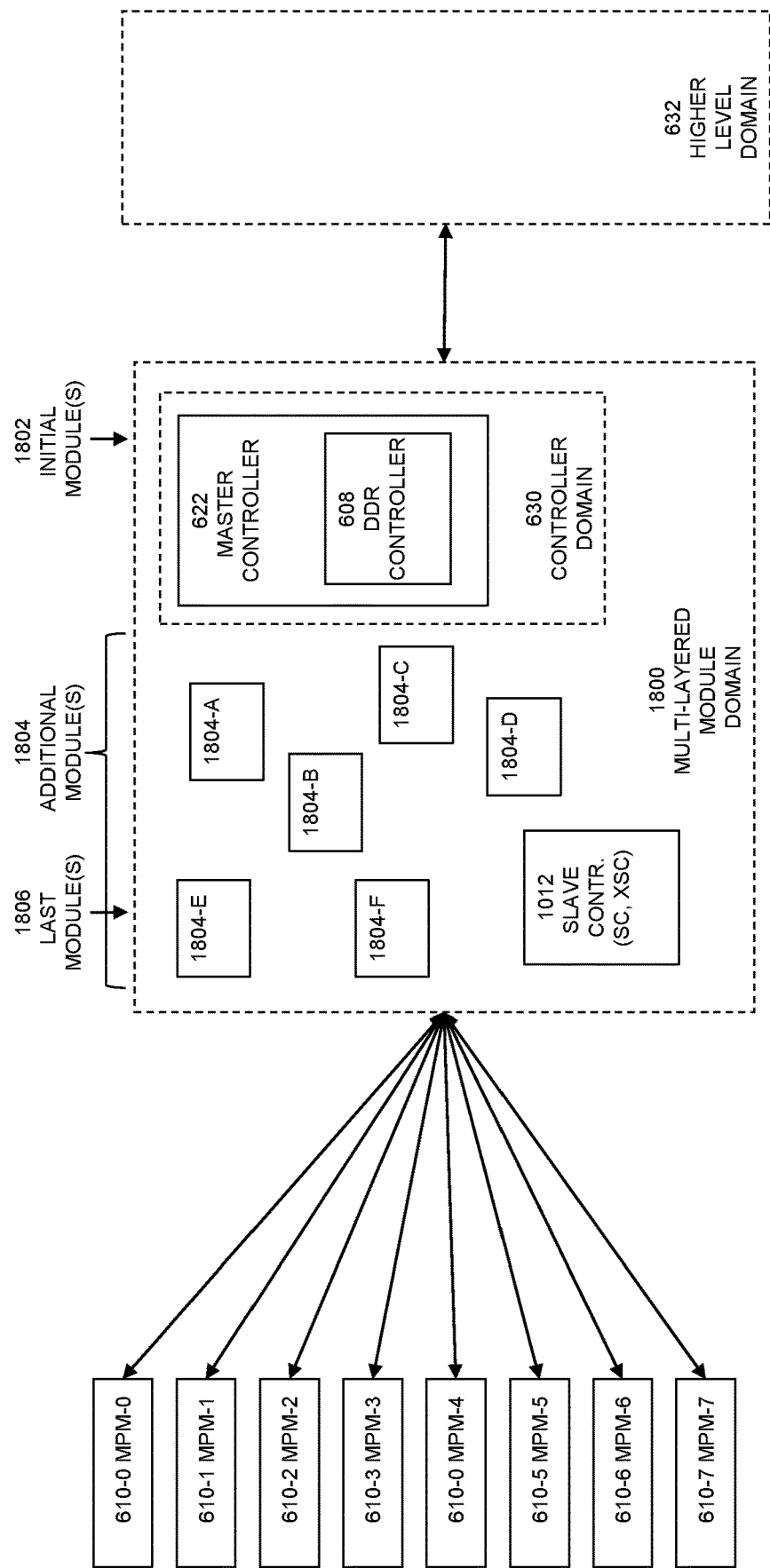
FIG. 19 provides a diagram of exemplary connectivity between controllers and memory processing units, according to exemplary disclosed embodiments.

Refer now to FIG. 19, a diagram of exemplary connectivity between controllers and memory processing units, including a slave controller. Similar to the description of FIG. 18, the multi-layered module domain 1800 may include controllers from the external element 1000 and the internal element (1010, 1110). For example, the slave controller (XSC, 1012) can be deployed as part of the multi-layered module domain 1800.

Figure 20:
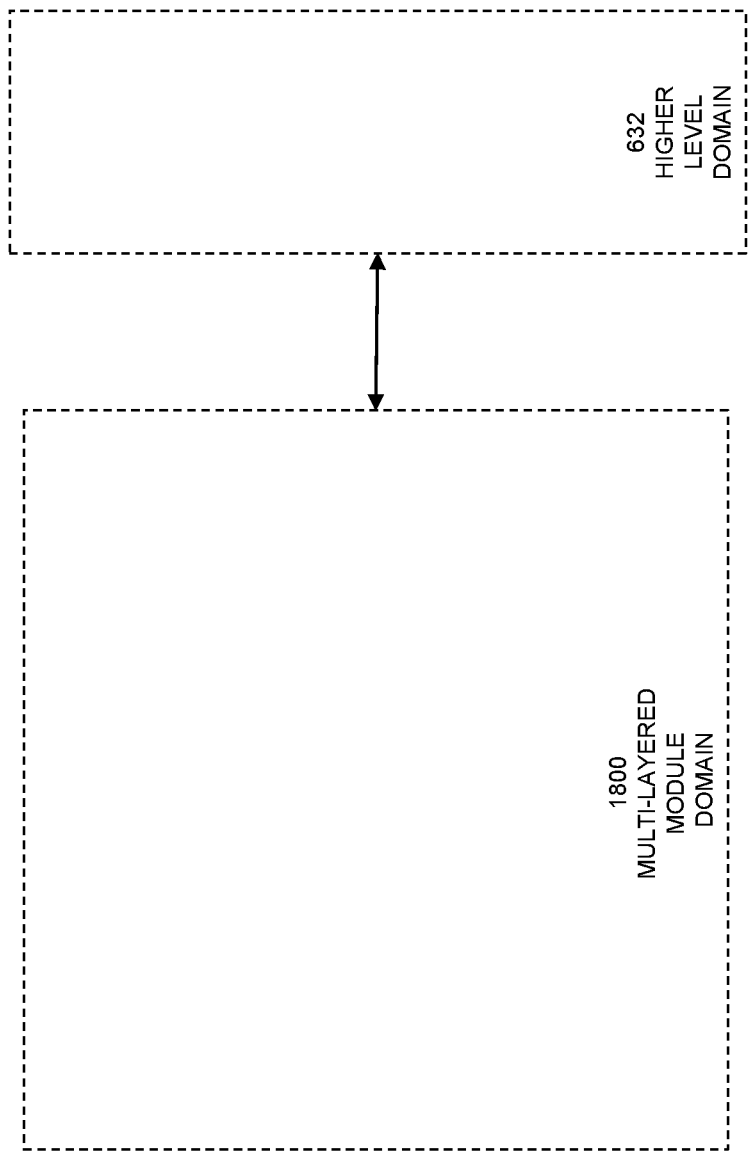
FIG. 20 provides a diagram of exemplary connectivity between a higher-level domain and a multi-layered domain, according to exemplary disclosed embodiments.

Refer now to FIG. 20, a diagram of connectivity between the higher-level domain 632 and the multi-layered domain 1800 is shown.

During operation of a computer system, various processors and/or system components may be configured (e.g., using commands such as CONFIG, etc.) to prepare the processors and/or other components for performing tasks or functions. In normal systems, there may be just one processor or a small number of processors and/or system components to be configured. In such cases, the configuration process may be completed quickly and without requiring significant computational resource or time.

In the case of a computational memory system, as disclosed herein, however, each included computational memory chip (e.g., XRAM 624) may include many processor subunits 612 that may be individually configured. For example, in the example of FIG. 6, an XRAM chip 624 may include 64 memory processing modules 610, each including a separate processor subunit 612. The computational memory system may further include 16 XRAM chips on an XDIMM 626, eight XDIMMs on an IMPU 628, and four IMPUs in an XPHIOS memory appliance 640. Thus, in some cases, the disclosed computational memory system may include more than 32,000 individually configurable processor subunits 612. Configuring such a large number of processors, especially using standard techniques, can consume significant bandwidth and can consume a significant amount of time and resources from the host computer (e.g., one or more CPUs 710 configured to interact with the XIPHOs appliances 640). Additionally, while in some cases, a configuration can be broadcast to multiple processing assets, such an approach assumes that each of the processing assets is to perform the same task. In the disclosed embodiments, one advantage that may result from the computational memory chip architecture is that one or many of the potentially thousands of processor subunits 612 included in a computational memory system may perform different tasks aimed at completing a higher level function associated with a configuration issued by a host computer. The disclosed architectures are aimed at solving this issue and taking advantage of the computing capabilities of the computational memory architectures. For example, in compile time or runtime, disclosed systems can use a master controller (e.g., master controller 622 to load configurations differently according to specific processing modules 612.

In some cases, configurations can be time sensitive, so delays in the configuration process may have negative consequences including, for example, reductions (some which may be significant and even debilitating) in system throughput.

Each of the processor subunits 612 may be configured to operate on data stored in one or more corresponding, dedicated memory banks 600. For example, a processor subunit 612 may include one or more arithmetic logic units (ALU) to operate on stored data. Each processor subunit 612 may also be associated with one or more memory controllers and various other supporting components.

Described in the sections below are techniques for configuring the processor subunits included in one or more memory processing modules 2150-2164 (or 610) of the described computational memory systems. While the disclosed techniques are described relative to the configuration of processor subunits included in the disclosed computational memory systems, the disclosed techniques may be used to configure other processor-based systems, especially computational systems including two or more processors. The disclosed techniques are targeted toward increasing efficiency of a configuration process in multi-processor systems. In some cases, the disclosed techniques may significantly reduce bandwidth consumption relative to one or more communication links between a host computer 710 and configurable processors, such as processor subunits 612. As a result, configuration time and configuration overhead may be reduced, leading to improved system processing performance.

At a general level, the disclosed configuration techniques may include a mapping between higher level configuration information (e.g., provided by host computer 710) and lower level configuration information that can be used to configure individual processor subunits 612. As described in detail below, one or more controllers, such as master controller 622, can receive the higher level configuration information from the host 710 and convert (or assist in the conversion of) that higher level configuration information to lower level configuration information, which can then be used to configure the processor subunits. In such a case, the master controller 622 may relieve a significant portion of the configuration burden from the host 710. The host 710 may still control the configuration process associated with the processor subunits 612, but that control can occur at a configuration function level. The master controller 622 and other components may provide a bridge between the configuration function level and the lower level configuration information used to accomplish the configuration of individual processor subunits 612. For example, the master controller 622 may be equipped to modify configurations according to run time values from previous configurations, thus avoiding back and forth communications with the master controller 622 and the host 710 between configurations.

Figure 21:
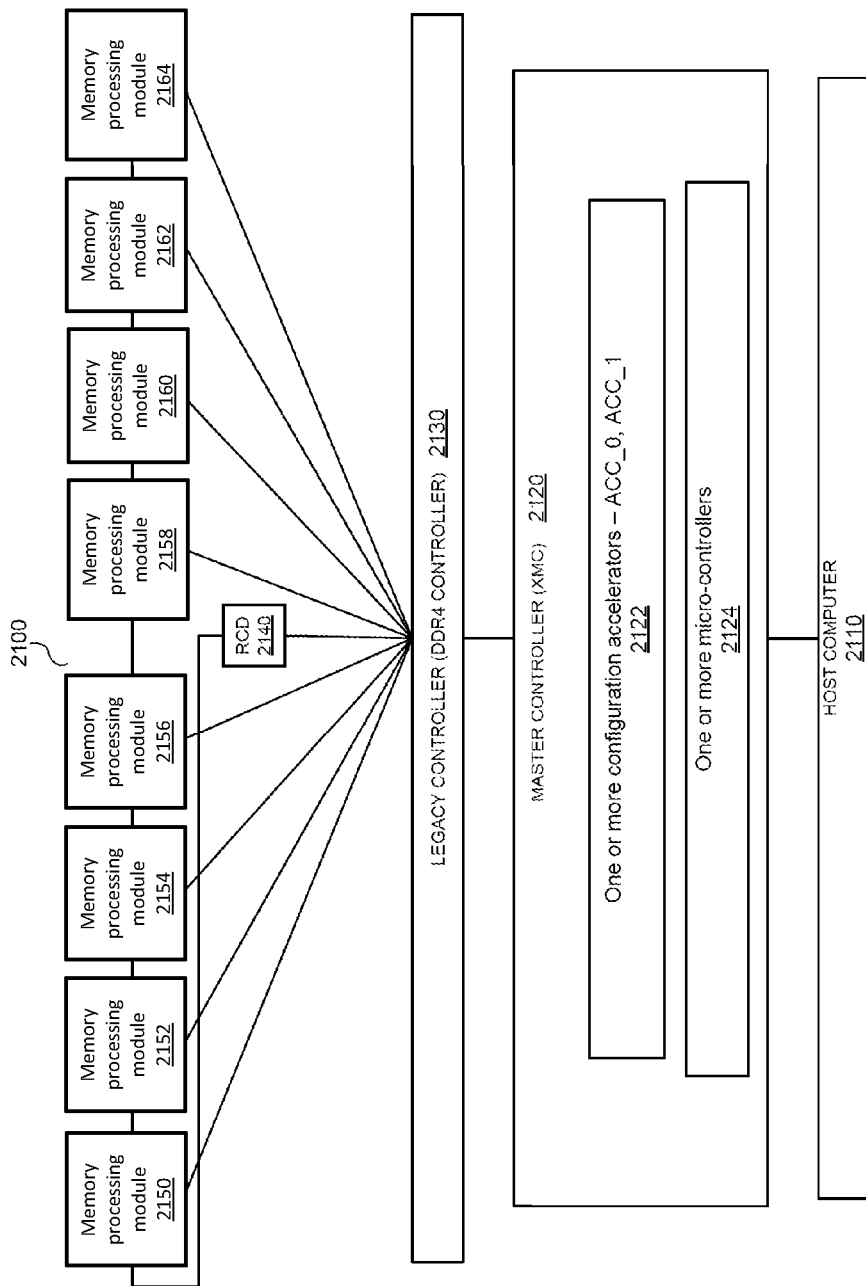
FIG. 21 provides a diagrammatic representation of a computational memory system, according to exemplary disclosed embodiments.

FIG. 21 provides a diagrammatic representation of a computational memory system, according to exemplary disclosed embodiments. For example, a computational memory system 2100 may include a host computer 2110, a master controller (XMC) 2120, 622, and a plurality of memory processing modules 2150 to 2164. In some cases, one or more additional controllers, such as a DDR4 controller 2130, 608 and/or an RCD controller 2140 may be included. The RCD controller may include a registering clock driver that takes a command address bus, control signals, and clock signals from a host memory controller and then fans those out to DRAM on the DIMM, referred to in this case as an RDIMM (registered DIMM). The computational memory system may also include a plurality of memory processing modules (MPMs) 2150-2164. These MPMs may be similar to or the same as MPMs 610 of FIG. 6. For example, each of the MPMs 2150-2164 may be included on a computational memory chip (e.g., XRAM chip 624), and each of the MPMs 2150-2164 may include a processor subunit 612 and one or more dedicated memory banks 600, such that the processor subunits and their corresponding one or more dedicated memory banks are formed on a common substrate associated with the computational memory chip. And as described above, the computational memory chip(s) including MPMs 2150-2164 may be included on an XDIMM 626, which may further be included on an IMPU 628, etc. In some cases, each of the processor subunits 612 associated with MPMs 2150-2164 may be configured according to a common configuration. In other cases, however, some or all the processor subunits 612 associated with MPMs 2150-2164 may be configured differently.

In operation, master controller 2120 may be configured to receive a configuration function from host 2110 (e.g., a host CPU, GPU, etc.) and convert the received configuration function into one or more lower level configuration functions for use in configuring any of the processor subunits associated with MPMs 2150-2164. The high level configuration function supplied by host 2110 may have various forms and/or formats. For example, such configuration functions may include one or more CONFIG functions, associated data, etc.

Master controller 2120 may use the one or more lower level configuration functions to configure (or to cause configuration of) one or more processor subunits 612 included among the MPMs 2150-2164, which may be included on one or more computational memory chips 624. Configuring the processor subunits 612 of one or more computational memory chips 624 in this way (e.g., by pre-loading the processor subunits with lower level configuration functions/information) may prepare the processor subunits to perform a function associated with the one or more lower level configuration functions.

Host 2110 may communicate the configuration function to the master controller 2130 at any suitable time. In some cases, host 2110 may generate a configuration function to be sent to the master controller (XMC) 2120 during an initialization process. Host 2110 may provide a different or updated configuration function at other times as well, including run-time, etc. For example, the processor subunits 612 may be configured according to the lower level configuration information during a boot process, after a boot process, at particular time intervals, in response to a triggering event, during burst periods, during runtime, etc. Examples of non-runtime programming is illustrated in PCT patent application publication WO2019025862, and PCT patent application PCT/IB2019/001005. Each processor subunit 612 may also be configured and/or programmed by receiving one or more commands and related data (for example a neural network module) to be executed during a certain time period or in response to receiving one or more commands to be programmed one command after another in series. A response of a processing subunit to a command may trigger a new command thus having a continuous stream of commands causing a second set of commands (for example, a hash join operation).

Host 2110 may communicate configuration functions directly to one or more components associated with the master controller 2120 or may provide the configuration functions via an intermediary device (e.g., a FIFO buffer) or another interface. The configuration functions supplied by the host 2110 may be associated with one or more applications running or configured to run on host 2110.

Master controller 2120 may be provided between a user application—or any other higher-level entity associated with host 2110—and the MPMs 2150-2164. In some cases, one or more additional controllers, such as a DDR4 controller 2130 and/or RCD controller 2140 may be provided between master controller 2120 and the MPMs.

The master controller may include various components to assist in converting the higher level configuration functions to lower level configuration information or functions. For example, in some cases, the master controller 2120 may include one or more configuration accelerators 2122 that participate in the conversion of configuration functions to low level configuration information. Such accelerators may be configured to operate in parallel to increase configuration throughput. In some cases, the accelerators may be allocated to particular MPMs among MPMs 2150-2164, particular computational memory chips 624, etc. The allocation may remain fixed or may change over time. Load balancing may be employed to balance the workload of the different configuration accelerators.

In addition to managing the conversion of the higher level configuration functions to lower level configuration information, master controller 2120 may also be configured to manage communications traffic among various components of the computational memory system. Such traffic may include communications between master controller 2120 and any of the DDR4 controller 2130, RCD 2140, MPMs 2150-2164. The controlled traffic may also include communications between processor subunits 612 and their dedicated memory banks 600. The controlled communications may include, e.g., data traffic (from an arithmetic logic unit (ALU)), register file reads, interrupts, etc.

Master controller 2120 may configure the processor subunits 612 in any suitable manner. In some cases, all processor subunits 612 in a computational memory system (e.g., across XRAM chips, XDIMMs, XIMPUs, etc.) may be similarly configured. In other cases, the processor subunits 612 associated with any component of the computational memory system (e.g., XIMPU, XDIMM, XRAM, etc.) may be commonly configured in common, where processor subunits associated with other subunits may be configured differently. Master controller 2120 may selectively configure any individual processor subunit 612, such that even processor subunits onboard the same XRAM chip 624 may share a common configuration or may be configured differently.

Figure 22:
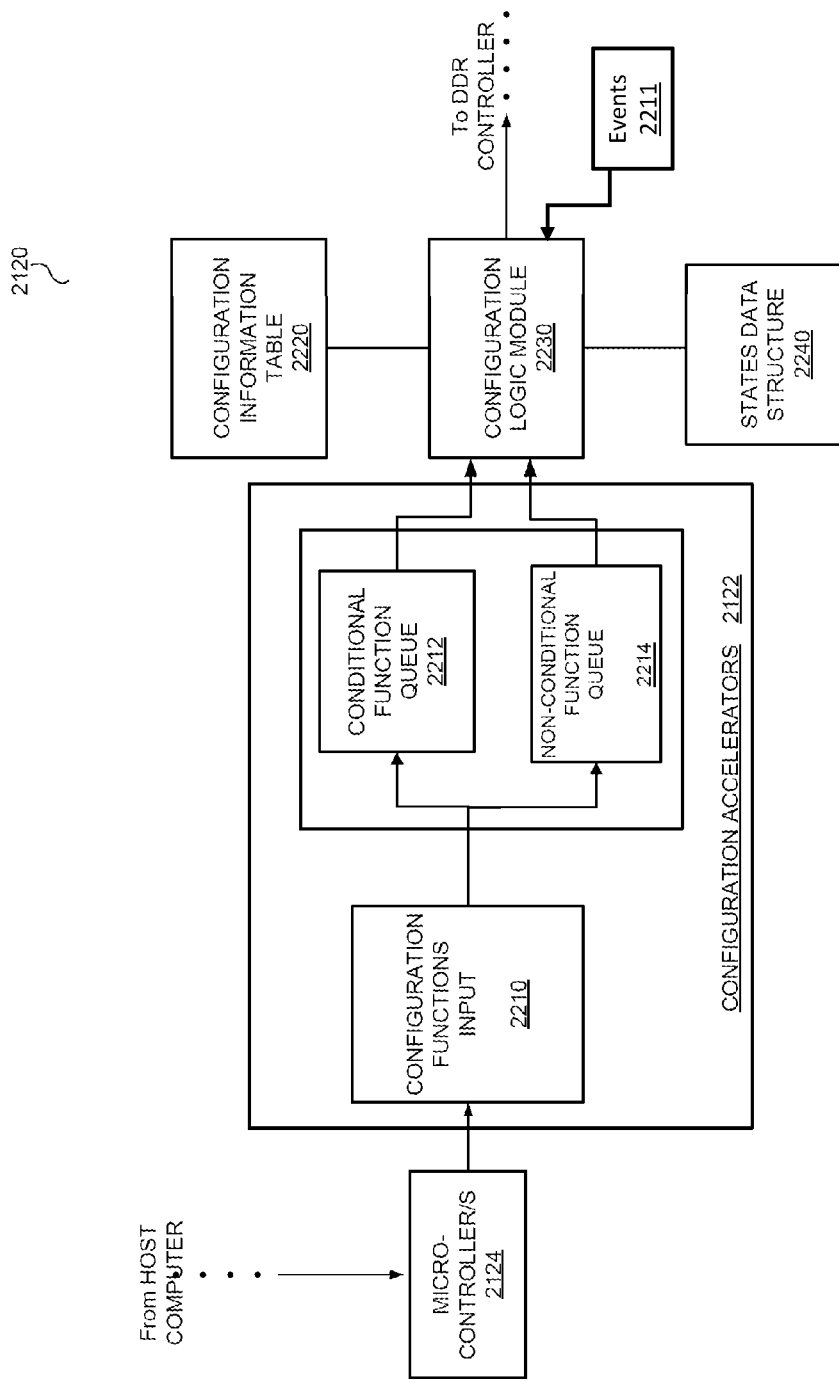
FIG. 22 provides a diagrammatic representation of a master controller, according to exemplary disclosed embodiments.

FIG. 22 provides a diagrammatic, more detailed representation of exemplary components included in one example of master controller 2120. As shown in FIG. 22, master controller 2120 may include one or more micro-controllers 2124 and one or more configuration function accelerators 2122. The configuration function accelerators 2122 may also include one or more microprocessors, FPGAs, other logic-based devices, etc. to assist in conversion of the configuration functions received from the host. Microprocessors associated with the configuration accelerators 2122 may be configured to operate in parallel.

Master controller 2120 may also include or have access to a configuration information table (CIT) 2220, a configuration logic module 2230, and a states data structure 2240. In some examples, the configuration function accelerators 2122, the configuration information table 2220, the configuration logic module 2230, and the states data structure 2240 may be integrated together. In other cases, one or more of these components may be provided as a separate component.

The one or more microcontrollers 2124 may be configured to receive configuration functions from the host computer and provide those configuration functions to the configuration accelerators 2122 via a configuration functions input 2210. The received instructions may be queued in a conditional function queue 2212 or a non-conditional function queue 2214. Functions included in the queues may be retrieved (e.g., by configuration logic module 2230) for conversion to lower level configuration information on a FIFO basis, for example.

Lower level configuration functions may be associated with one or more tasks or functions running (or to be run) on the host CPU. For example, as part of running a particular application or preparing to run a particular application on the host CPU, the host CPU may generate one or more higher level configuration functions associated with one or more general tasks to be completed by a computational memory system. As noted, master controller 2120 may convert the configuration functions from the host CPU into lower level configuration information/functions that prepare the processor subunits 612 of the computational memory system to perform one or more low level tasks aimed toward completion of the one or more general tasks requested by the host CPU. In some embodiments, configuring one or more MPMs 2150-2164 may include preparing one or more of the plurality of MPMs to perform a function associated with the one or more lower level configuration information/functions. The master controller 2120 may be adapted to configure different MPMs with different lower level configuration functions. Furthermore, the master controller 2120 may be adapted to configure different MPMs with similar lower level configuration functions to be executed at different times.

Conversion of the higher level configuration functions issued by the host to lower level configuration information/functions may be performed using any suitable technique. In some cases, one or more maps linking the higher level configurations functions to the lower level configuration functions may be employed. Configuration information table 2220 may provide such a mapping between the higher level and lower level configuration functions. For example, associated with various higher level configuration functions expected to be generated by the host CPU, configuration information table 2220 may store corresponding low-level configuration functions/information. Such low-level configuration information/functions may include configuration commands. In addition to specifying a command to be performed and including an operand to be used in executing the command, the configuration commands may also identify a particular destination for the command. For example, a configuration command may identify a particular MPM 610, particular processor subunit 612, and/or a higher level entity such as an XDIMM, XIMPU, etc. The configuration commands may also specify conditions that must be met before a process can proceed to a next step (e.g., execution of a subsequent command). The configuration commands may include parameter override, which instructs how to override the configuration command with kernel input parameters.

In the example of FIG. 22, a configuration logic module 2230 may assist in converting high level configuration functions to lower level configuration functions/information. For example, configuration logic module 2230 may retrieve a higher level function for conversion from either a conditional configuration function queue 2212 or from a non-conditional configuration function queue 2214 (depending on whether the higher level configuration function is associated with one or more conditions to be met during a corresponding task completion phase). For example, relative to conditional functions, the configuration logic module 2230 may check for completion of a condition associated with a conditional configuration function (e.g., based on an events input 2211). Conditions for a configuration may also result from the previous configuration (e.g. if a previous result larger than X, run conditional configuration). Such conditions being met may be a requirement before fetching a conditional configuration function from the conditional configuration function queue or before fetching a next conditional configuration function from the conditional configuration function queue.

The configuration logic module 2230 may also calculate addresses for fetching low-level configuration information from the configuration information table (CIT) 2220. Such addresses may represent or may be based on a mapping between host configuration functions and low-level configuration information. The mapping between a host configuration function and the corresponding low-level configuration information may include a parametrized mapping (using parameters) that allows changes to be made to the configuration function mappings. The host, for example, may update the configuration mappings from time to time.

The configuration logic module 2230 may also include a parameters override logic. In addition to converting higher level to lower level configuration functions, configuration logic 2230 may also access and/or manage a states data structure 2240 that may keep track of a current CIT address, and parameters loaded once when the kernel is loaded. Such parameters may be used both for conditions and parameters override logic.

After the configuration information (e.g., from CIT 2220) is retrieved, the host computer may manage the configuration of the overall system at a configuration function level (e.g., by issuing general configuration functions and allowing the master controller 2120 to implement those functions using appropriate lower level configuration functions/information drawn from CIT 2120. The host computer may cause dynamic changes in the configuration of one or more MPMs 2150-2164 by sending configuration functions to the master controller, which in turn converts each configuration function to the low level configuration functions provided to the one or more MPMs. The low level configuration functions may be executed by the MPMs during runtime.

A configuration function may or may not allow an execution of an independently executable kernel. A kernel is single execution context and is composed of one or more configurations. A configuration function may allow an execution of only a part of such kernel. Different kernels may be slightly different from one another and may require slightly different configurations. The difference may be represented by slight low-level configuration differences. In some cases, however, for some different kernels, low-level configuration information may be re-used.

Each low level configuration function may be stored at a specific address within CIT 2220. In response to a received (or fetched) configuration function, the configuration logic module 2230 may be configured to calculate one or more addresses included in the CIT 2220 based on the configuration function received from a host CPU. For example, a configuration function "A" may be associated with an application running on the host CPU. The configuration function A may be stored at an address "0000" of CIT 2220. During runtime, the configuration logic module 2230 may use an address calculator to calculate the address "0000" based on the fetched host configuration function. With the calculated address, the configuration logic can retrieve the configuration function "A" from CIT 2220, and the retrieved function can be sent to one or more appropriate MPMs 2150-2164.

In some cases, as noted, in addition to a configuration function address, CIT 2220 may also store one or more computational memory chip identifiers, function operands, conditions for executing a next configuration, and/or parameter override logic. The information stored in CIT 2220 may be used before or during execution of one or more configuration functions. The host CPU 2110 may be configured to update information stored in the CIT 2220.

As noted above, master controller 2120 may be configured to communicate the lower level configuration functions/information to XRAM chips 624, MPMs 2150-2164, or to processor subunits 612. In some cases, one or more additional controllers or components may be used to facilitate the configuration process. For example, a DDR4 controller 2130/608 or other type of legacy controller may serve one or more roles in the configuration process, such as serving as an intermediary for communications between the master controller 2120 and one or more slave controllers, such as slave controllers 613 or 623. Each MPM may include a slave controller 613 and a slave controller 623. Alternatively, a single slave controller 613 and a single slave controller 623 may be associated with each XRAM chip 624, to be shared by the MPMs disposed on the XRAM chip. In other cases, some MPMs on an XRAM chip may include dedicated slave controllers 613 and/or 623, while other MPMs on the same XRAM chip share slave controllers 613 and/or 623.

There may be provided a method for virtually opening a port, such as a DLL port for communications with the processor subunits via a communication stack that includes a physical layer and a data link layer. The data link layer may be used to send frames of different types including but not limited to frame control frames, information frames, unicast frames, multicast frames, broadcast frames and the like. In some cases, DDR4 controller 2130 may be responsible for the physical layer, while the master controller 2120 may be responsible for the data link layer. In some cases, the DDR4 controller 2130 may provide configuration information or functions to any of the MPMs using the DDR4 memory protocol (in a sense, treating the MPMs as memory banks).

More specifically, it may be beneficial to access processor subunits using a redirection scheme in which one or more redirect addresses are allocated in each memory bank, and packets aimed to any of the redirect addresses are not written to the memory bank, but rather are written to a virtual port (for example a DLL port) that is implemented by hardware implemented in the processor subunit domain—such as a FIFO. The hardware may include more than a single FIFO, may be dedicated to one of the processor subunits, may be shared between two or more processor subunits, or may be located outside any of the processor subunits, etc.

Thus, while the DDR4 controller treats an access request to the FIFO as an access request to a memory bank—(and applies all the timing constraints related to writing to a memory bank to such access)—the slave controller redirects the access request to the processing subunit. In some cases, it may be more effective to perform the access while virtually toggling between memory banks—as the latency associated with DDR4 writing to different banks is lower than the latency associated with writing content to different lines of the same memory bank. The processor subunits and/or components of the processor subunits (for example registers) can be associated with addresses that allow efficient access to the processor subunits and/or components of the processor subunits.

The processing subunits may manage different types of communication and/or use different types of frames. The different types of communication may include data, responses to a request to access a register, flow control traffic, and interrupts. The different types of communications may be managed by using different types of arbitrators, controllers, and/or different queues to provide a communication solution. A data link layer builder may generate and receive data link layer data structures such as frames, interrupt queue, registers that can be read, ALU, interrupt manager, ALU queue, credit unit for managing credits that may be used to control the traffic in the MPU, read response queue, and a processor subunit.

In some cases, as noted above, a configuration function may be a conditional function. To handles such cases, the master controller 2120 may include a configuration logic module 2230 configured to fetch the conditional function from the conditional function queue 2212 after completion of a process upon which the conditional function depends. For example, a process may depend on a predetermined system event (e.g., a hardware or software trigger or an interrupt), and the conditional configuration function may be fetched after detection of the system event. One or more indicators of the presence of an event, event condition, completion event, etc. may be provided to the configuration logic module 2230 by events input 2211. The configuration logic 2230 may also be configured to fetch the conditional function from the conditional function queue 2212 after completion of a task upon which the conditional function depends.

In some embodiments, a configuration function may include a non-conditional function and may be stored in the non-conditional function queue 2214. Non-conditional configuration functions may be used to configure one or more MPMs without conditions, such as dependence on the completion of one or more processes.

Figure 23:
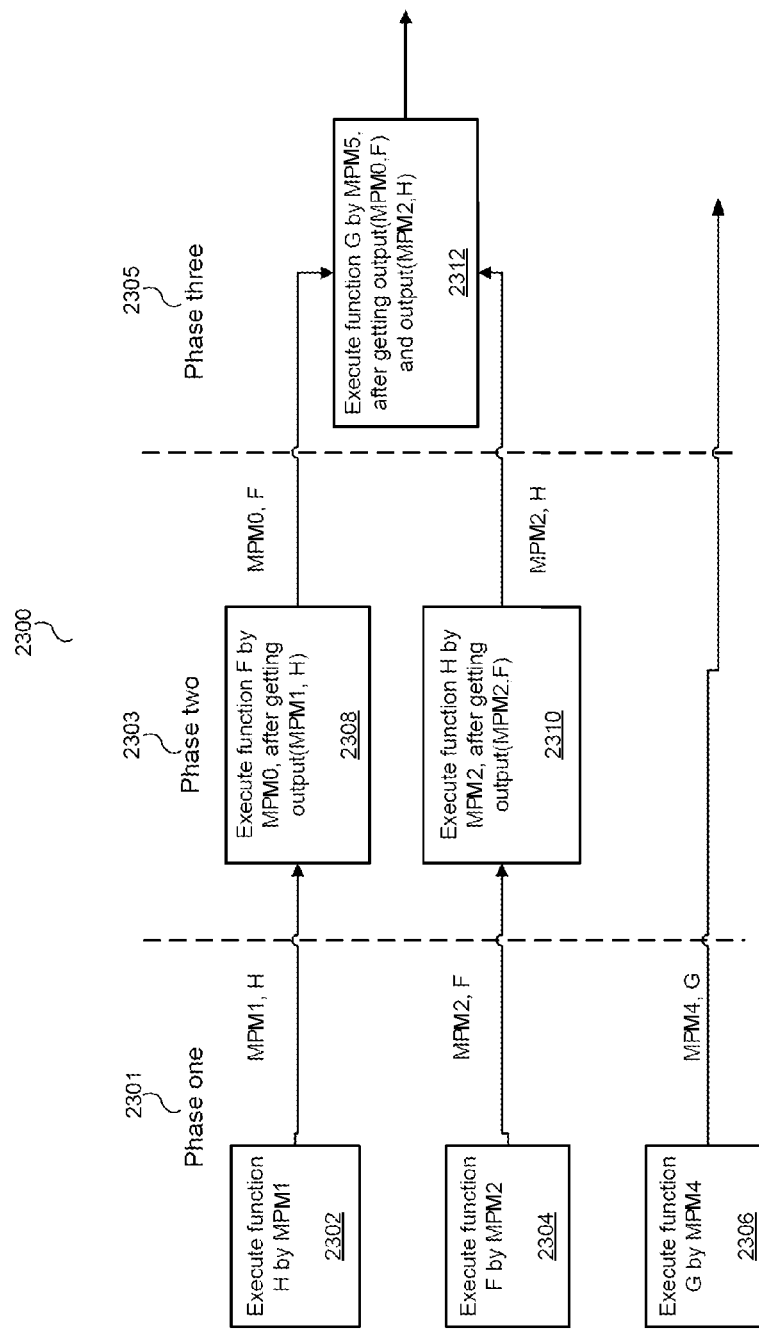
FIG. 23 provides a diagrammatic representation of configuration timing involving conditional configurations.

Master controller 2120 may also control the timing by which one or more processor subunits are configured. Such timing may be influenced, at least in part, by whether conditional configuration functions are required to enable one or more of the processor subunits to perform a particular task. FIG. 23 provides a diagrammatic representation of configuration timing 2300 involving conditional configurations. The configuration process of FIG. 23 includes three phases. During a first phase 2301, an MPM1 is configured by a configuration function H and then executes a related process to provide an output (i.e., Output(MPM1,H)) related to function H (2302). Also in first phase 2301, an MPM2 is configured by a configuration function F and then executes a related process to provide an output (i.e., Output(MPM2, F)) related to function F (2304). Further, in first phase 2301, an MPM4 is configured by a configuration function G and then executes a related process to provide an output (i.e., Output(MPM4,G)) related to function G (2306).

During a second phase 2303, an MPM0 is configured by configuration function F after receiving output(MPM1,H) and then executes a related process to provide an output (i.e., Output(MPM0,F)) related to function F (2308). Also in second phase 2303, an MPM2 is configured by configuration function H after receiving output(MPM2,F) and then executes a related process to provide an output (i.e., Output (MPM2,H)) related to function H (2310).

During a third phase 2305, an MPM5 is configured by configuration function G after receiving output(MPM0,F) and output(MPM2,H) and then executes a related process to provide an output (i.e., Output(MPM5,G)) related to function G (2312).

Figure 25:
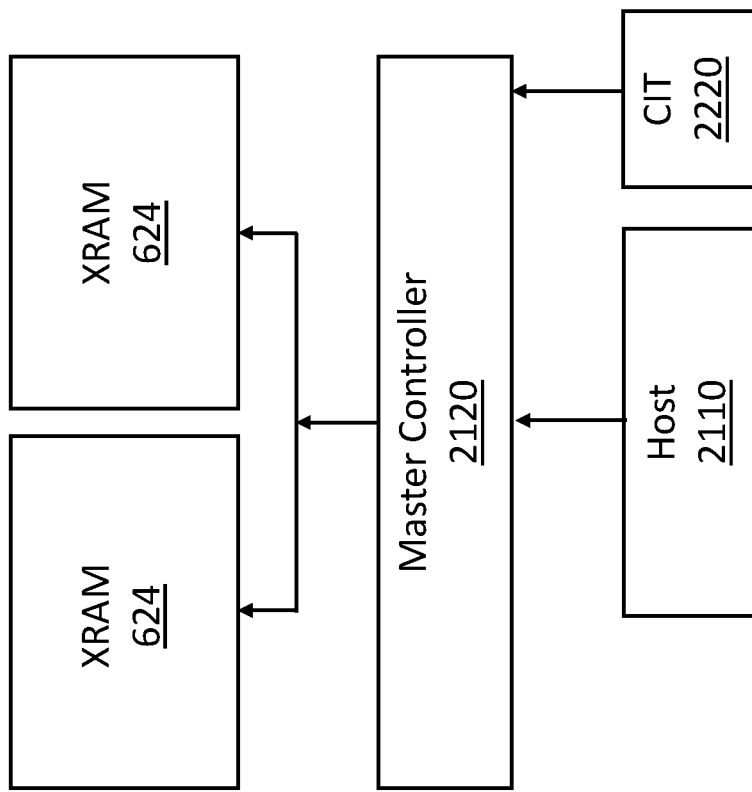
FIG. 25 provides a diagrammatic representation of a multi-casting configuration arrangement, according to exemplary disclosed embodiments.
Figure 24:
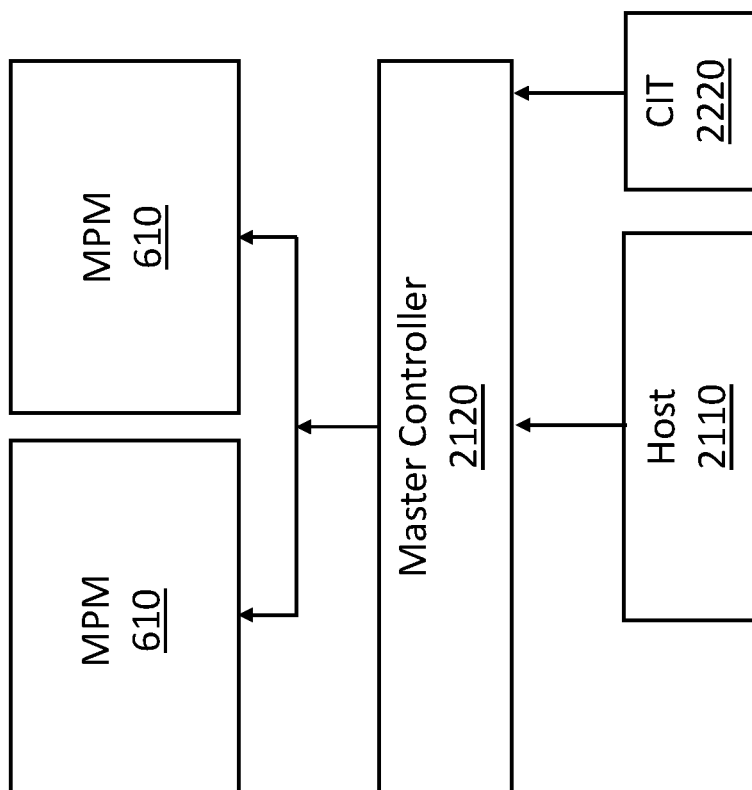
FIG. 24 provides a diagrammatic representation of a multi-casting configuration arrangement, according to exemplary disclosed embodiments.

In some cases, rather than individually configuring one or more processor subunits, master controller 2120 may be configured to multicast a configuration function or information to multiple processor subunits, such that all of the multiple processor subunits are similarly configured. The multiple processor subunits may include any group of processor subunits in a single XRAM chip or spanning across multiple XRAM chips within a computational memory system including multiple XIPHOS memory appliances. In such cases, master controller 2120 can receive a configuration function generated by a host CPU and, in turn, multicast the configuration function to two or more of the plurality of processor subunits. For example, as shown in FIG. 24, master controller 2120 may receive a configuration function from host 2110, reference the CIT 2220 to convert the received configuration function to lower level configuration functions/information, and multi-cast the lower level configuration functions/information to two or more MPMs 610, each including a processor subunit 612. In another example, as shown in FIG. 25, master controller 2120 may receive a configuration function from host 2110, reference the CIT 2220 to convert the received configuration function to lower level configuration functions/information, and multi-cast the lower level configuration functions/information to two or more XRAM chips 624 and, in turn, to the MPMs 610 (and associated processor subunits 612) included in each XRAM chip.

In some cases, the multicast configuration functions may be converted to one or more low level configuration functions prior to multicasting. In other cases, however, it is the configuration function issued by the host that is multicast without conversion. Such multicasting can still relieve the host of a significant configuration burden, especially when a large number (e.g., 10, 100, 1000, 10000, etc.) processor units are involved.

The multicasting master controller 2130 may be located onboard a computational memory chip (e.g., XRAM chip 624) or may be located external to the computational memory chips. Additionally, the multicasting master controller 2130 may include a field programmable gate array and may include one or more sub-controllers, such as a DDR controller.

In some cases, a multicasting configuration system may include at least one configuration processor adapted to configure at least a first processor subunit among a plurality of processor subunits. This configuration may be based on an output generated by at least a second processor subunit among the plurality of processor subunits. The at least one configuration processor may be located onboard a computational memory chip or may be located external to the at least one computational memory chip.

In some embodiments, the various systems described herein may be implemented in association with computational memory operations performed on feature vectors. As used herein, a feature vector may include a series of values (e.g., numbers) representative of an object, condition, state, etc. In some embodiments, a plurality of feature vectors may be represented in an embedding table. For example, in machine learning or other applications, an embedding table of feature vectors may be used to reduce the dimensionality of a sparse vector. As used herein, a sparse vector may refer to any vector for representing data that includes at least one zero-value entry. In some embodiments, the sparse vector may be represented by a sparse vector indicator, which may include any information used to represent a sparse vector. These sparse vectors typically store data in an inefficient manner as a large number of zero-value elements are often required to represent data. As a result, performing operations using these sparse vectors can require significant computational bandwidth due to their size. In some embodiments, an embedding table, which may include a plurality of feature vectors, may be used to reduce the dimensionality of a sparse vector. To perform this reduction, relevant feature vectors may be summed to generate an output feature vector, which may represent information from the sparse vector in a more efficient manner.

Using conventional systems and methods, various inefficiencies may exist associated with dimensionality reduction operations due to the configuration of processing and memory storage elements. For example, depending on the application, embedding tables may include a relatively large number of elements, which may need to be stored and accessed by a processor. Accordingly, to perform the dimensionality reduction operations described above, intensive summing operations may be required. The bandwidth limitations between the memory device storing the embedding table and the processing device performing the operations may therefore limit the speed and efficiency when performing the dimensionality reductions.

The disclosed embodiments may resolve these and other technical problems by storing embedding tables in memory banks of one or more memory processing modules (MPMs), as described above. Each MPM may include multiple memory banks and multiple processor subunits, as well as one or more controllers and/or modules to control the MPM, manage traffic to and from the MPM, and manage traffic to and from the memory banks and/or the multiple processor sub-units. In some embodiments, the processor subunits, the controllers, and/or the modules may be arranged in a hierarchical manner such that the processor subunits have the most processing power and may perform more significant bandwidth reduction. For example, the processing subunits may be configured to perform reduction operations between parts of feature vectors and/or between results of processing feature vectors. In some embodiments, it may further be beneficial to store the same segments of different feature vectors of an embedding table in a sequential manner in one or more memory banks. Accordingly, processor subunits may be assigned computing operations associated with specific subsets of feature vectors, and the relevant subsets of feature vector elements may be stored in memory banks associated with those subunits.

Figure 26:
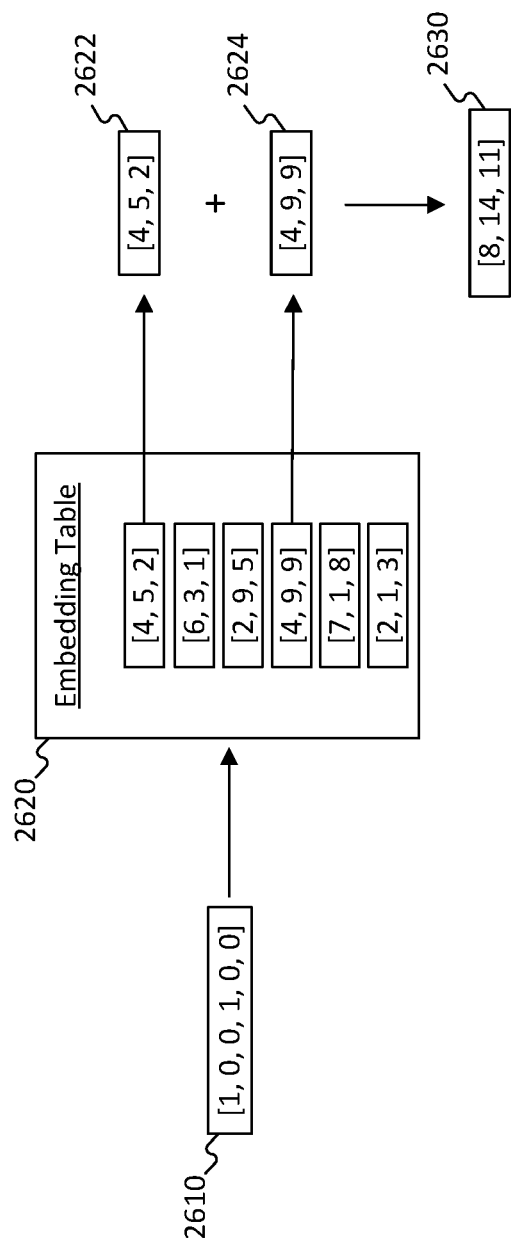
FIG. 26 illustrates an example dimensionality reduction process that may be performed on a sparse vector, consistent with the disclosed embodiments.

FIG. 26 illustrates an example dimensionality reduction process that may be performed on a sparse vector, consistent with the disclosed embodiments. As described generally above, an embedding table 2620 may be used to reduce the dimensionality of a sparse vector 2610. As shown, sparse vector 2610 may include a plurality of elements. In this example, sparse vector 2610 may include six elements, which may be represented as 1's and 0's. Depending on the application, each element position may represent a variable and the value of the element may represent a property for the variable. As one example, sparse vector 2610 may represent information about the gender and nationality of an individual, which may be represented by a sparse vector associated with the following six variables: [male, female, U.S., Israel, China, Canada], where the sparse vector 2610 (i.e., {1, 0, 0, 1, 0, 0}) may indicate that an individual is a male citizen of Israel. While sparse vector 2610 is provided as an illustrative example, it is to be understood that various other forms of sparse vectors may be used consistent with the disclosed embodiments. For example, in some embodiments, sparse vectors may be much larger and may represent countless other types of data.

Embedding table 2620 may include a plurality of feature vectors, such as feature vectors 2622 and 2624. In this example, embedding table 2620 may include 6 feature vectors, each having 3 elements. In the current example, the feature vector 2622 corresponds to "male" and has an exemplary value of [4, 5, 2]. The feature vector 2624 corresponds to "Israel" and has a value of [4, 9, 9]. These feature vectors may be used to reduce the dimensionality of sparse vector 2610 and may be generated in various ways. For example, a machine learning model may be trained to recognize inputs in the form of sparse vectors and output representative feature vectors, such as those included in embedding table 2620. The feature vectors included in an embedding table may then be used, for example, to reduce the dimensionality of an input sparse vector (e.g., sparse vector 2610) by summing feature vectors from the embedding table implicated by non-zero values in the sparse vector.

In the example of FIG. 26, sparse vector 2610 includes non-zero values at indices 1 and 4. The sparse vector input may signal to a dimensionality reduction system to sum together feature vectors 1 (feature vector 2622) and 4 (feature vector 2624) to provide a dimensionality reduced output vector 2630

The vector summation may be performed on an element-by-element basis such that output vector 2630 has the same dimensionality as feature vectors 2622 and 2624. In particular, the first element of feature vector 2622 may be added to the first element of feature vector 2624 to generate the first element of output vector 2630 (in this example, adding 4+4 to get a first element of 8), and so on. Accordingly, the resulting output vector 2630 may be a representation of sparse vector 2610 with a reduced dimensionality. Output vector 2630 may then be used to perform calculations more efficiently than if sparse vector 2610 were used.

It is to be understood that the dimensionality reduction technique illustrated in FIG. 26 is provided by way of example. One skilled in the art would recognize that various other formats or types of sparse vectors, embedding tables, feature vector operations, and output vectors may be used, and the disclosed embodiments are not limited to any of the examples provided herein. In some embodiments, sparse vectors and/or embedding tables with significantly higher dimensionalities may be used, which may present challenges in memory and processing bandwidth using traditional computation devices, as described above. Further, it is to be understood that the disclosed methods may equally apply to other operations performed using stored feature vectors and the disclosed embodiments are not limited to dimensionality reduction operations.

Figure 27:
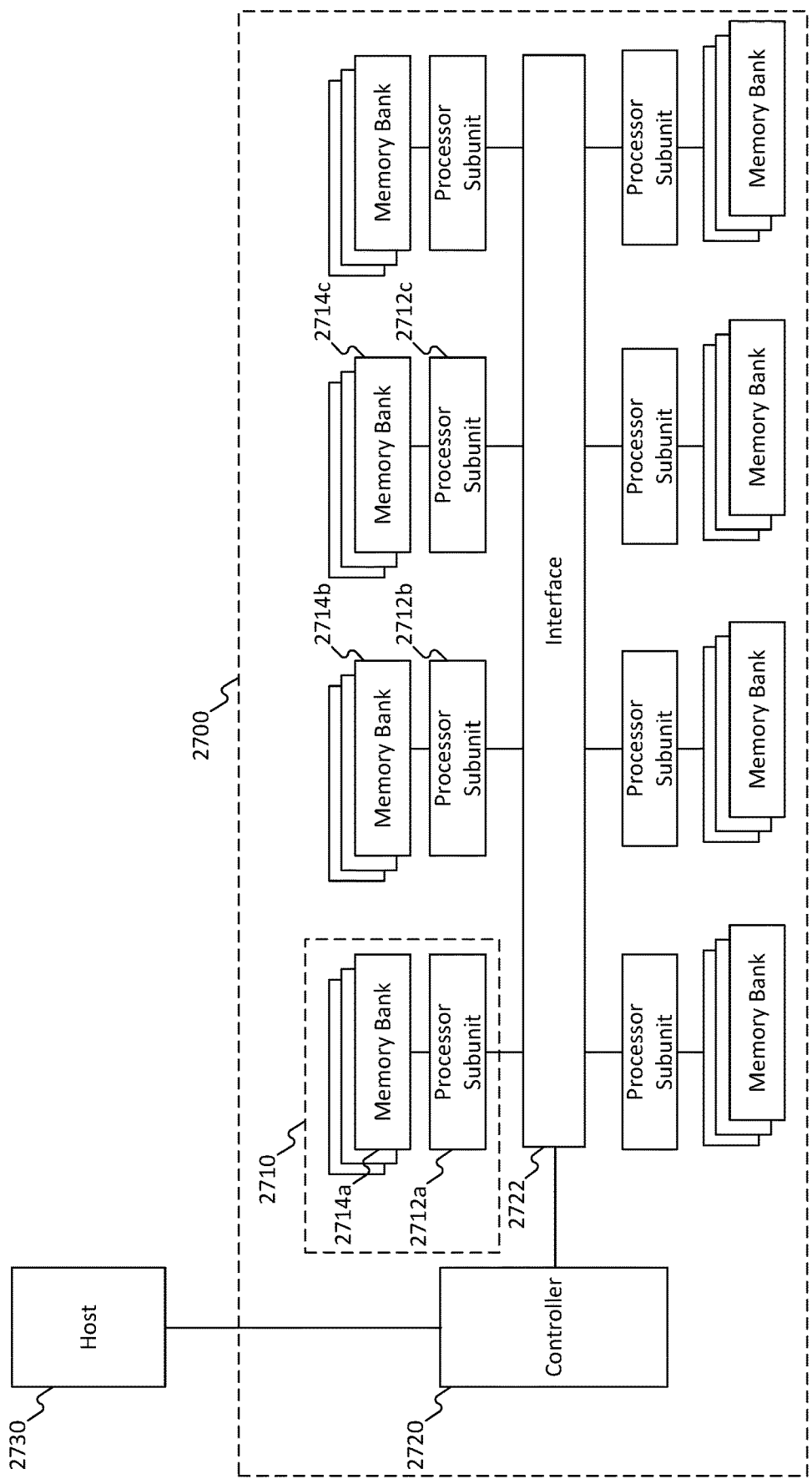
FIG. 27 is a diagrammatic illustration of an example computational memory system including a computational memory chip, consistent with the disclosed embodiments.

The disclosed embodiments may provide, among other benefits, improved speed, efficiency, and power consumption for performing dimensionality reductions or other operations involving stored feature vectors. For example, a computational memory chip may be used to store and process one or more feature vector elements of an embedding table. FIG. 27 is a diagrammatic illustration of an example computational memory system including a computational memory chip 2700 (for example, the XRAM 624), consistent with the disclosed embodiments. Computational memory chip 2700 may be configured to receive a sparse vector indicator and generate one or more vector sums using stored embedding table data. For example, computational memory chip 2700 may receive the sparse vector indicator from a host 2730, which may be disposed external to computational memory chip 2700. In some embodiments, host 2730 may be a processing device, which may provide the sparse vector (or a sparse vector indicator) to computational memory chip 2700 to perform operations involving the embedding table. For example, host 2730 may be a central processing unit (CPU), a graphics processing unit (GPU), a vision processing unit (VPU), a tensor processing unit (TPU), a neural processing unit (NPU), an image signal processor (ISP), a field-programmable gate array (FPGA), or various other forms of processors and may use computational memory chip 2700 for completing at least a portion of a dimensionality reduction process. In some embodiments, host 2730 may correspond to host 710 described above. In response to receiving the sparse vector indicator, computational memory chip 2700 may generate one or more vector sums and provide them to host 2730. In some embodiments, a sparse vector associated with the sparse vector indicator may have a dimensionality higher than any of the one or more vector sums.

As noted above, a sparse vector indicator may include any information used to represent a sparse vector. In some embodiments, the sparse vector indicator may be a sparse vector. For example, the sparse vector indicator may be a vector including one or more zero values and one or more non-zero values, similar to sparse vector 2610. Alternatively or additionally, the sparse vector indicator may be another form of data used represent a sparse vector. For example, the sparse vector indicator may be a set of indices corresponding to non-zero values in an associated sparse vector. Using the example from FIG. 26, a sparse vector indicator representing sparse vector 2610 may be a set of indices 1 and 4, which may indicate that the first and fourth elements of sparse vector 2610 include non-zero values. Various other suitable forms of sparse vector indicators may be used consistent with the disclosed embodiments.

Computational memory chip 2700 may include one or more processor subunits and one or more memory banks, which may be formed on a common substrate. For example, computational memory chip 2700 may include various processor subunits 2712a, 2712b, and 2712c, and various memory banks 2714a, 2714b, and 2714c, as shown in FIG. 27. In some embodiments, each processor subunit among the one or more processor subunits may be associated with one or more dedicated memory banks from among the one or more memory banks. For example, computational memory chip 2700 may include various memory processing modules, such as memory processing module 2710, which may include processor subunit 2712a and memory bank 2714a. In some embodiments, computational memory chip 2700 may correspond to XRAM chip 624 described above. Accordingly, memory bank 2714a may correspond to one or more of memory banks 600 and processor subunit may correspond to processing module 612 described above. Any of the various features or embodiments described above with respect to XRAM chip 624, or its various associated components, may equally apply to computational memory chip 2700, and vice versa.

In some embodiments, computational memory chip 2700 may include a controller 2720 (which may correspond to slave controller 613 or various other controllers described herein). Controller 2720 may be configured to facilitate communications between computational memory chip 2700 and host 2730, between computational memory chip 2700 and other computational memory chips (e.g., within one or more dual in-line memory modules, such as DIMM 626 described above), between various processing subunits, or various other elements described herein. In some embodiments, controller 2720 may be configured to receive the sparse vector indication (or a portion of a sparse vector indication) and facilitate processing of the sparse vector indicator by the various processing subunits, such as processing subunits 2712a, 2712b, and 2712c. Further, controller 2720 may be configured to acquire one or more generated vector sums and provide the acquired one or more generated vector sums to the host external to the computational memory chip. While controller 2720 is shown as being included in computational memory chip 2710, it is to be understood that various other arrangements may be used, including those described above. For example, the disclosed systems may include a plurality of computational memory chips configured to generate the one or more vector sums. Accordingly, the system may include one or more controllers (e.g., master controller 622 and/or DDR controller 608) configured to perform the various operations described above with respect to controller 2720 across multiple computational memory chips. Computational memory chip 2710 may further include an interface 2722, which may include any structure allowing transfer of data and other information among processor subunits and/or between processor subunits and one or more controllers.

Computational memory chip 2710 may be configured to generate one or more vector sums based on a stored embedding table. Accordingly, computational memory chip 2710 may store one or more portions of an embedding table in the one or more memory banks (e.g., memory banks 2714a, 2714b, 2714c, etc.). In some embodiments, two or more computational memory chips 2710 may be used to generate vector sums. Accordingly, the embedding table may be stored across a plurality of memory banks included in each of the two or more computational memory chips. The one or more processor subunits (e.g., processor subunits 2712a, 2712b, 2712c, etc.) may be configured to receive the sparse vector indicator from the host external to the at least one computational memory chip and, based on the received sparse vector indicator and the one or more portions of the embedding table, generate one or more vector sums.

As used herein, a vector sum may include any result of one or more summation operations performed with respect to elements of one or more feature vectors. In some embodiments, the vector sums may be a complete result of a dimensionality reduction of a sparse vector. For example, a vector sum may correspond to an output vector, such as output vector 2630 described above. Accordingly, the one or more vector sums may constitute a complete sum of full feature vectors included in the embedding table. The full feature vectors summed together may be identified in the embedding table based on the sparse vector indicator, as described above with respect to FIG. 26. In some embodiments, the one or more vector sums may be represented by an output from a single processor subunit among the plurality of processor subunits. Alternatively or additionally, the one or more vector sums may be represented by output from two or more processor subunits among the plurality of processor subunits. Further, the processor subunits may not necessarily be on the same computational memory chip. For example, the one or more vector sums may be represented by output from two or more processor subunits included on different computational memory chips among a plurality of computational memory chips. Accordingly, the one or more vector sums may be combined in various ways to generate the output vector.

In some embodiments, the one or more vector sums may refer to portions of summations, such as partial sums of full feature vectors, complete sums of partial feature vectors, partial sums of partial feature vectors, or any other partial summation, which may be combined or further summed with other vector sums to form output vector 2630. This additional combination or summation may be performed by host 2730 or may be performed by one or more controllers prior to providing the vector sums to host 2730.

In embodiments where the vector sums constitute partial sums of full feature vectors included in the embedding table (e.g., a summation of all elements of only a portion of the feature vectors), the full feature vector sums may need to be added to other full feature vector sums. For example, if a sparse vector indicator indicates that four feature vector sums should be added together, a vector sum may include sums of the entire first two feature vectors, which may need to be added together with a sum of the entire second two feature vectors. In other words, the one or more vector sums may include a plurality of intermediate summations, and each of the plurality of intermediate summations may represent a summation of a subset of feature vectors in the embedding table implicated by the sparse vector indicator. Accordingly, host 2730 may append or concatenate multiple vector sums to create an output vector.

In some embodiments, the vector sums may include complete summations of partial feature vectors. For example, the vector sum may represent a summation of a first segment (i.e., the first L elements, as described below) of the feature vectors, which may need to be further summed with the first segment of one or more additional feature vectors to generate a summation of a first segment of the feature vectors. This summation may then need to be combined (e.g., concatenated) with summations of additional segments of feature vectors to produce the full output vector. As another example, the vector sums may only be a partial summation of a segment of the feature vectors. In other words, the one or more vector sums may include a plurality of intermediate summations, wherein each of the plurality of intermediate summations represents a summation of partial feature vectors in the embedding table implicated by the sparse vector indicator. Accordingly, the vector sums may then be added with other partial summations of partial feature vectors. The resulting summation of partial feature vectors may then be concatenated with other summations of partial feature vectors to generate the output vector.

Accordingly, the vector sums described herein may refer to any form of summation, whether they include a full summation or intermediate summation of one or more partial or full feature vectors. The vector sum may then be combined with various other vector sums, if needed, to produce a full output vector. Further, the vector sum may refer to an output from a single processor subunit, or a combination of outputs from a plurality of processor subunits, which may or may not be included on the same computational memory chip.

In some embodiments, the embedding table may be stored in a manner to efficiently distribute summation operations among the plurality of processor subunits. For example, a particular processor subunit may be assigned to sum together particular elements of particular feature vectors. Accordingly, it may be beneficial to store those particular elements in a memory bank associated with the processor subunit. Further, it may be beneficial to store other portions of the embedding table in other locations, such that the processor subunit may does need to access feature vector elements relevant to its assigned task, which may improve or maximize the efficiency for the particular processor subunit. This may be repeated across all processor subunits on one or more computational memory chips to increase the efficiency of the system as a whole.

Figure 28A:
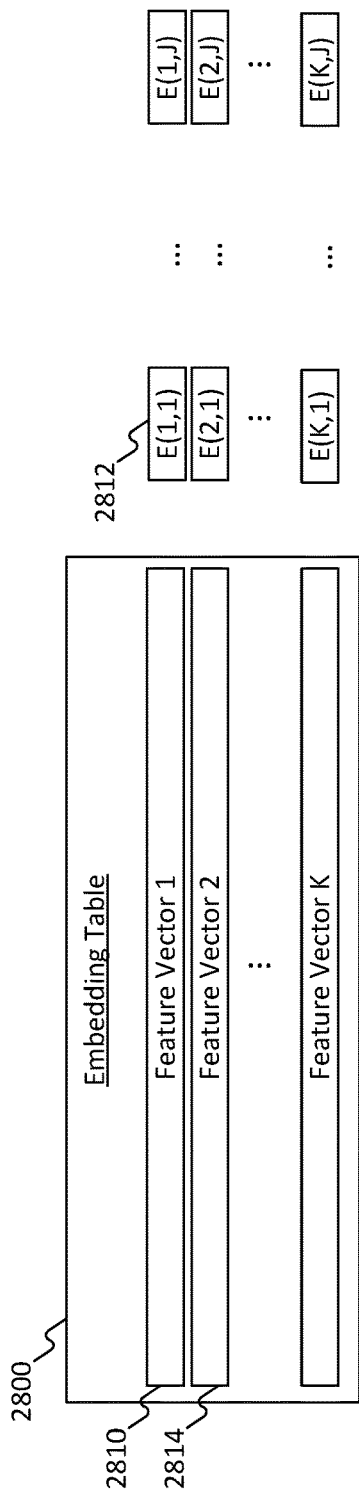
FIG. 28A is an illustration of an example embedding table, consistent with the disclosed embodiments.
Figure 28B:
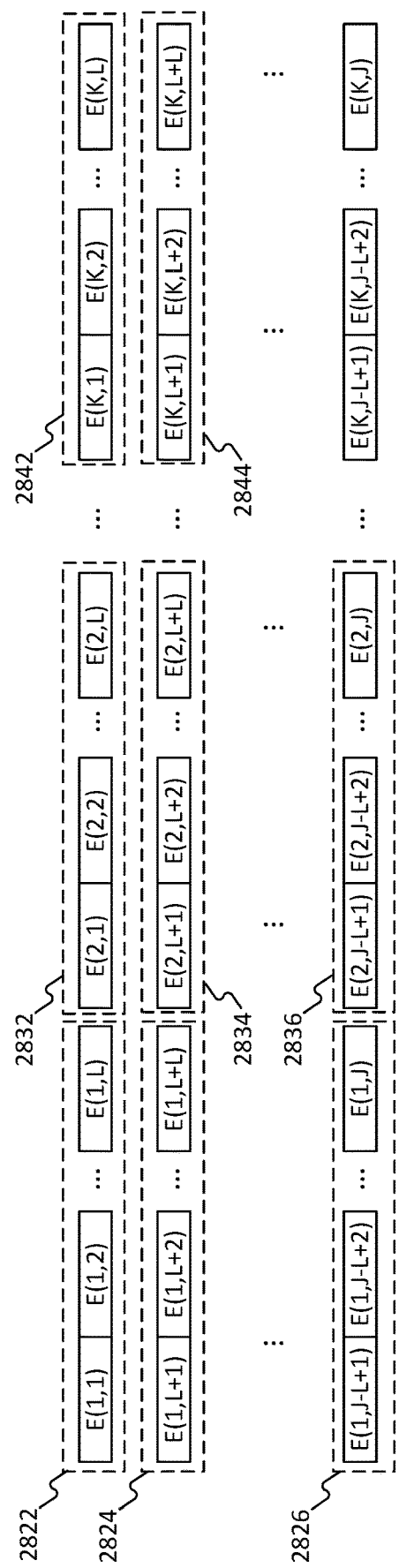
FIG. 28B illustrates an example segmentation of feature vectors, consistent with the disclosed embodiments.

FIGS. 28A and 28B illustrate an example segmentation of feature vectors within an embedding table 2800 (2620), consistent with the disclosed embodiments. In particular, as shown in FIG. 28A, embedding table 2800 may include a plurality of feature vectors 1-K, where K is the number of feature vectors included in embedding table 2800. Further, each of the feature vectors may include J elements. For example, feature vector 2810 (which in this case may correspond to "Feature Vector 1") may include an element 2812 represented as E(1,1) indicating it is the first element of the first feature vector. Feature vector 2810 may have J elements, E(1,1)-E(1,J). Accordingly embedding table 2800 may have a dimensionality of J×K elements.

In some embodiments, elements of embedding table 2800 may be stored in different locations based on which processor subunit will process the elements. In other words, the one or more processor subunits and the one or more memory banks of the at least one computational memory chip may be arranged into a plurality of computational memory groups. Each computational memory group may include at least one processor subunit and one or more of the memory banks dedicated to the at least one processor subunit and may be configured to store a different sub-portion of the one or more portions of the embedding table. The sub-portions may be allocated in various ways. In some embodiments, the sub-portions may represent at least one complete feature vector from the embedding table. Accordingly, one or more full feature vectors, such as feature vector 2810 may be stored sequentially in a memory bank. Alternatively, the various feature vectors may be split apart and the sub-portions may represent at least one partial feature vector from the embedding table. In other words, the feature vectors may be stored non-sequentially in the one or more memory banks.

FIG. 28B illustrates an example segmentation of feature vectors 1-K, consistent with the disclosed embodiments. Rather than storing elements 1-J of a given feature vector sequentially, each feature vector may be broken into segments of length L, where L is the number of elements included in a segment. For example, this may include breaking feature vector 2810 into a first segment 2822, a second segment 2824, and several other segments through to a last segment 2826, each of which has a length of L elements. Similarly, a second feature vector 2814, which may be a feature vector subsequent to feature vector 2810 in embedding table 2800, may be broken into a first segment 2832, a second segment 2834, and several other segments through to a last segment 2836, each having a length of L elements, as shown. The same may be performed for each feature vector through feature vector K of embedding table 2800. The first segments of each of the feature vectors of embedding table K (which, in this example include segments 2822, 2832, and 2842, as well as additional first segments of other feature vectors) may be stored together in one or more memory banks. Accordingly, a processor subunit associated with those memory banks may perform operations associated with the first segments of the feature vectors. In some embodiments, the length L may be selected based on a number of accumulators associated with each processor subunit. These accumulators may act as a register in which intermediate results are stored relative to the processor subunit. Accordingly, if a processor subunit has L accumulators (e.g., 3, 5, 6, 8, 10, or any other number) each segment may have a length L equivalent to the number of accumulators.

By splitting the feature vectors into segments, a processor subunit (or group of processor subunits) may be dedicated to summing elements associated with particular segments. Accordingly, a first computational memory group may be configured to store a first segment of a first feature vector and a first segment of a second feature vector. For example, memory processing module 2710 may be configured to store segments 2822 and 2832 in memory bank 2714*a*. A dimensionality of the first segment of the first feature vector may be the same as a dimensionality of the first segment of the second feature, as indicated above. Accordingly, a processor subunit associated with the first computational memory group may perform summations associated with the first segments of the first and second feature vectors. In some embodiments, the first computational memory group may be configured to store first segments of additional feature vectors, such as a first segment of a third feature vector and a first segment of a fourth feature vector. The segments stored in the first computational memory group may be the first segments of all feature vectors in embedding table 2800 (i.e., segments 2822 through 2842), or may be a subset of the first segments of the feature vectors. For example, if the number of feature vectors (K) is less than the number of rows in a memory bank, the memory bank may store the all of the L-long segments of the K feature vectors in one memory bank. Otherwise, in some embodiments, the L-long segments may be stored across multiple memory banks and partial summations from multiple memory banks may be summed together.

Similarly, second segments of the of the feature vectors may be stored in other computational memory groups. Accordingly, a second computational memory group different from the first computational memory group may be configured to store a second segment of the first feature vector and a second segment of a second feature vector. For example, this may include one or more of segments 2824, 2834, and 2844 (as well as any other second segments of feature vectors of embedding table 280), which may be stored in memory bank 2714*b*. Accordingly, summations associated with these second segments of the feature vectors may be performed by processor subunit 2712*b*. The remaining segments of the feature vectors may be split and stored in a nonsequential manner relative to the original feature vectors in a similar manner. Accordingly, the elements of the feature vectors may be split and distributed according to which processor subunits will access the elements to perform summation operations. As a result, the vector elements may be stored in memory banks directly accessible by processor subunits performing summation operations using those elements. The resulting vector sums from each processor subunit may then be combined (e.g., summed together, concatenated, etc.) in order to generate the resulting output vector.

In some embodiments, in order to reduce the sizes of sums generated during the sum calculations, the sums may be quantized. These quantized vector sums may then be provided as an output to the host external to the computational memory chip. The host external to the computational memory chip may be configured to combine the quantized vector sums. For example, this may include converting a 14-bit sum to an 11-bit sums before it is output from the computational memory chip. As one example, three bits used to indicate the position of the and the remaining eights bits will include sum bits. The quantization may provide a desired tradeoff of accuracy of accumulation and MPM to environment bandwidth. In particular, consecutive columns may refer to the number of embedding columns that are concatenated before moving to the next row, while consecutive rows may refer to the number of rows that are concatenated before moving to the next columns. The advantage of a high number of consecutive columns is that more data can be read from the same memory line without paying the penalty of row activation. The disadvantage is that the accumulation may be done by the modules, and not by the processor subunits, which may result in less bandwidth reduction by the processor subunits. The advantage of a high number of consecutive rows is that the accumulation will be done near the memory banks. The disadvantage is that each computational memory chip may need to receive more elements, and the same elements may be transmitted also to other computational memory chip (as they have different columns), which may result in increased bandwidth outside of the computational memory chip. If the number of consecutive columns is low each index could be multicast to different columns groups.

A numeral example is provided below. A feature element may be 8 bits long (int8). At the end of the accumulation there may be M bits: M=8+log 2(max_acc). It should be noted that when adding, for example, 2 int8 numbers, the result is 9 bits. Or, for example, when adding N elements, add log 2(N) bits to the initial size (int8). The format of the sum outputted from the computational memory chip may include location information of length ceil(log 2(M−8)) followed by D sum value bits. The D bits may be rounded before transmitting them. Each address to the memory may be paired with sample ID and the last sample ID that was fully transmitted when this address was transmitted. The accumulator may finish the accumulation on all the samples that are equal or lower from the last sample ID.

The memory/processing unit may be manufactured by a first manufacturing process that better fits memory cells than logic cells. For example, the memory cells manufactured by the first manufacturing process may exhibit a critical dimension that is smaller, and even much smaller (for example by a factor that exceeds 2, 3, 4, 5, 6, 7, 8, 9, 10, and the like) than the critical dimension of a logic circuit manufactured by the first manufacturing process. For example, the first manufacturing process may be an analog manufacturing process, the first manufacturing process may be a DRAM manufacturing process, and the like.

In some data processing operations, the number of output data elements may be smaller (and may be significantly smaller) than the number of input data elements. Such a situation may arise relative to many different types of data operations. As one example, a structured query language (SQL) operation may be used to perform various types of data tasks relative to a database (e.g., updating data, retrieving data, retrieving data entries according to a designated filter, etc.). In some cases, input data elements acquired from a database or elsewhere may be processed using vector processing techniques performed, e.g., by a single instruction multiple data (SIMD) vector processor. Based on a particular type of operation performed relative to the input data elements by the vector processor, some of the data output elements generated or identified by the vector processor may not include valid data. In one example, such invalid data may refer to input data elements that do not meet a certain reference criteria applied by the vector processor (e.g., a reference criteria applied as part of a filtering operation).

Outputting invalid output data elements (or irrelevant data elements) and continue to process such data elements can impact performance of a computing system. For example, transfer of invalid or irrelevant data values to memory or other processing elements on a chip or to remote locations/ assets can waste communication bandwidth and memory resources. As a result, various processes of the computing system can be significantly slowed.

The data processing system described in the sections below is aimed at increasing the efficiency of a computing system, for example, with respect to output data elements. Rather than transmitting invalid or irrelevant data elements (e.g., those that do not satisfy a filter criteria or other type of criteria), the disclosed system is configured to omit invalid data elements from a system output. Such an approach may speed computing operations and leave communication buses more available for transmission of valid data or communications. In addition to outputting valid data elements and omitting invalid data elements, the disclosed system may also be configured to generate an output that includes validity metadata representative of the output data elements (e.g., metadata identifying valid data elements among a set of data, invalid data elements among a set of data, or both).

Figure 29:
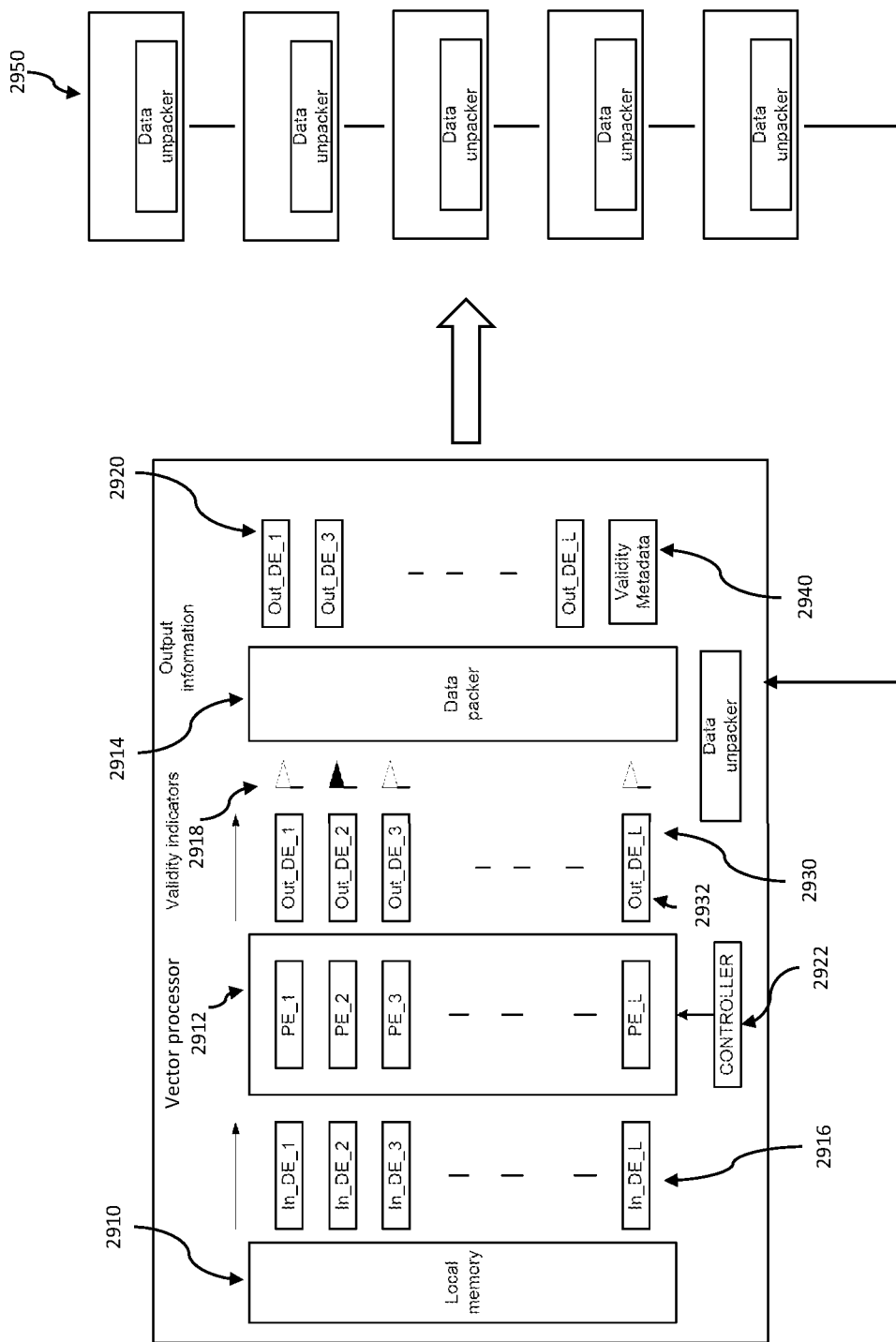
FIG. 29 provides a diagrammatic representation of a data processing system according to exemplary disclosed embodiments.

As shown in FIG. 29, a data processing system may include a memory 2910, a data processing unit 2912 (e.g., which may include a vector processor), and a data packer 2914. The data analysis unit 2912 (e.g., a vector processor or other type of logic-based device) may be configured to acquire a plurality of data elements 2916 from memory 2910, evaluate each of the plurality of data elements relative to at least one criteria, and generate an output that includes a plurality of validity indicators 2918 identifying a first plurality of data elements among the plurality of data elements that validly satisfy the at least one criteria and identifying a second plurality of data elements among the plurality of data elements that do not validly satisfy the criteria. The data packer 2914 can receive the output of the data analysis unit 2912 and generate a packed data output 2920 including the first plurality of data elements (i.e., the valid data elements) and omitting the second plurality of data elements (i.e., the invalid data elements). In some cases, however, the packed data output 2920 may include (a) only valid output data elements, (b) only invalid output data elements, or (c) a combination of one or more valid output data elements and one or more invalid output data elements. This is reflected in the validity metadata generated by the data packer.

Memory 2910 can include any suitable type of memory device for storing data. As shown in FIG. 29, memory 2910 may be integrated with one or more other system components, such as data analysis unit 2912 and data packer 2914. In other cases, however, memory 2910 may be implemented as a separate component or combined with one or more other computing components. In one example, memory 2910 may include one or more memory banks 600 associated with a computational memory chip, such as XRAM chip 624. Memory 2910 may include one or more DRAM chips, or any other type of memory unit.

Memory 2910 may be configured to store a database including a plurality of values arranged over a plurality of rows and a plurality of columns (e.g., a relational database). In some cases, column values of the database may be stored sequentially in the memory. Values stored in the database may be acquired from memory for analysis by the data analysis unit 2912. In one example, the plurality of data elements 2916 acquired by the data analysis unit 2912 may include a plurality of row values from a single column of a database stored in memory 2910.

As noted above, the data analysis unit 2912 may include a vector processor. In some cases, the vector processor may include at least one single instruction, multiple data (SIMD) configured processor. The SIMD processor can receive an SIMD command from a controller 2922 configured to communicate with the data analysis unit. The SIMD processor may use the received SIMD command in processing the input data elements 2916. In some cases, the SIMD command may specify a type of operation and/or a certain criteria for the data analysis unit 2912 to use in evaluating the input data elements 2916. The SIMD processor may be configured to process in parallel a plurality of the input data elements 2916. In addition to evaluating the acquired input data elements 2916 (e.g., using a filter operation, Boolean operation, or other function relevant to a database query), the data analysis unit may be further configured to execute one or more of logic, algebraic, or string operations relative to the plurality of input data elements 2916.

Data analysis unit 2912 may include any suitable hardware for providing at least the described evaluation functionality. For example, the data analysis unit 2912 may include one or more processors, one or more field programmable gate arrays, one or more application specific integrated circuits (ASICs), buffers, cache, registers, accelerators, etc.

As noted above, the data analysis unit 2912, which may include a vector processor or other types of processors, can operate on data acquired from memory 2910. In some cases, the acquisition of input data elements 2916 from memory 2910 may result from a query relative to a database fully or partially stored in the memory 2910. In some cases, the database query may involve the data analysis unit performing a filter function as part of the analysis of the input data elements 2916. In other cases, the evaluation of the plurality of data elements performed by the data analysis unit 2912 may include a scan, filter, join, aggregate, or sort operation, combinations thereof, and/or other operations for executing a desired query. One or more commands associated with the query may be provided to the data analysis unit 2912 by controller 2922. In the case of a filter query, the command(s) provided by controller 2922 to data analysis unit 2912 may include a filter command, and the at least one criteria used by the data analysis unit 2912 to evaluate the values included in the input data elements 2916 may be provided to the data analysis unit 2912 in association with the filter command. In some cases, the at least one criteria may include one or more reference values to be compared by the data analysis unit 2912 to data values included in the plurality of data elements 2916. The reference values may include numerical values, string values, etc.

Figure 30:
FIG. 30 provides a diagrammatic representation of a database configuration.

FIG. 30 provides one example technique for acquiring input data elements 2916 for evaluation by data analysis unit 2912. For example, memory 2910 may store a database 3010 including a plurality of values arranged in a plurality of rows and columns. In one example, the columns 0 through M may be stored sequentially in memory 2910 such that a full or partial column can be read from the memory 2910 by a sequential memory access. The acquired values may be stored in one or more input FIFOs. Such an operation can result in the plurality of input data elements 2916 corresponding to a series of vectors each including one or more row values from database 3010. In some cases, the input data elements 2916 may be included in a vector containing all of the row values (e.g., from row 0 to row L) associated with a particular column (e.g., column 2) of database 3010. The data analysis unit 2912 can evaluate the set of row values included in the acquired vector, generate an output (discussed below), and acquire the vector including a new group of row values/input data elements 2916 to evaluate. In such a process, the operations are row-invariant, meaning that each row is processed independently, and all rows in the table may be subjected to the evaluation operation (e.g., a filter operation, etc.). In the case of an SIMD processor, which may be implemented with a DSP, multiple row values may be processed simultaneously (e.g., in parallel) based on a common instruction. Columns of database 3010 may be loaded from memory 2910 (or provided as the result of another operation), the row values can be processed by the data acquisition unit 2912, and the results may be represented by an output of the data analysis unit 2912. The output can be stored to a memory or sent to a next operation, for example.

The data analysis unit 2912 may be configured to output various types of information. Returning to FIG. 29, the data analysis unit 2912 may provide an output 2930. In some cases, output 2930 may include a plurality of output data elements 2932, which may correspond to input data elements 2916. Additionally, however, the data analysis unit may also output one or more validity indicators 2918, which may identify the values among the input data elements 2916 (e.g., row values from database 3010) that satisfied a particular criteria applied by the data analysis unit 2912. The validity indicators 2918 may also identify which of the values among the output data elements 2932 do not satisfy the particular criteria applied by the data analysis unit 2912. In some cases, the validity indicators 2918 may include a set of valid data element indices and/or a set of invalid data element indices identifying the valid and invalid values among the output data elements 2932. In other cases, the validity indicators 2918 may be included in a bit mask of single bit values that identify valid and invalid data element values among the output data elements 2932. For example, as shown in FIG. 29, the validity indicators 2918 may include bit flags to indicate whether a corresponding output data element 2932 is valid (white flag) or invalid (black flag). In the particular example of FIG. 29, output data element 2 (Out_DE_2) is invalid, and all others of the output data elements 2932 shown in FIG. 29 are valid. In other cases, the validity indicators 2918 may identify: row values in a column of data of database 3010 that satisfy the at least one criteria applied by data analysis unit 2912; and/or row values in a column of data of a database that do not satisfy the at least one criteria. The number of valid or invalid output data elements in a given set may range between zero and L.

It should be noted that data evaluation need not be the only function provided by data analysis unit 2912. For example, in some cases, data analysis unit 2912 may be configured to perform one or more additional operations, such as various arithmetic or algebraic operations, including addition, subtraction, multiplication, among others. Such operations may be performed, for example, as inter-column operations.

Turning to data packer 2914, one role of the data packer may include condensing output data to provide packed data output 2920 such that invalid or irrelevant data elements are not passed on to memory or to another operation. Condensing the data output in this way may significantly reduce the bandwidth and/or processing required to transfer and/or store data results from one or more processes. In addition to a condensed or packed data output, the data packer 2914 may also output validity metadata to assist in retaining information about the validity/invalidity of data elements that were evaluated by data analysis unit 2912.

In the example shown in FIG. 29, data packer 2914 generates packed data output 2920 that includes valid output data elements (e.g., corresponding to the valid data elements among the data elements 2932 output by data analysis unit 2912) and omits invalid output data elements (e.g., corresponding to the invalid data elements among the data elements 2932 output by data analysis unit 2912). In some cases, the data packer 2914 may rely upon the validity indicators 2918 to distinguish valid data elements from invalid data elements in order to generate the packed data output 2920.

Data packer 2914 may include suitable hardware elements for providing the described data packing functionality. In some cases, data packer 2914 may include one or more hardware-based accelerators, processors, gate arrays, and/or logic-based components. The packed data output 2920 may be stored in one or more output FIFOs.

Data packer 2914 may also include one or more accumulators configured to accumulate one or more data segments of a predetermined size before including the accumulated one or more data segments in the packed data output 2920. In some cases, the predetermined data segment size may include 1 bit, 8 bits, 16 bits, 32 bits, or 64 bits or more.

In some cases, data packer 2914 may be configured to use a packing mask included in a predicate register to accumulate one or more data segments of a predetermined size before including the accumulated one or more data segments in the packed data output 2920. The predetermined size in this case may correspond to a size of the predicate register.

Different data types may be supported by the described data analysis system. For example, supported data type widths may include 1 bit for boolean/predicate, 8 bits for INT8/UINT8, 16 bits for INT16/UINT16, 32 bits for INT32/UINT32/FP32, 64 bits for INT64/UINT64. When data is pushed to and output FIFO or pulled from and input FIFO, data may be packed/unpacked to reduce transfer bandwidth.

In a one-bit example, data output by data packer 2914 may be accumulated to L bits before pushing to an output FIFO. For example, after 64 push instructions, when 64×L bits are accumulated, data may be pushed into an output FIFO. If a flush command is issued, the push to the output FIFO is done without waiting to accumulate the whole data lane.

In an eight-bit example, data output by data packer 2914 may be accumulated to 8×L bits before pushing to an output FIFO. For example, after 8 push instructions, when 64×L bits are accumulated, data may be pushed into an output FIFO. If a flush command is issued, the push to the output FIFO is done without waiting to accumulate the whole data lane.

In a sixteen-bit example, data output by data packer 2914 may be accumulated to 16×L bits before pushing to an output FIFO. For example, after 4 push instructions, when 64×L bits are accumulated, data may be pushed into an output FIFO. If a flush command is issued, the push to the output FIFO is done without waiting to accumulate the whole data lane.

In a 32-bit example, data output by data packer 2914 may be accumulated to 32×L bits before pushing to an output FIFO. For example, after 2 push instructions, when 64×L bits are accumulated, data may be pushed into an output FIFO. If a flush command is issued, the push to the output FIFO is done without waiting to accumulate the whole data lane.

As noted above, in addition to providing packed data output 2920, data packer 2914 may also output validity metadata 2940. The validity metadata 2940 may be provided or transmitted together with the packed data output 2920 or may be provided or transmitted separately from packed data output 2920 (e.g., as part of an out of band communication).

Various types of information relating to the validity of data elements evaluated by data analysis unit 2912 may be provided by the validity metadata 2940. For example, in some cases, validity metadata 2940 may identify valid data elements included in packed data output 2920. Identification of valid data elements may be provided using various types of identifiers associated with valid data elements included in packed data output 2920. Such identifiers may include data element indices, vector indices, row/column indices, etc. Validity metadata 2940 may also identify particular data elements (e.g., data element Out_DE_2) that the data packer 2914 omitted from packed data output 2920. Identification of invalid data elements may be provided using various types of identifiers associated with invalid data elements excluded from packed data output 2920. Such identifiers may include data element indices, vector indices, row/column indices, etc. In some cases, validity metadata 2940 may include identifiers associated with both the valid data elements included in packed data output 2920 and the invalid data elements excluded from packed data output 2920. The identifiers of validity metadata 2940 may take the form of a validity bitmap including Boolean values associated with the data elements included in packed data output 2920 and/or excluded from packed data output 2920. The validity metadata 2940 may also include one or more identifiers associated with a source location of the valid data elements, a source location of the invalid data elements, or both.

In some cases, the validity metadata 2940 may replicate or otherwise correspond to the validity indicators 2918. For example, the validity metadata 2940 may include the same plurality of validity indicators 2918 included in the output of the data analysis unit 2912. In other cases, validity metadata 2940 may be provided in a form or format different from validity indicators 2918. The validity metadata 2940 may map the output data elements 2932 outputted from a chip that includes the data analysis unit 2912 or transferred from another processing block inside the chip, identify the origin of the data elements (e.g., a processing entity including the data analysis unit 2912), and/or indicate an order of the valid output data elements in the packed output data 2920.

The output generated by data packer 2914 may be provided to various destinations. For example, the data packer output may be transmitted to one or more destination chips external to a chip on which the data packer resides. The data packer may also be provided to a FIFO external to a chip on which the data packer resides. External destination chips configured to receive the data packer output may include a memory chip, a computational memory chip, one or more processors, a host processor, a CPU, a GPU, one or more communication controllers, etc.

Figure 31:
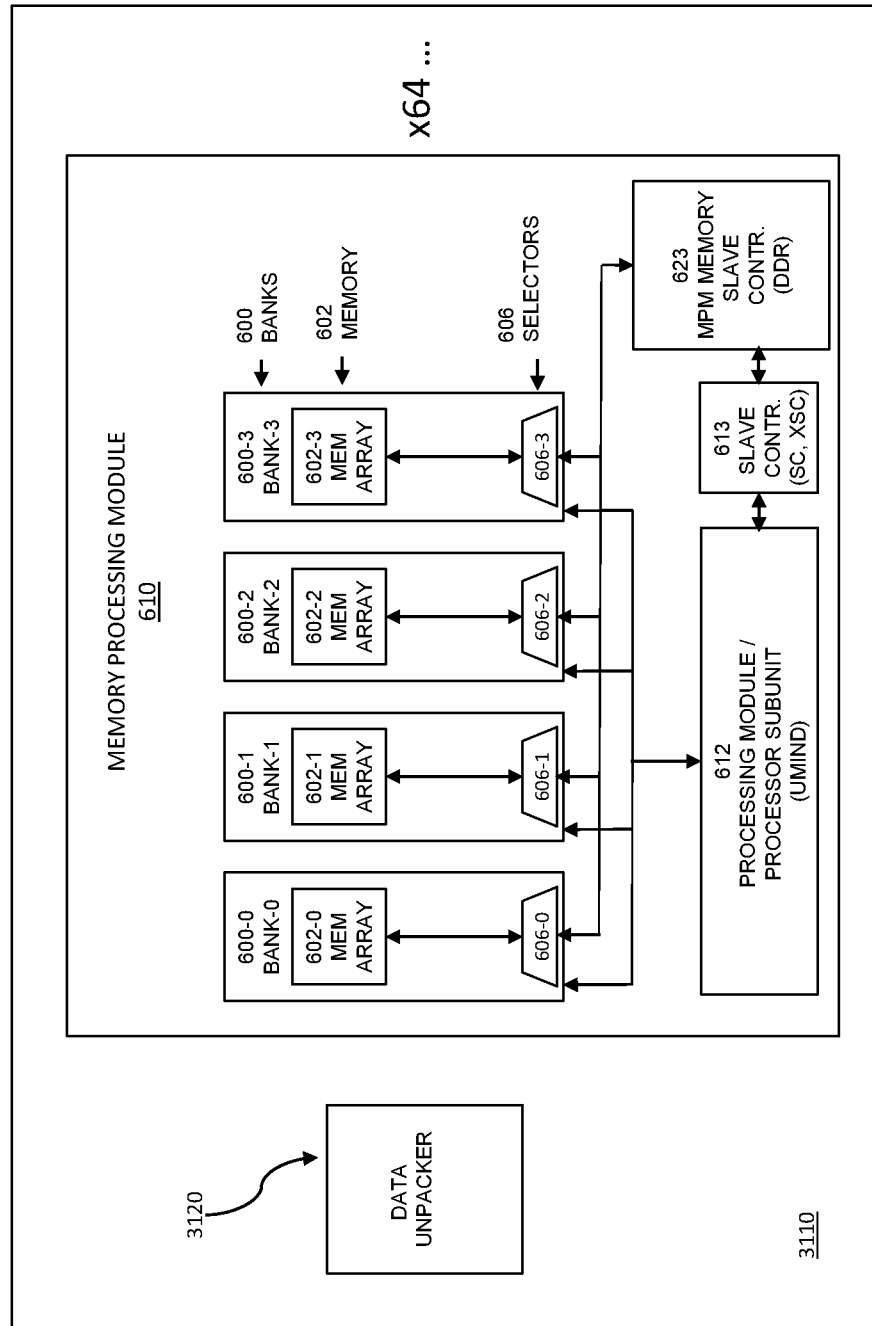
FIG. 31 provides a diagrammatic representation of a computational memory chip configured to receive a packed data output.

In one example, the data packer output (including packed data output 2920 and/or validity metadata 2940) may be provided to one or more blocks 2950. One such block 2950 may include a computational memory chip 3110, as shown in FIG. 31. In this example, the computational memory chip 3110 may include all of the features described above relative to memory processing module 610, and chip 3110 may include multiple memory processing modules 610 (e.g., 64). Additionally, computational memory chip 3110 may include a data unpacker 3120, which may be configured to forward the packed data output 2920 of data packer 2914 to one or more components of chip 3110. In some cases, data unpacker 3120 may also be configured to determine/identify, based on received validity metadata 2940, which data elements processed by the data analysis unit 2912 were omitted from the packed data output 2920 by data packer 2914. The validity metadata 2940 may be transmitted using various techniques. For example, the validity metadata 2940 may be transmitted as sideband information, may be transmitted after a format modification, or may be sent without format modification.

In computer systems including at least one memory and at least one processor, the processor may access the memory to retrieve various data values, operate on the data values, and store the operation resultants in the memory. For example, one standard technique for a processor to read from and write to a memory includes the use of a memory mapped interface to facilitate data transfer associated with memory reads and writes. Using the memory mapped interface, a processor can load data from a shared memory (e.g., a RAM), operate on the loaded data and use the memory mapped interface to write the operation resultant back to the shared memory. The same processor or another processor can later access the address where the operation resultant was stored, retrieve the resultant, and perform operations relative to the resultant.

Memory accesses using a memory mapped interface can lead to bottlenecks. For example, there may be limited pathways for data transfer between a shared memory and a processor, and all communications relating to the reads and writes must travel the same limited communication paths. Such operations can lead to reduced system efficiency and throughput and may be especially problematic where multiple processors are arranged to use the same shared memory. In such a configuration, there is competition for the shared memory, as all processors must access the same shared memory and use the same communication paths into and out of the shared memory to accomplish a data transfer from one processor to another. That is, rather than being able to transfer data (e.g., an operation resultant) directly from a first processor to a second processor such that the second processor can operate on the resultant, the first processor must first store the resultant in the shared memory via the memory mapped interface. The second processor must then retrieve the resultant from the shared memory using the address where the first processor stored the resultant. Using the shared memory in this way (e.g., as an intermediate repository) results in inefficiencies, especially with respect to the communication bandwidth involving the shared memory.

The disclosed processor-to-processor communication systems are aimed at increasing the efficiency of data transfers among processors. For example, the disclosed systems may accomplish processor-to-processor data transfers that bypass the shared memory and do not rely upon a memory mapped interface. Rather, the disclosed system may transfer data (e.g., data loaded from a shared memory, data generated as a result of one or more operations on data loaded from a shared memory, etc.) from one processor to one or more other processors via a stream interface.

Figure 32:
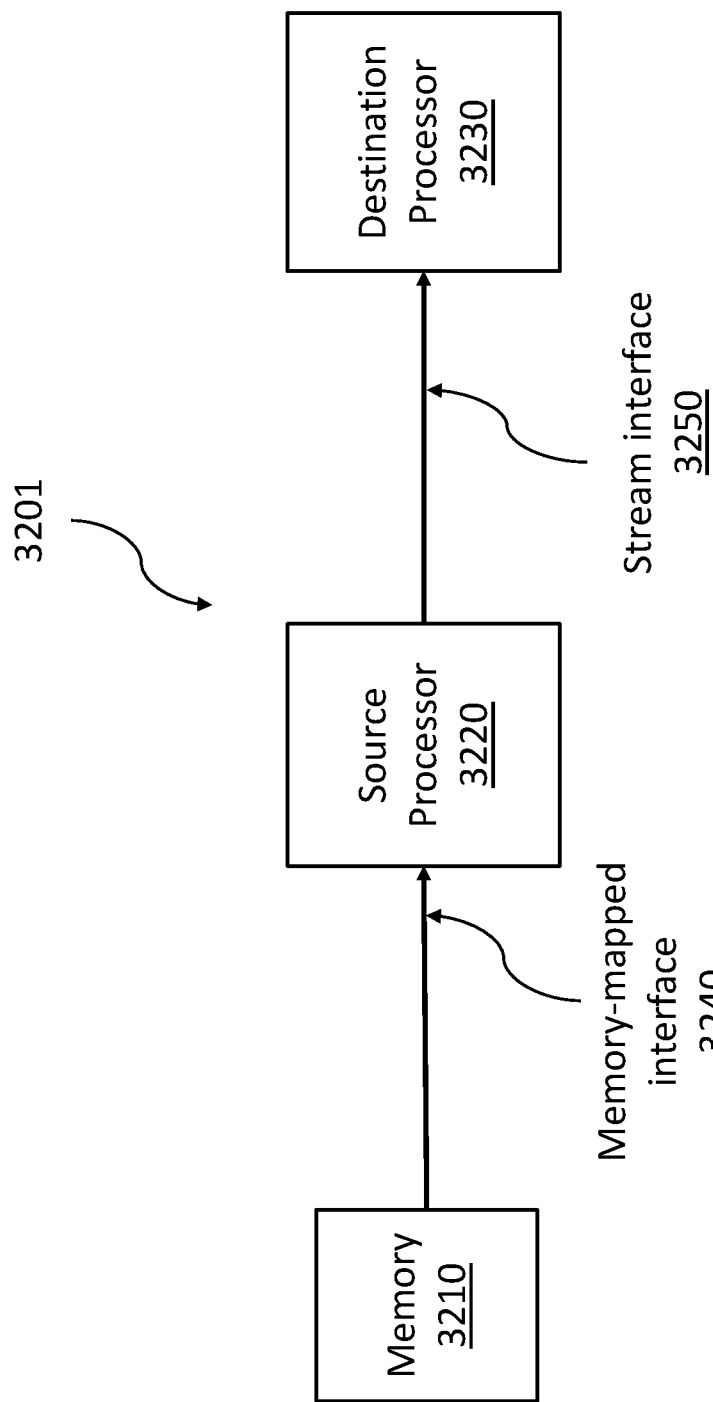
FIG. 32 provides a diagrammatic representation of a processor-to-processor communication system, according to exemplary disclosed embodiments.

The disclosed processor-to-processor communication systems may include various architectures. In some cases, as represented by FIG. 32, a processor-to-processor communication system 3201 may include a source processor 3220 programmed to load data from a memory 3210 using a memory mapped interface 3240. Source processor 3220 may operate on the loaded data to generate at least one resultant. Rather than writing the resultant to memory 3210 to transfer the resultant to another processor, source processor 3220 may generate a data packet for transferring processed data (e.g., the resultant, part of the resultant, etc.) via a non-memory mapped stream interface 3250. Source processor 3220 may then send the generated data packet, including the processed data, to a destination processor 3230 without accessing memory 3210.

In some cases, source processor 3220 and destination processor 3230 may be located on different chips (i.e., different substrates). In other cases, however, source processor 3220 and destination processor 3230 may be formed on a common substrate (e.g., as part of a single chip). Memory 3210 may represent any suitable memory device. In some cases, memory 3210 may include a shared memory, such as a random access memory (RAM, etc.).

In some cases, source processor 3220 and destination processor 3230 may be included on the same or different computational memory chips (e.g., XRAM chips 624, as represented by FIG. 6 and accompanying disclosure). Source processor 3220 may include a processor subunit 612 disposed on a first computational memory chip 624 together with a group of one or more memory banks 600 dedicated to the source processor. In one example, the destination processor 3230 may include a processor subunit 612 disposed on a second computational memory chip 624 different from the first computational memory chip. Like the source processor 3220, the destination processor 3230 may be associated with a group of one or more memory banks 600 dedicated to the destination processor 3230. In another example, the destination processor 3230 includes a processor subunit 612 disposed on the first computational memory chip together with the source processor 3220. In this example, the first computational memory chip includes a second group of one or more memory banks 600 dedicated to the destination processor 3230.

Figure 33:
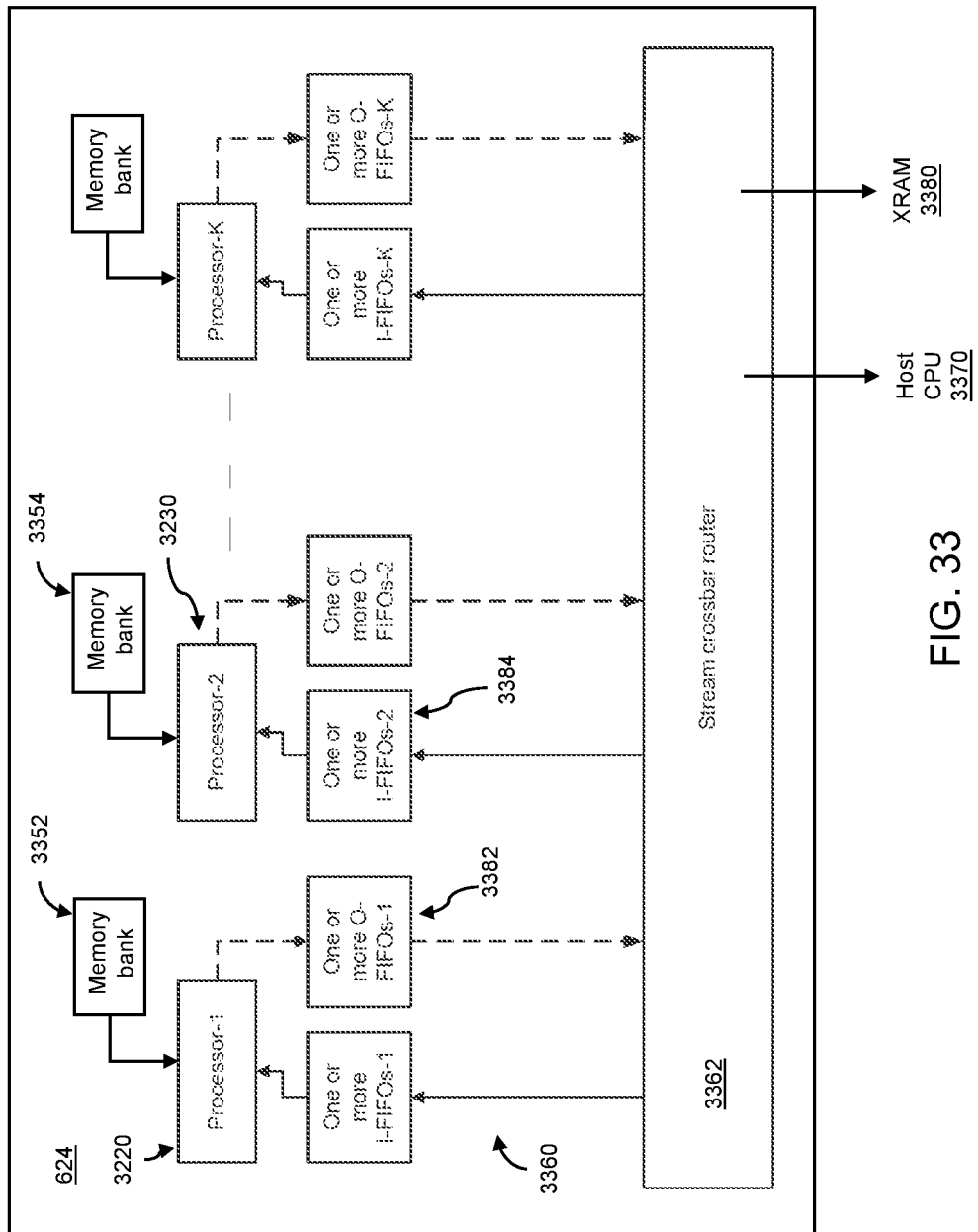
FIG. 33 provides a diagrammatic representation of a processor-to-processor communication system, according to exemplary disclosed embodiments.

Thus, in the example, shown in FIG. 33, a computational memory chip 624 may include a processor-to-processor communication system. The computational memory chip may include a plurality of processor subunits 612 and a plurality of memory banks formed on a common substrate, as described earlier with respect to FIG. 6. It should be noted that in some cases, the computational memory chip may include at least one processor subunit 612 and a one or more corresponding, dedicated memory banks formed on a common substrate. Each processor subunit among the plurality of processor subunits may be associated with one or more dedicated memory banks from among the plurality of memory banks. For example, processor subunit 3220 may be associated with at least one dedicated memory bank 3352, and processor subunit 3230 may be associated with at least one dedicated memory bank 3354.

Among the processor subunits included on the computational memory chip 624 of FIG. 33, source processor 3220 may serve as an originating processor subunit among the plurality of processor subunits. Destination processor 3230 may serve as a consumer processor subunit. The originating processor subunit (processor 3220) may generate data (e.g., an operation resultant) to be transmitted to the at least one consumer processor subunit (processor 3230).

In one example, source processor 3220 may retrieve data from memory bank 3352 and perform one or more operations (e.g., arithmetic operation, logic operation, etc.) relative to the retrieved data to provide an operation resultant. Rather than, for example, writing the operation resultant back to memory bank 3352 as part of a memory-mapped data transfer from source processor 3220 to destination processor 3230, source processor 3220 may use a stream interface 3360 to directly transfer the operation resultant to destination processor 3230. Stream interface 3360, which may include a stream crossbar router 3362 among other components, may be configured to transfer to data generated by at least one originating processor subunit (e.g., source processor 3220) to at least one processor subunit (e.g., destination processor 3230). In some cases, the transfer of the data generated by the at least one originating processor subunit (e.g., source processor 3220) may occur in response to an execution of a write command by the at least one originating processor subunit (e.g., source processor 3220).

To facilitate data transfer via the stream interface 3360, each of the plurality of processor subunits included on a computational memory chip 624 (or more broadly in a computational memory system including multiple computational memory chips 624) may be associated with a unique destination identifier. For example, in a system with multiple processors, each processor may be identified by a unique destination processor identifier (for example, a number, string, etc.). When a source processor sends data to a destination processor, the sender processor may package or otherwise associate the destination processor identifier with the data to be sent. The sent data may be routed between processors, for example, using one or more stream crossbar routers according to the destination processor identifier.

The stream interface 3360 may be used to transfer data from a source processor subunit (e.g., memory bank 3352) to various types of entities. In some cases, as described above, the destination entity may include a processor subunit located on the same or different chip as the source processor subunit. In some cases, the stream interface 3360 may be used to send data from the source processor subunit to at least one destination asset. In some cases, the at least one destination asset includes a memory bank, such as memory bank 3354, dedicated to a processor subunit (e.g., memory bank 3352, associated with source processor 3230) other than the originating processor subunit. In other cases, the stream interface 3360 may be configured to transfer data from a source processor subunit to a remote destination asset that is remotely located relative to the computational memory chip 624 on which the source processor subunit resides. For example, such a remote destination asset may include at least one processor subunit disposed on a different computational memory chip (e.g., an XRAM 3380), at least one memory bank disposed on a different computational memory chip (e.g., XRAM 3380), a host CPU 3370, etc.

Stream interface 3360 may include various components. In some cases, as shown in FIG. 33, stream interface 3360 may include at least one stream crossbar router 3362, which may include a routing matrix. The stream crossbar router may use the routing matrix to enable independent, simultaneous communications between two or more pairs of processor subunits among the plurality of processor subunits of a computational memory chip or across computational memory chips. While various types of stream interfaces may be employed, in some cases, stream interface 3360 may be AXI4 stream protocol compliant. More generally, an AXI-S (AXI stream) interface may be used instead of an AXI-MM (AXI memory-mapped) interface to transfer data from a source processor subunit 3220 to another processor subunit or to a destination asset without having to access a shared memory.

Various other components may be included in the disclosed processor-to-processor communication system to facilitate data transfers between processors. For example, one or more output FIFO buffers 3382 may be incorporated into the processor-to-processor communication system. When a source processor generates a memory write command, data to be written need not be transferred to a shared memory entry with an address. Instead, the data may be pushed to an output FIFO (allocated to the source processor) with a destination processor identifier that identifies a destination processor that should receive the data. The output FIFO may also be referred to as an O-FIFO. The data pushed to the output FIFO buffer (e.g., O-FIFO 3382) may then be sent to the destination processor 3230 (or retrieved by the destination processor 3230) via stream cross bar router 3362. Note that inclusion of output FIFOs is optional, as the data may be sent directly from a source processor to a destination processor via the stream interface (e.g., as a result of a write command). Using an output FIFO, however, may be desirable to allow to the source processor to continue operation if a destination processor cannot immediately accept the data.

In some cases, stream interface 3360 may include a point-to-point communication conduit. In one example, the point-to-point communication conduit avoids components such as routers and switches, but includes a direct path from source to consumer. The stream interface also includes a communication conduit other than a memory bus. In some cases, the stream interface may include a communication conduit passing through one or more switches or routers.

In operation, the stream interface 3360 may be configured to transfer data generated by a source processor subunit to at least one output FIFO buffer 3382 along with an identifier associated with at least one processor subunit or with at least one destination asset (on or off chip) where the data is to be transferred. For example, in some cases, the at least one destination asset may include a memory bank associated with a processor subunit different from the source processor subunit. For example, each of the plurality of processor subunits included on a computational memory chip 624 may be allocated at least one output FIFO buffer 3382. In some cases, each of the plurality of processor subunits may be allocated two or more output FIFO buffers 3382.

Figure 34:
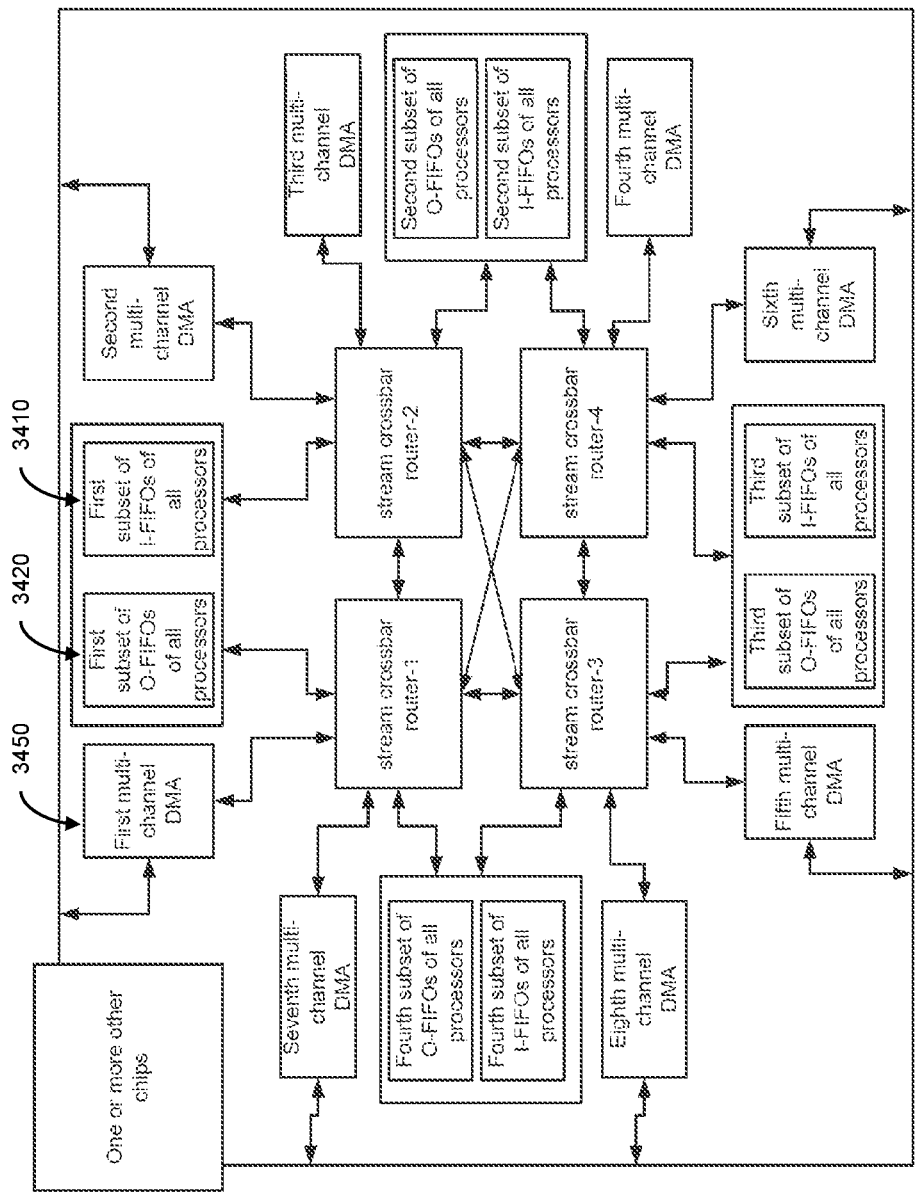
FIG. 34 provides a diagrammatic representation of a processor-to-processor communication system, according to exemplary disclosed embodiments.

One or more input FIFO buffers 3384 may also be included in the disclosed processor-to-processor communication system. For example, the data sent to a destination processor (e.g., destination processor 3230) (or consumer processor) from a source processor (e.g., source processor 3220) may be received by the destination processor as received data to an input FIFO (I-FIFO) 3384, which may be included among one or more I-FIFOs allocated to the destination/consumer processor. Use of an input FIFO is optional. Where included, however, an I-FIFO buffer may be used to store the data generated by at least one originating/source processor subunit (e.g., source processor 3220) and transferred by the stream interface 3360 until at least one processor subunit (e.g., destination processor 3230) is ready to operate on the data. Each of the plurality of processor subunits included on a computational memory chip 624 may be allocated at least one input FIFO buffer 3384. In some cases, each of the plurality of processor subunits may be allocated two or more output FIFO buffers 3384.

Where O-FIFOs and I-FIFOs are included, each processor (e.g., each processor subunit aboard a computational memory chip 624) may be associated with a set of one or more O-FIFOs 3382 and/or with a set of one or more I-FIFOs 3384. Allocating more than a single O-FIFO and/or I-FIFO to a processor may simplify management of different types of traffic and/or management of traffic between different pairs of source and destination processors. For example, as shown in the example of FIG. 34, the disclosed processor-to-processor communication system may include a plurality of input FIFO buffers 3284 grouped into a plurality of input FIFO subsets 3410 including one or more input FIFO buffers from among the plurality of input FIFO buffers. Each of the plurality of input FIFO subsets 3410 (e.g., first subset of I-FIFOs, second subset of I-FIFOs, etc.) may be coupled to a different port of the stream interface (e.g., stream crossbar router-1, stream crossbar router-2, etc.), as shown in FIG. 34.

Similarly, as shown in the example of FIG. 34, the disclosed processor-to-processor communication system may include a plurality of output FIFO buffers 3282 grouped into a plurality of output FIFO subsets 3420 including one or more input FIFO buffers from among the plurality of input FIFO buffers. Each of the plurality of output FIFO subsets 3420 (e.g., first subset of O-FIFOs, second subset of O-FIFOs, etc.) may be coupled to a different port of the stream interface (e.g., stream crossbar router-1, stream crossbar router-2, etc.), as shown in FIG. 34.

Grouping O-FIFOs and I-FIFOs and associating the different groups with different ports of the stream crossbar routers may enable each group to service a different type of traffic without blocking traffic of another set. For example, as shown in FIG. 34, four stream cross bar routers are included (i.e., Stream crossbar router-1, Stream crossbar router-2, Stream crossbar router-3, and Stream crossbar router-4). In this example, there are four sub-sets of I-FIFOs and four sub-sets of O-FIFOs, and there are eight multi-channel DMAs that are coupled to one or more other chips. In some cases, the transfer of data from a source processor subunit (e.g., source processor 3220) to a remote destination asset may occur via at least one direct memory access (DMA) module 3450.

As shown in the example of FIG. 34, stream crossbar router-1 is communicatively coupled to a first subset of I-FIFOs of all processors, to a first subset of O-FIFOs of all processors, to a fourth subset of I-FIFOs of all processors, to a fourth subset of O-FIFOs of all processors to first multi-channel DMA, to a seventh multi-channel DMA, to a first multi-channel DMA, and to all other crossbar routers (Stream crossbar router-2, Stream crossbar router-3 and Stream crossbar router-4).

As shown in this example, stream crossbar router-2 is communicatively coupled to a second subset of I-FIFOs of all processors, to a second subset of O-FIFOs of all processors, to a first subset of I-FIFOs of all processors, to a first subset of O-FIFOs of all processors, to a second multi-channel DMA, to a third multi-channel DMA, and to all other crossbar routers (Stream crossbar router-1, Stream crossbar router-3 and Stream crossbar router-4).

As shown in this example, stream crossbar router-3 is communicatively coupled to a third subset of I-FIFOs of all processors, to a third subset of O-FIFOs of all processors, to a fourth subset of I-FIFOs of all processors, to a fourth subset of O-FIFOs of all processors, to a fifth multi-channel DMA, to a eighth multi-channel DMA, and to all other crossbar routers (Stream crossbar router-1, Stream crossbar router-2 and Stream crossbar router-4).

As shown in this example, stream crossbar router-4 is communicatively coupled to a second subset of I-FIFOs of all processors, to a second subset of O-FIFOs of all processors, to a third subset of I-FIFOs of all processors, to a third subset of O-FIFOs of all processors, to a fourth multi-channel DMA, to a sixth multi-channel DNA, and to all other crossbar routers (Stream crossbar router-1, Stream crossbar router-2 and Stream crossbar router-3).

One of ordinary skill in the art will recognize that more or fewer stream crossbar routers, I-FIFO sub-sets, O-FIFO sub-sets, multi-channel DMAs may be included in the disclosed processor-to-processor communication system, and the configuration shown in FIG. 34 is one example.

In managed languages such as Java and C, a null value is unusable and may cause a null pointer exception when dereferenced. In other languages like C and C++, undefined values—that is, those that are uninitialized, or derived from undefined values—are unusable, and their use may cause various problems such as silent data corruption, altered control flow, or a segmentation fault. Similarly, Structured Query Language (SQL) is often used for communicating with databases. SQL allows a value to be undefined. Database processors, however, need to know whether a certain data unit is invalid or not. Therefore, there is a need to keep track of null value locations in data.

A known method for identifying an invalid or null value includes allocating a predefined value to represent an invalid value. For example, when the data unit is one byte long, then one value out of 0-255 may be allocated as an invalid flag. When using this method to encode a data unit, if a valid data unit has the predefined value, then it is necessary to change the valid predefined value of the data unit to ensure that the data unit remains valid. This process is inefficient, especially when dealing with large databases. Thus, there is a growing need to identify and manage invalid data units in an effective manner.

A computational memory system and a method for managing invalid data units in a memory processing module (MPM) is disclosed below. Examples of MPMs are illustrated in PCT patent application publication WO2019025862, and/or PCT patent application PCT/IB2019/001005. An invalidity bit may be referred to as a NULL bit. An invalid value may be referred to as a NULL value.

In some embodiments, the disclosed computational memory system may include at least one computational memory chip including at least one processor subunit and at least one memory bank formed on a common substrate. For example, as discussed above, a memory processing module (MPM) 610, may be implemented on a chip to include at least one processing element (e.g., a processor subunit) local to associated memory elements formed on the chip (see FIG. 6). In some cases, the MPM 610 may include a plurality of processing elements spatially distributed on a common substrate among their associated memory elements within the MPM 610. Each memory bank may include a corresponding memory array 602 (shown in FIG. 6 as respective memory array-0, 602-0 through memory array-3, 602-3) along with selectors 606. Local processing, including arithmetic operations, other logic-based operations, etc., may be performed by processing module 612 (also referred to as a "processing subunit," "processor subunit," "logic," "micro mind," or "UMIND") using data stored in one or more of the memory arrays 602. In some embodiments, one or more processing modules 612 of one or more MPMs 610 may include at least one arithmetic logic units (ALU). Processing module 612 may be operationally connected to each of the memory banks 600. Each MPM 610 may include one processing module 612 or more than one processing module 612. Various numbers of MPMs 610 may be formed together on a single hardware chip. In some embodiments, a hardware chip may include just one MPM 610. In other embodiments, however, a single hardware chip may include two, four, eight, sixteen, 32, 64, etc., MPMs 610.

In some embodiments, the computational memory system may include a data invalidity detector configured to receive a sequence of data units and invalidity metadata relating to the sequence of data units. The disclosed data invalidity detector may be configured to execute one or more instructions to perform various functions, as disclosed below. For example, in some embodiments, the data invalidity detector may reside on the at least one computational memory chip. By way of example, one or more of MPMs 610 may include the data invalidity detector. As discussed above, the at least one processor subunit 612, the at least one memory bank (e.g., 600-0, 600-1, etc.), and/or the data invalidity detector may be formed on a single hardware chip.

In some embodiments, the data invalidity detector may be implemented by the at least one processor subunit on the at least one computational memory chip. For example, at least one processor subunit 612 on one or more of MPMs 610 may execute one or more instructions stored in a memory bank (e.g., 600-0, 600-1, etc.) to perform one or more functions of the data invalidity detector. The functions performed by the data invalidity detector will be described below.

In some embodiments, the data invalidity detector may be implemented by at least one supporting microprocessor disposed on the at least one computational memory chip. For example, as discussed above with respect to FIG. 6, the one or more MPMs 610 may include one or more memory processing units (e.g., IMPU 628), one or more DDR controllers 608, and/or one or more master controllers 622. It is contemplated that one or more of IMPUs 628, DDR controllers 608, and/or master controllers 622 may execute one or more instructions stored in the at least one memory bank (e.g., 600-0, 600-1, etc.) to implement the one or more functions of the data invalidity detector.

In some embodiments, the data invalidity detector may be implemented by at least one supporting microprocessor located outside of the at least one computational memory chip. In some embodiments, the data invalidity detector may be implemented by a host CPU outside of the at least one computational memory chip. For example one or more central processing units (CPUs) (e.g., 100, see FIG. 1) or graphical processing units (GPUs) (e.g., 200, see FIG. 2) may be located external to the one or more MPMs 610. It is contemplated that in some embodiments, the one or more CPUs 100 or GPUs 200 may execute one or more instructions stored in a memory bank (e.g., 600-0, 600-1, etc.) to implement one or more functions of the data invalidity detector.

Figure 35A:
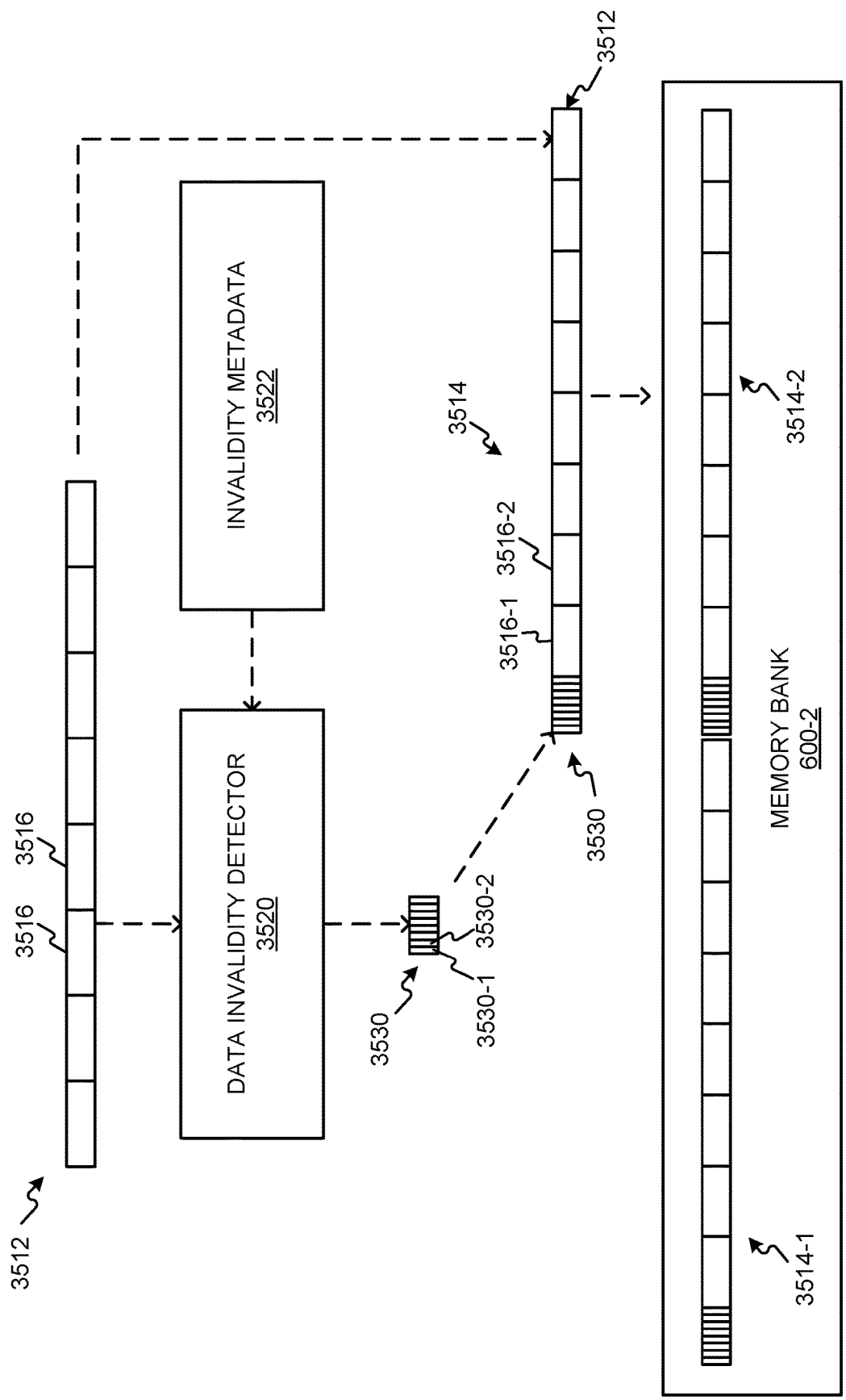
FIG. 35A provides a diagrammatic illustration showing the generation of an invalidity bitmap and storage of a mapped data segment by a data invalidity detector, consistent with the disclosed embodiments.

In some embodiments, the data invalidity detector may also be configured to generate an invalidity bitmap associated with a sequence of data units based on the received invalidity metadata. FIG. 35A is a diagrammatic illustration of an exemplary method of generation of an invalidity bitmap and storage of a mapped data segment by a data invalidity detector. As illustrated in FIG. 35A, a data chunk 3512 may include a sequence of data units 3516. Data invalidity detector 3520 may receive the sequence of data units 3516. Data invalidity detector 3520 may additionally receive invalidity metadata 3522. In one exemplary embodiment, invalidity metadata 3522 may be received from a database (e.g., associated with host 710) that may store the one or more data units 3516 in association with corresponding invalidity data. For example, the database may store an indicator or a flag associated with each data unit 3516 in data chunk 3512, and the indicator or the flag may indicate whether a corresponding data unit 3516 is valid or not. As one example, a null value for the indicator or the flag may indicate that the corresponding data unit 3516 is invalid. In some embodiments, invalidity metadata 3522 may be stored in a data table. For example, the data table may have a first column containing the one or more data units 3516, and a second column containing the indicator or the flag to indicate validity or invalidity of the one or more data units 3516 stored in the first column. It is further contemplated that, in some embodiments, the data invalidity detector 3520 may be configured to determine whether the one or more data units 3516 are valid or invalid based on a value of the one or more data units 3516. For example, a data unit 3516 having a null value may be determined to be invalid by data invalidity detector 3520.

As illustrated in FIG. 35A, data invalidity detector 3520 may be configured to generate a bitmap sequence 3530. It is contemplated that each value (e.g., 3530-1, 3530-2, etc.) in bitmap sequence 3530 may indicate whether a corresponding data unit 3516-1, 3516-2, etc., is valid or invalid. For example, values 3530-1, 3530-2, etc., may take a null value when corresponding data units 3516-1, 3516-2, respectively, are invalid. In some embodiments, a number of values included in the invalidity bitmap may equal a number of data units included in the sequence of data units. In some embodiments, the invalidity bitmap may indicate which of the sequence of data units includes a null value. For example, the elements of a particular bitmap sequence may correspond to respective data units. For example, for a data chunk 3512, including N data units 3516-1, 3516-2, . . . 3516-N (where N is an integer), invalidity bitmap 3530 may also include N values. Thus, invalidity bitmap 3530 may include an indicator or flag to indicate the validity/invalidity of each data unit (e.g., 3516-1, 3516-2, . . . 3516-N) in data chunk 3512. By way of an example, a null value in a 3rd location of invalidity bitmap 3530 may indicate that data unit 3516-3, in a third location of data chunk 3512, is invalid or includes a null value. By way of another example, a null value in the N−4th location of invalidity bitmap 3530 may indicate that data unit 3516-N−4, in the N−4$^{th}$ location of data chunk 3512, is invalid or includes a null value. Although the foregoing examples and following examples are discussed in the context of a bitmap, any data sequence or format may be used consistent with the disclosed embodiments.

In some embodiments, a number of bits included in the invalidity bitmap may equal a number of data units in the sequence of data units. In some embodiments, the invalidity bitmap may include a series of values equal to either zero or one to indicate which of the sequence of data units includes a null value. It is contemplated that in some embodiments, invalidly bitmap 3530 may include a plurality of bits. In some embodiments, a total number of bits in invalidity bitmap 3530 may be the same as a total number of data units 3516 in data chunk 3512. For example, when data chunk 3512 includes M data units 3516 (e.g., 3516-1, 3516-2, . . . , 3516-M, M is an integer), a number of bits in invalidity bitmap 3530 may also equal M. As one example, when data chunk 3512 includes five data units 3516 (e.g., 3516-1, 3516-2, 3516-3, 3516-4, 3516-5), invalidity bitmap 3530 may also include five bits (e.g., 3530-1, 3530-2, 3530-3, 3530-4, 3530-5). It is also contemplated that the values of bits (e.g., 3530-1, 3530-2, etc.) in invalidity bitmap 3530 may be 0 or 1 to indicate whether the corresponding data units 3516 (e.g., 3516-1, 3516-2, etc.) are valid or invalid. For example, when a fourth data unit 3516 (e.g., 3516-4) in data chunk 3512 has a null value, a fourth bit (e.g., 3530-4) in invalidity bitmap 3530 may take a value 1 to indicate that the fourth data unit 3516-4 includes a null value. By way of another example, when a second data unit 3516 (e.g., 3516-2) in data chunk 3512 is valid (e.g., not a null value), the second bit (e.g., 3530-2) in invalidity bitmap 3530 may take the value 0 to indicate that the second data unit (e.g., 3516-2) does not include a null value.

In some embodiments, the data invalidity detector may be configured to append the invalidity bitmap to the sequence of data units to provide a mapped data segment. In some embodiments, the invalidity bitmap may be appended to a beginning of the sequence of data units. For example, as illustrated in FIG. 35A, data invalidity detector 3520 may be configured to append (or embed, associate, prepend, etc.) invalidity bitmap 3530 to data chunk 3512 to provide mapped data segment 3514. In one exemplary embodiment, as illustrated in FIG. 35A, data invalidity detector 3520 may be configured to append invalidity bitmap 3530 to a beginning of the sequence of data units 3516 in data chunk 3512. Thus, for example, mapped data segment 3514 in FIG. 35A may include invalidity bitmap 3530 preceding the sequence of data units 3516.

Figure 35B:
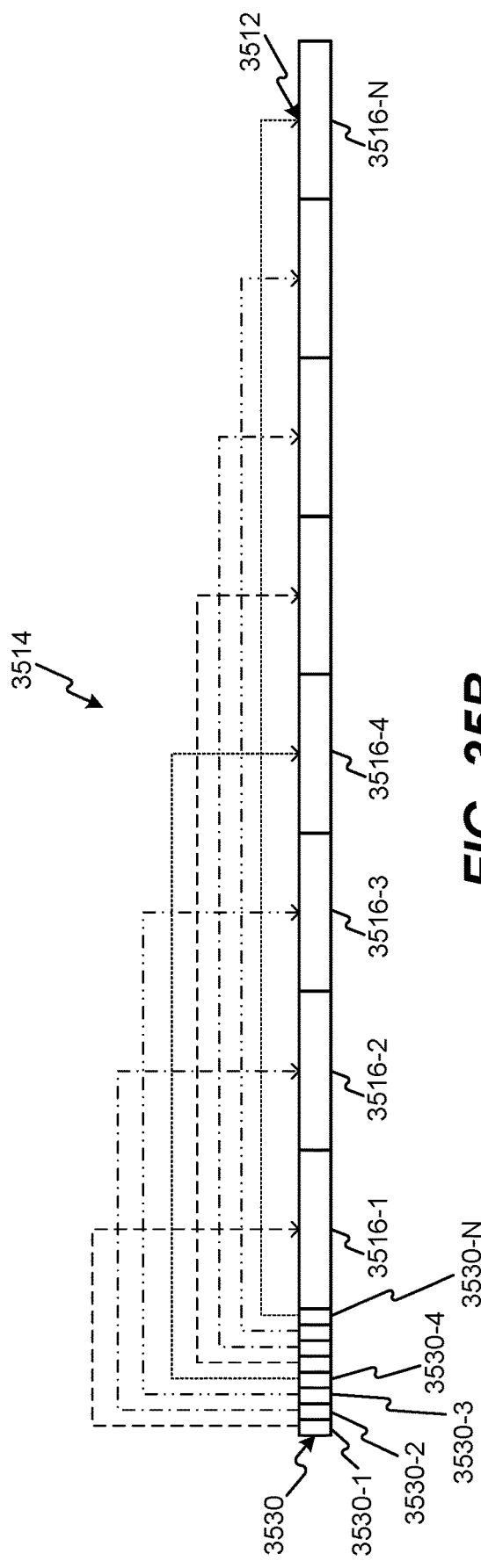
FIG. 35B illustrates an exemplary mapped data segment, consistent with the disclosed embodiments.

FIG. 35B illustrates an exemplary mapped data segment 3514, including the sequence of data units 3516 of data chunk 3512, and invalidity bitmap 3530 appended to a beginning of the sequence of data units 3516. As illustrated in FIG. 35B, the sequence of data units 3516 includes, for example, data units 3516-1, 3516-2, 3516-3, 3516-4, . . . , 3516-N. As also illustrated in FIG. 35B, invalidity bitmap 3530 appended to a beginning of the sequence of data units 3512 may include, for example, bits 3530-1, 3530-2, 3530-3, 3530-4, . . . , 3530-N corresponding to data units 3516-1, 3516-2, 3516-3, 3516-4, . . . , 3516-N, respectively. As illustrated in FIG. 35B, the sequence of bits 3530-1, 3530-2, 3530-3, 3530-4, . . . , 3530-N may precede the sequence of data units 3516-1, 3516-2, 3516-3, 3516-4, . . . , 3516-N in mapped data segment 3514. Although, FIG. 35B illustrates mapped data segment 3514 as including invalidity bitmap 3530 appended to a beginning of the sequence of data units 3516, in some embodiments, the invalidity bitmap may be appended to an end of the sequence of data units. Thus, for example, in some embodiments, invalidity bitmap 3530 may follow data unit 3516-N so that the sequence of data units 3516-1, 3516-2, 3516-3, 3516-4, . . . , 3516-N may precede the sequence of bits 3530-1, 3530-2, 3530-3, 3530-4, . . . , 3530-N. In other embodiments, the bitmap may be embedded, associated, or prepended to the sequence of data unis. In still yet other embodiments, the bitmap may be stored independently of the sequence of data units.

In some embodiments, the mapped data segment may be stored in the at least one memory bank of the at least one computational memory chip. For example, data invalidity detector 3520 may be configured to store mapped data segment 3514 in at least one memory bank (e.g., 600-0, 600-1, 600-2, 600-3, etc.) Data invalidity detector 3520 may be configured to store mapped data segment 3514 in a single memory bank instead of storing portions of mapped data segment 3514 in different memory banks. As will be described below, storing mapped data segment 3514 in a single memory bank may help reduce latency. In some embodiments, the mapped data segment may be sized to be stored fully within one line of memory included within the at least one memory bank. Additionally or alternatively, in some embodiments, the mapped data segment may be sized to be stored fully within at least one cache associated with the at least one computational memory chip. By way of example, mapped data segment 3514 may have a size smaller than that of a single line of a memory bank (e.g., 600-0, 600-1, 600-2, 600-3, etc.) As discussed above, each of the one or more memory banks (e.g., 600-0, 600-1, 600-2, 600-3, etc.) may include one or more lines of memory elements. It is contemplated that in some embodiments, mapped data segment 3514 may be sized so that it may be stored in a single line of memory elements within a memory bank (e.g., 600-1). In other embodiments, mapped data segment may be sized so that it may be stored on one or more lines of memory elements of a single memory bank (e.g., 600-1). The one or more memory banks (e.g., 600-0, 600-1, 600-2, 600-3, etc.) may constitute one or more caches associated with MPM 610 (e.g., computational memory chip 610). Sizing mapped data segment 3514 as described above may help reduce latency.

In some embodiments, the mapped data segment may have a size equal to or less than an integer division of a line of memory included in the at least one memory bank. Doing so may ensure that an integer number (e.g., 1, 2, 3, . . . N) number of mapped data segments 3514 may be stored in a single memory bank (e.g., 600-0, 600-1, 600-2, 600-3, etc.) FIG. 35A illustrates an integer number (e.g., 2) of mapped data segments 3514-1 and 3514-2 being stored in a single memory bank 600-2. Although only two mapped data segments 3514-1 and 3514-2 are illustrated in FIG. 35A, it is contemplated that any integer number N of mapped data segments (e.g., 3514-1, 3514-2, 3514-3, . . . 3514-N) may be stored in a single memory bank (e.g., 600-2). To do so, each of the mapped data segments (e.g., 3514-1, 3514-2, 3514-3, . . . 3514-N) may have a size that may be equal to or less than an integer division of a line of memory elements included in a memory bank (e.g., 600-2). For example, a single line of memory elements in memory bank 600-2 may be capable of storing 512 MB of data. To store an integer number (e.g., 5) of mapped data segments (e.g., 3514-1, 3514-2, 3514-3, 3514-4, and 3514-5) in one line of memory elements of memory bank 600-2, a size of each of the mapped data segments 3514-1, 3514-2, 3514-3, 3514-4, and 3514-5 would need to be less than or equal to about 102 MB, which is an integer division of a line or memory elements (e.g., 512 MB/5=102 MB with about 2 MB remaining).

Figure 35C:
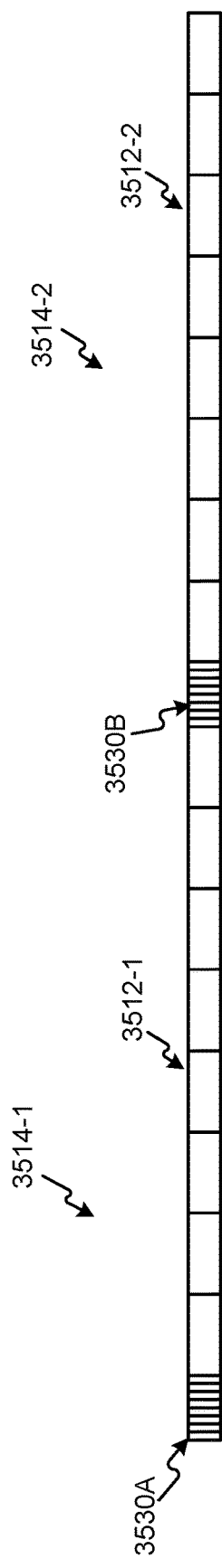
FIG. 35C illustrates an exemplary sequence of mapped data segments, consistent with the disclosed embodiments.

In some embodiments, the data invalidity detector may be configured to generate a sequence of mapped data segments to be stored together in the at least one memory bank of the at least one computational memory chip. For example, as illustrated in FIG. 35C, data invalidity detector 3520 may generate mapped data segments 3514-1, 3514-2, etc. As discussed above, each of mapped data segments 3514-1, 3514-2, etc., may include invalidity bitmap 3530 and a sequence of data units 3516. For example, as illustrated in FIG. 35C, mapped data segment 3514-1 may include invalidity bitmap 3530A appended to sequence of data units 3516 of data chunk 3512-1, and mapped data segment 3514-2 may include invalidity bitmap 3530B appended to sequence of data units 3516 of data chunk 3512-2. Furthermore, mapped data segment 3514-1 may precede mapped data segment 3514-2. It is contemplated that both mapped data segment 3514-1 and 3514-2 may be stored in a single memory bank (e.g., 600-0, 600-1, 600-2, 600-3, etc.). As discussed below, doing so may help reduce latency. Although only two mapped data segments 3514-1 and 3514-2 have been illustrated in FIG. 35C, it is contemplated that data invalidity detector 3520 may generated any number N (N is an integer) of mapped data segments 3514 (e.g., 3514-1, 3514-2, . . . , 3514-N) arranged in sequence for storage in a single memory bank (e.g., 600-0, 600-1, 600-2, 600-3, etc.).

For example, storing portions of mapped data segments 3514-1, 3514-2, etc., in different memory banks may result in lower utilization and higher latency. As one example, when using a DRAM memory bank, invalidity bitmap (e.g., 3530-1, 3530-2, etc.) may need to be updated whenever a data unit 3516 is added to or updated in data chunks 3512-1, 3512-2, etc. To update invalidity bitmap (e.g., 3530-1), it may be necessary to jump to a beginning of the data chunk 3512-1. Positioning invalidity bitmap 3530-1 at one line of the memory bank (e.g., 600-0) and positioning data chunk 3512-1 in another line of memory bank 600-0 or in another line of another memory bank (e.g., 600-2) may substantially slow the writing process. This is because jumping to the beginning of data chunk 3512-1 may require deactivating a first memory line storing data chunk 3512-1, activating a second memory line storing invalidity bitmap 3530-1, and updating the invalidity bitmap (e.g., 3530-1). Furthermore, following the update of the invalidity bitmap (e.g., 3530-1), it may be necessary to deactivate the second memory line and reactivate the first memory line. These processes, involving activation and deactivation of memory lines, may introduce latency in the process of updating the one or more mapped data segments 3514-1, 3514-2, etc. To avoid such increased latency, as discussed above, it may be beneficial to store both mapped data segments 3514-1 and 3514-2 in the same memory bank (e.g., 600-1) and more beneficially in a same line of the same memory bank (e.g., 600-1).

Figure 36:
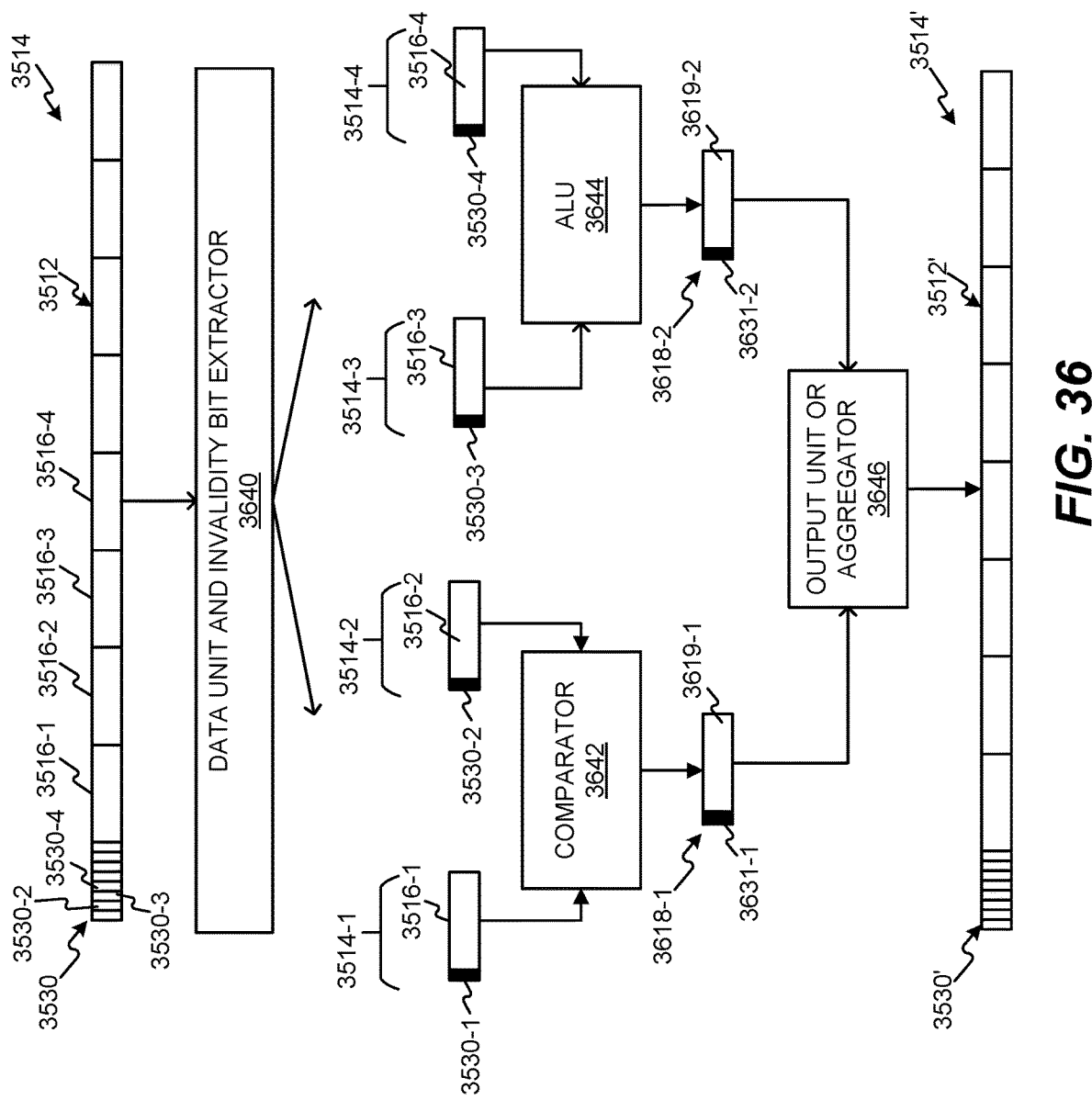
FIG. 36 schematically illustrates operations that may be performed by a processor subunit using a mapped data segment, consistent with the disclosed embodiments.

In some embodiments, at least one processor subunit may be configured to perform one or more operations relative to at least one data value included in the mapped data segment and at least one corresponding value in the invalidity bitmap. For example, a processor subunit (e.g., 612) may be configured to perform one or more operations using both the data in a data unit 3516 and its associated validity indicator in invalidity bitmap 3530. FIG. 36 schematically illustrates operations that may be performed by processor subunit 612. As illustrated in FIG. 36, data unit and invalidity bit extractor 3640 may receive mapped segment 3514. Data unit and invalidity bit extractor 3640 may extract mapped segment portions 3514-1, 3514-2, 3514-3, 3514-4, etc. As illustrated in FIG. 36, each mapped segment portion 3514-1, 3514-2, 3514-3, 3514-4, etc., may include a corresponding data unit and an invalidity bit. For example, mapped data segment portion 3514-1 may include data unit 3516-1 and invalidity bit 3530-1; mapped data segment portion 3514-2 may include data unit 3516-2 and invalidity bit 3530-2; mapped data segment portion 3514-3 may include data unit 60-3 and invalidity bit 3530-3; and mapped data segment portion 3514-4 may include data unit 60-4 invalidity bit 3530-4. As also illustrated in FIG. 36, processor subunit (e.g., 612) may include, for example, comparator 3642 and ALU 3644. Processor subunit (e.g., 612) may perform one or more operations using, for example, mapped segment portions 3514-1, 3514-2, 3514-3, 3514-4.

In some embodiments, the one or more operations may include a comparison operation. For example, as illustrated in FIG. 36, two pairs of data units and associated invalidity bits (e.g., 3514-1 and 3514-2) may be provided to an invalidity value compatible comparator 3642 that may be configured to output a comparison result 3618-1. Comparison result 3618-1 may include comparison result data 3619-1 and its associated invalidity bit 3631-1. The invalidity value compatible comparator 3642 may be a comparator configured to perform comparison operations while considering the validity of the data units 3516. Optionally, the invalidity value compatible comparator 3642 may compare multiple data unit pairs simultaneously.

By way of an example, invalidity value compatible comparator 3642 may implement a truth table as illustrated in Table 1 below. In Table 1, various operations are identified in the "Operation" column. The first value, a null flag associated with the first value, the second value, and a null flag associated with the second value are identified in the second through fifth columns of Table 1, respectively. The null flags associated with the first and second values indicate whether or not the first and second values, respectively, are valid. A result of the comparison operation is identified in the "Value" column under "Comparison Result," and a null flag associated with the comparison result is identified in the Null Flag column associated with "Comparison Result." The null flag associated with the comparison result indicates whether the comparison result itself is valid or invalid.

TABLE 1

| Operation | First Value | | Second Value | | Comparison Result | |
| --- | --- | --- | --- | --- | --- | --- |
| | Value | Null Flag | Value | Null Flag | Value | Null Flag |
| == | A | 0 | B | 0 | A == B | 0 |
| | A | 1 | B | 0 | 0 | 1 |
| | A | 0 | B | 1 | 0 | 1 |
| | A | 1 | B | 1 | 0 | 1 |
| != | A | 0 | B | 0 | A != B | 0 |
| | A | 1 | B | 0 | 0 | 1 |
| | A | 0 | B | 1 | 0 | 1 |
| | A | 1 | B | 1 | 0 | 1 |
| < | A | 0 | B | 0 | A < B | 0 |
| | A | 1 | B | 0 | 0 | 1 |
| | A | 0 | B | 1 | 0 | 1 |
| | A | 1 | B | 1 | 0 | 1 |
| > | A | 0 | B | 0 | A > B | 0 |
| | A | 1 | B | 0 | 0 | 1 |
| | A | 0 | B | 1 | 0 | 1 |
| | A | 1 | B | 1 | 0 | 1 |
| <= | A | 0 | B | 0 | A <= B | 0 |
| | A | 1 | B | 0 | 0 | 1 |
| | A | 0 | B | 1 | 0 | 1 |
| <= | A | 0 | B | 0 | A <= B | 0 |
| | A | 1 | B | 0 | 0 | 1 |
| | A | 0 | B | 1 | 0 | 1 |
| | A | 1 | B | 1 | 0 | 1 |
| IS NULL | A | 0 | N/A (single input operation) | | 0 | 0 |
| | A | 1 | | | 1 | 0 |
| IS NOT NULL | A | 0 | N/A (single input operation) | | 1 | 0 |
| | A | 1 | | | 0 | 1 |

In some embodiments, the at least one processor subunit may be configured to perform at least one logic operation relative to data stored in its one or more dedicated memory banks. For example, as illustrated in Table 1 above, processor subunit 612 may be configured to perform one or more logic operations, such as, determining whether value A is greater than value B, determining whether value A is not equal to value B, determining whether value A is NULL, and so forth.

In some embodiments, the one or more operations may include an arithmetic operation. For example, as illustrated in FIG. 36, two pairs of data units and associated invalidity null flags associated with the first and second values indicate whether or not the first and second values, respectively, are valid. A result of the calculation operation is identified in the "Value" column under "Comparison Result," and a null flag associated with the comparison result is identified in the Null Flag column associated with "Comparison Result." The null flag associated with the calculation result indicates whether the calculation result itself is valid or invalid.

TABLE 2

| | First Value | | Second Value | | Calculation Result | |
|---|---|---|---|---|---|---|
| Operation | Value | Null Flag | Value | Null Flag | Value | Null Flag |
| Add | A | 0 | B | 0 | A + B | 0 |
| | A | 1 | B | 0 | Don't care | 1 |
| | A | 0 | B | 1 | Don't care | 1 |
| | A | 1 | B | 1 | Don't care | 1 |
| SubAB | A | 0 | B | 0 | A − B | 0 |
| | A | 1 | B | 0 | Don't care | 1 |
| | A | 0 | B | 1 | Don't care | 1 |
| | A | 1 | B | 1 | Don't care | 1 |
| SubBA | A | 0 | B | 0 | B − A | 0 |
| | A | 1 | B | 0 | Don't care | 1 |
| | A | 0 | B | 1 | Don't care | 1 |
| | A | 1 | B | 1 | Don't care | 1 |
| Multiply | A | 0 | B | 0 | A × B | 0 |
| | A | 1 | B | 0 | Don't care | 1 |
| | A | 0 | B | 1 | Don't care | 1 |
| | A | 1 | B | 1 | Don't care | 1 |
| Shift [p] (static configuration) (right, left, Cyclic, Arithmetic, Logic) | A | 0 | N/A (single operand operation) | | A << p | 0 |
| | A | 1 | | | Don't care | 1 |
| Cast (static Configuration) | A | 0 | N/A (single operand operation) | | Type (A) | 0 |
| | A | 1 | | | Don't care | 1 |
| Min | A | 0 | B | 0 | A >= B ? A:B | 0 |
| | A | 1 | B | 0 | B | 0 |
| | A | 0 | B | 1 | A | 0 |
| | A | 1 | B | 1 | Don't care | 1 |
| Max | A | 0 | B | 0 | A <= B ? A:B | 0 |
| | A | 1 | B | 0 | B | 0 |
| | A | 0 | B | 1 | A | 0 |
| | A | 1 | B | 1 | Don't care | 1 |
| And | A | 0 | B | 0 | A&B | 0 |
| | A | 1 | B | 0 | Don't care | 1 |
| | A | 0 | B | 1 | Don't care | 1 |
| | A | 1 | B | 1 | Don't care | 1 |
| Or | A | 0 | B | 0 | A\|B | 0 |
| | A | 1 | B | 0 | Don't care | 1 |
| | A | 0 | B | 1 | Don't care | 1 |
| | A | 1 | B | 1 | Don't care | 1 |
| XOR | A | 0 | B | 0 | A^B | 0 |
| | A | 1 | B | 0 | Don't care | 1 |
| | A | 0 | B | 1 | Don't care | 1 |
| | A | 1 | B | 1 | Don't care | 1 | bits (e.g., 3514-3 and 3514-4) may be provided to an invalidity value compatible arithmetic logic unit (ALU) 3644 that may output a calculation result 3618-2. Calculation result 3618-2 may include calculation result data 3619-2 and its associated invalidity bit 3631-2. The invalidity value compatible ALU 3644 may be configured to perform arithmetic and/or logic operations while considering the validity of the data units.

By way of an example, the invalidity value compatible ALU 3644 may implement a truth table as illustrated in Table 2 below. In Table 2, various operations are identified in the "Operation" column. The first value, a null flag associated with the first value, the second value, and a null flag associated with the second value are identified in the second through fifth columns of Table 1, respectively. The In some embodiments, the at least one processor subunit may be configured to perform at least one arithmetic operation relative to data stored in its one or more dedicated memory banks. For example, as illustrated in Table 2 above, processor subunit 612 may be configured to perform one or more arithmetic operations, such as, add values A and B, subtract (e.g. subtract value A from value B or vice-versa), multiply values A and B, and so forth. In some embodiments, the at least one processor subunit may be further configured to store a result of the at least one arithmetic operation in its one or more dedicated memory banks. For example, processor subunit 612 may be configured to store the calculation result of one or more arithmetic operations (e.g., add, multiply, etc.) in one or more of memory banks, for example, 600-0, 600-1, 600-2, etc. It is contemplated that in some embodiments, the at least one processor subunit may be associated with one or more dedicated memory banks from among the plurality of memory banks. For example, a first processor subunit 612 may be associated with a dedicated memory bank 600-0 from among the memory banks 600-0, 600-1, 600-2, etc. First processor subunit 612 may be configured to read data from and/or write data to its dedicated memory bank 600-0. As another example, a second processor subunit 612 may be associated with a dedicated memory bank 600-2 from among the memory banks 600-0, 600-1, 600-2, etc. Second processor subunit 612 may be configured to read data from and/or write data to its dedicated memory bank 600-2. It is contemplated that, when first processor unit 612, for example, performs a calculation, first processor unit 612 may be configured to store the calculation result in its dedicated memory bank 600-0. It is also contemplated that each processor subunit 612 may be associated with more than one dedicated memory bank. Thus, for example, processor subunit 612 may be associated with two dedicated memory banks 600-3 and 600-4.

In some embodiments, the one or more operations may include an aggregation operation. Processor subunit (e.g., 612) may include an aggregator that may be configured to aggregate one or more of comparison result 3618-1 and/or calculation result 3618-2. For example, as illustrated in FIG. 36, processor subunit (e.g., 612) may include output unit or aggregator 3646 that may receive comparison result 3618-1 and/or calculation result 3618-2. Output unit or aggregator 3646 may produce an aggregation result and may generate an updated mapped data segment 3514' that may include an updated data chunk 3512' and an updated invalidity bitmap 3530'.

In some embodiments, processor subunit (e.g., 612) may also be configured to handle the required output in case of aggregation on an empty table, that is when there are no results 3618-1 or 3618-2 provided to output unit or aggregator 3646. Table 3 illustrates some of the results when no first or second value is provided to output unit or aggregator 3646.

TABLE 3

| Operation | Aggregator Result | Null Flag |
|---|---|---|
| Count | NULLs are counted like other values. Need to support COUNT (is null) and COUNT (is not null). | Return 0 |
| Sum | NULLs are skipped | Return NULL |
| Average | NULLs are skipped; | Return NULL |
| Min | NULLs are skipped | Return NULL |
| Max | NULLs are skipped | Return NULL |

In some embodiments, the at least one processor subunit may be configured to update the mapped data segment and at least one corresponding value in the invalidity bitmap after performing the at least one logic operation. For example, as discussed above, processor subunit 612 may be configured to perform one or more logic operations as illustrated in Table 1. After performing the logic operations, processor subunit 612 may be configured to provide a comparison result of the logic operation and its associated invalidity flag to output unit or aggregator 3646. When output unit 3646 receives a single value and its associated invalidity flag, output unit 3646 may generate an updated mapped data segment 3514' that may include an updated data chunk 3512', including the comparison result (e.g., 3619-1) of the logic operation, and an updated invalidity bitmap 3530', including and associated invalidity flag (e.g., 3631-1). For example, output unit 3646 may add the comparison result as a data unit 3619-1 to data chunk 3512' and may also add the invalidity flag 3631-1 associated with the comparison result to invalidity bitmap 3530'.

The invalidity bitmap may be sent from a processor subunit (e.g., 612) to a controller of the MPU in any manner (e.g., in-band or out-of-band). Some lines of the memory banks (e.g., 600-0, 600-1, 600-2, etc.) may store data chunks 3512 while other columns may store data units 3516 that may not be associated with invalidity bitmaps 3530. The lines may be marked or otherwise associated with metadata indicative of the type of data (data chunks or not) stored in each line. Moreover, instead of marking single lines, the marking may be per each sequence of consecutive memory lines.

Figure 37:
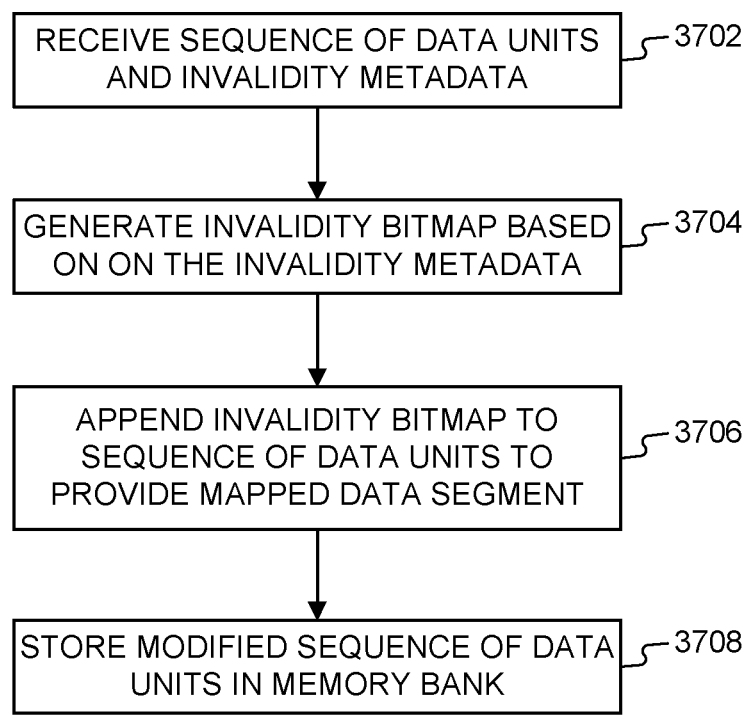
FIG. 37 is a flowchart showing an exemplary method for storing a sequence of data units in one or more of a plurality of memory banks, consistent with the disclosed embodiments.

FIG. 37 is a flowchart showing an exemplary process 3700 for storing a sequence of data units in one or more of a plurality of memory banks. Process 3700 may be performed by data invalidity detector 3520, which may be implemented by one or more processor subunits 612. It is also contemplated that in some embodiments, data invalidity detector 3520 may be implemented by one or more of IMPUs 628, DDR controllers 608, and/or master controllers 622.

In step 3702, process 3700 may include receiving, using a data invalidity detector, the sequence of data units and invalidity metadata relating to the sequence of data units. For example, data invalidity detector 3520 may receive a sequence of data units 3516 of data chunk 3512. Data invalidity detector 3520 may additionally receive invalidity metadata 3522, for example, from a database associated with host system 710 and/or from a data table. The database or data table may store the sequence of data units (e.g., 3516-1, 3516-2, etc.) in association with their respective invalidity indicators or flags. As discussed above, data units 3516 may be stored in one column and their associated invalidity indicators or flags may be stored in a different column in the database or data table.

In step 3704, process 3700 may include generating, using the data invalidity detector, an invalidity bitmap associated with the sequence of data units based on the received invalidity metadata. For example, data invalidity detector 3520 may be configured to generate a bitmap sequence 3530. Each value (e.g., 3530-1, 3530-2, etc.) in bitmap sequence 3530 may indicate whether a corresponding data unit 3516-1, 3516-2, etc., is valid or invalid. For example, values 3530-1, 3530-2, etc., may take a null value when corresponding data units 3516-1, 3516-2, respectively, are invalid.

In step 3706, process 3700 may include modifying the sequence of data units by appending the invalidity bitmap to the sequence of data units to provide a mapped data segment. For example, data invalidity detector 3520 may be configured to append invalidity bitmap 3530 to a corresponding data chunk 3512. Data invalidity detector 3520 may be configured to append invalidity bitmap 3530 to data chunk 3512 to provide mapped data segment 3514. Data invalidity detector 3520 may be configured to append invalidity bitmap 3530 to a beginning of the sequence of data units 3516 in data chunk 3512. Thus, for example, mapped data segment 3514 (see FIG. 35A) may include invalidity bitmap 3530 preceding the sequence of data units 3516. Although, FIG. 35B illustrates mapped data segment 3514', including invalidity bitmap 3530 appended to a beginning of the sequence of data units 3516, it is contemplated that in some embodiments, the invalidity bitmap may be appended to an end of the sequence of data units. Thus, for example, in some embodiments, invalidity bitmap 3530 may follow data unit 3516-N so that the sequence of data units 3516-1, 3516-2, 3516-3, 3516-4, . . . , 3516-N may precede the sequence of bits 3530-1, 3530-2, 3530-3, 3530-4, . . . , 3530-N.

In step 3708, process 3700 may include storing the modified sequence of data units in the one or more memory banks of at least one computational memory chip. For example, data invalidity detector 3520 may be configured to store mapped data segment 3514 in at least one memory bank (e.g., 600-0, 600-1, 600-2, 600-3, etc.) Mapped data segment 3514 may be stored in a single memory bank instead of storing portions of mapped data segment 3514 in different memory banks. As described above, storing mapped data segment 3514 in a single memory bank may help reduce latency.

Disclosed embodiments may include the following:

A computational memory system comprising: a master controller configured to receive a configuration function from a host CPU and convert the received configuration function into one or more lower level configuration functions; and at least one computational memory chip, wherein the at least one computational memory chip includes a plurality of processor subunits and a plurality of memory banks formed on a common substrate; wherein the master controller is adapted to configure the at least one computational memory chip using the one or more lower level configuration functions.

wherein configuring the at least one computational memory chip includes preparing one or more of the plurality of processor subunits to perform a function associated with the one or more lower level configuration functions.

wherein the master controller is adapted to configure a first processor subunit of the at least one computational memory chip according to a first lower level configuration function that is different from a second lower level configuration used to configure a second processor subunit of the at least one computational memory chip.

wherein the master controller is adapted to communicate with one or more slave controllers to configure the at least one computational memory chip.

wherein the master controller is adapted to communicate with at least one DDR controller to configure the at least one computational memory chip.

wherein the at least one DDR controller is configured to communicate with one or more slave controllers included on the at least one computational memory chip.

wherein the master controller includes one or more accelerators that convert the received configuration function into the one or more lower level configuration functions.

wherein each of the one or more accelerators includes at least one microprocessor.

wherein the one or more accelerators are configured to operate in parallel.

wherein the at least one computational memory chip is included on at least one DIMM.

wherein the at least one DIMM is included on an intense memory processing unit (IMPU).

wherein each of the plurality of processor subunits is associated with one or more dedicated memory banks.

wherein the configuration function from the host CPU is associated with an application running on the host CPU.

wherein the received configuration function is a conditional function.

wherein the conditional function is stored in a conditional function queue.

wherein the master controller includes a configuration logic configured to fetch the conditional function from the conditional function queue after completion of a process upon which the conditional function depends.

wherein the master controller includes a configuration logic configured to fetch the conditional function from the conditional function queue after detection of a predetermined system event.

wherein the master controller includes a configuration logic configured to fetch the conditional function from the conditional function queue after completion of a task upon which the conditional function depends.

wherein the received configuration function is a non-conditional function.

wherein the non-conditional function is stored in a non-conditional function queue.

wherein the at least one computational memory chip includes at least a first computational memory chip and a second computational memory chip, and wherein the master controller is adapted to configure the second computational memory chip according to a second lower level configuration function while the first computational memory chip performs a function associated with a first lower level configuration function.

wherein the one or more lower level configuration functions are stored in a configuration information table (CIT).

wherein the master controller includes a configuration logic configured to calculate one or more addresses of the CIT based on the configuration function received from a host CPU.

wherein the configuration logic is configured to retrieve the lower level configuration functions using the calculated one or more addresses of the CIT.

wherein the CIT also stores one or more of a computational memory chip identifier, a function operand, a condition for a next configuration execution, or a parameter override.

wherein the host CPU is configured to update information stored in the CIT.

wherein the master controller includes a configuration logic further including a parameter override logic.

wherein the master controller includes a configuration logic configured to manage a states data structure.

wherein the configuration function is received from the host CPU during an initialization process.

A computational memory system comprising: a controller configured to receive a configuration function from a host CPU; and a plurality of computational memory modules, wherein each of the plurality of computational memory modules includes a processor subunit and one or more memory banks formed on a common substrate; wherein the controller is adapted to multicast the configuration function to two or more respective processor subunits of the plurality of computational memory modules.

wherein the controller is located onboard a computational memory chip together with the plurality of computational memory modules.

wherein the controller is located external to a computational memory chip that includes the plurality of computational memory modules.

wherein the controller includes a field programmable gate array.

wherein the controller includes a DDR controller.

further including at least one configuration processor adapted to configure at least a first processor subunit among the plurality of computational memory modules based on an output generated by at least a second processor subunit among the plurality of computational memory modules.

wherein the at least one configuration processor is located onboard a computational memory chip that includes the plurality of computational memory modules.

wherein the at least one configuration processor is located external to a computational memory chip that includes the plurality of computational memory modules.

wherein the controller is adapted to convert the configuration function into at least one lower level configuration function and multicast the at least one lower level configuration function to two or more respective processor subunits of the plurality of computational memory modules.

A computational memory system, comprising: at least one computational memory chip including one or more processor subunits and one or more memory banks formed on a common substrate; wherein the at least one computational memory chip is configured to store one or more portions of an embedding table in the one or more memory banks, the embedding table including one or more feature vectors; and wherein the one or more processor subunits are configured to receive a sparse vector indicator from a host external to the at least one computational memory chip and, based on the received sparse vector indicator and the one or more portions of the embedding table, generate one or more vector sums.

wherein the sparse vector indicator includes a sparse vector including one or more zero values and one or more non-zero values.

wherein the sparse vector indicator includes a set of indices corresponding to non-zero values in an associated sparse vector.

wherein the computational memory system further includes one or more controllers configured to acquire the one or more generated vector sums and provide the acquired one or more generated vector sums to the host external to the computational memory chip.

wherein each processor subunit among the one or more processor subunits is associated with one or more dedicated memory banks from among the one or more memory banks.

wherein the host external to the computational memory chip includes a CPU.

wherein the host external to the computational memory chip includes a GPU.

wherein a sparse vector associated with the sparse vector indicator has a dimensionality higher than any of the one or more vector sums.

wherein the at least one computational memory chip includes two or more memory banks and wherein the embedding table is stored across the two or more memory banks.

wherein the one or more vector sums constitute sums of full feature vectors included in the embedding table.

wherein the full feature vectors summed together are identified in the embedding table based on the sparse vector indicator.

wherein the one or more vector sums constitute sums of partial feature vectors included in the embedding table.

wherein the one or more vector sums include a plurality of intermediate summations, wherein each of the plurality of intermediate summations represents a summation of a subset of feature vectors in the embedding table implicated by the sparse vector indicator.

wherein the one or more vector sums include a plurality of intermediate summations, wherein each of the plurality of intermediate summations represents a summation of partial feature vectors in the embedding table implicated by the sparse vector indicator.

wherein the one or more vector sums are represented by output from a single processor subunit among the one or more processor subunits.

wherein the one or more vector sums are represented by output from two or more processor subunits among the one or more processor subunits.

wherein the at least one computational memory chip constitutes a plurality of computational memory chips, and wherein the one or more vector sums are represented by output from two or more processor subunits included on different computational memory chips among the plurality of computational memory chips.

wherein the one or more processor subunits and the one or more memory banks of the at least one computational memory chip are arranged into a plurality of computational memory groups, wherein each computational memory group includes at least one processor subunit and one or more of the memory banks dedicated to the at least one processor subunit.

wherein each of the computational memory groups is configured to store a different sub-portion of the one or more portions of the embedding table.

wherein the sub-portion represents at least one complete feature vector from the embedding table.

wherein the sub-portion represents at least one partial feature vector from the embedding table.

wherein a first computational memory group is configured to store a first segment of a first feature vector and a first segment of a second feature vector.

wherein the first computational memory group is configured to store a first segment of a third feature vector and a first segment of a fourth feature vector.

wherein a second computational memory group different from the first computational memory group is configured to store a second segment of the first feature vector and a second segment of a second feature vector.

wherein the first segment of the first feature vector and the first segment of the second feature vector have a common dimensionality.

wherein the common dimensionality is commensurate with a number of at least one accumulator associated with the at least one computational memory chip.

wherein the one or more vector sums are quantized within the at least one computational memory chip.

wherein the quantized vector sums are provided as an output to the host external to the computational memory chip.

wherein the host external to the computational memory chip is configured to combine the quantized vector sums.

A data processing unit, comprising: a data analysis unit configured to acquire a plurality of data elements from a memory, evaluate each of the plurality of data elements relative to at least one criteria, and generate an output that includes a plurality of validity indicators identifying a first plurality of data elements among the plurality of data elements that validly satisfy the at least one criteria and identifying a second plurality of data elements among the plurality of data elements that do not validly satisfy the criteria; and a data packer configured to generate, based on the output of the data analysis unit, a packed data output including the first plurality of data elements and omitting the second plurality of data elements.

wherein the plurality of validity indicators further identify which of the plurality of data elements do not validly satisfy the at least one criteria.

wherein the data analysis unit includes a vector processor.

wherein the data packer output further includes validity metadata.

wherein the validity metadata includes one or more identifiers associated with the first plurality of data elements.

wherein the validity metadata includes one or more identifiers associated with the second plurality of data elements.

wherein the validity metadata includes one or more identifiers associated with the first plurality of data elements and also includes one or more identifiers associated with the second plurality of data elements.

wherein the validity metadata includes a validity bitmap including Boolean values associated with each of the plurality of data elements.

wherein the validity metadata includes the plurality of validity indicators included in the output of the data analysis unit.

wherein the data packer output is transmitted to one or more destination chips external to a chip on which the data packer resides.

wherein the destination chip includes a memory chip.

wherein the destination chip includes a computational memory chip.

wherein the computational memory chip includes at least one processor subunit and one or more corresponding, dedicated memory banks formed on a common substrate.

further including a controller configured to communicate one or more commands to the data analysis unit.

wherein the one or more commands include a filter command, and wherein the at least one criteria is associated with the filter command.

wherein the at least one criteria includes one or more reference values to be compared to data values included in the plurality of data elements.

wherein the one or more reference values are numerical values.

wherein the one or more reference values are string values.

wherein the memory is configured to store a database including a plurality of values arranged over a plurality of rows and a plurality of columns.

wherein column values are stored sequentially in the memory.

wherein the plurality of data elements include a plurality of row values from a single column of the database.

wherein the data analysis unit is configured to evaluate the plurality of data elements in parallel.

wherein the evaluation performed by the data analysis unit results from a query relative to a database stored in the memory, and wherein the evaluation includes a filter function.

wherein the evaluation of the plurality of data elements includes at least one of a scan, filter, join, aggregate, or sort operation.

wherein the data analysis unit includes a single instruction, multiple data (SIMD) configured processor.

wherein an SIMD command for the data analysis unit is received from a controller configured to communicate with the data analysis unit.

wherein the plurality of validity indicators included in the output of the data analysis unit are included in a bit mask.

wherein the bit mask specifies which of the plurality of data elements satisfy the at least one criteria and which of the plurality of data elements do not satisfy the at least one criteria.

wherein the plurality of validity indicators identify row values in a column of data of a database that satisfy the at least one criteria.

wherein the plurality of validity indicators identify row values in a column of data of a database that satisfy the at least one criteria and further identify row values in a column of data of a database that do not satisfy the at least one criteria.

wherein the plurality of indicators include single bit values.

wherein the data analysis unit is further configured to execute one or more of logic, algebraic, or string operations relative to the plurality of data elements.

wherein the data analysis unit includes one or more field programmable gate arrays.

wherein the data analysis unit includes one or more ASICs.

wherein the data packer uses the plurality of validity indicators included in the output of the data analysis unit to identify the first plurality of data elements to include in the output of the data packer.

wherein the data packer comprises one or more hardware-based accelerators.

wherein the data packer is configured to accumulate one or more data segments of a predetermined size before including the accumulated one or more data segments in the output of the data packer.

wherein the predetermined size is 1 bit, 8 bits, 16 bits, 32 bits, or 64 bits.

wherein the output generated by the data packer is provided to a FIFO external to a chip on which the data packer resides.

wherein the data packer is configured to use a packing mask included in a predicate register to accumulate one or more data segments of a predetermined size before including the accumulated one or more data segments in the output of the data packer.

wherein the predetermined size is associated with a size of the predicate register.

further including the memory.

wherein the data packer output further includes validity metadata, and wherein the validity metadata includes at least one source identifier associated with a source location for the first plurality of data elements and where the validity metadata also includes one or more identifiers associated with the first plurality of data elements.

A processor-to-processor data transfer system, comprising: a first processor programmed to: load data from a memory using a memory mapped interface; generate a data packet for transferring processed data via a non-memory mapped stream interface; and send the generated data packet, including the processed data, to a second processor.

wherein the first processor is located on a first chip different from a second chip on which the second processor is located.

wherein the first processor and the second processor are located on a common substrate.

wherein the memory is a shared memory.

wherein the memory is a random access memory.

wherein the first processor includes a first processor subunit disposed on a first computational memory chip together with a first group of one or more memory banks dedicated to the first processor.

wherein the second processor includes a second processor subunit disposed on a second computational memory chip different from the first computational memory chip, and wherein the second computational memory chip includes a second group of one or more memory banks dedicated to the second processor subunit.

wherein the second processor includes a second processor subunit disposed on the first computational memory chip together with the first processor subunit, and wherein the first computational memory chip includes a second group of one or more memory banks dedicated to the second processor subunit.

A computational memory chip, comprising: a plurality of processor subunits and a plurality of memory banks formed on a common substrate, and wherein each processor subunit among the plurality of processor subunits is associated with one or more dedicated memory banks from among the plurality of memory banks; at least one originating processor subunit among the plurality of processor subunits; at least one consumer processor subunit among the plurality of processor subunits; and a stream interface, wherein the stream interface is configured to transfer to the at least one consumer processor subunit data generated by the at least one originating processor subunit.

wherein each of the plurality of processor subunits is associated with a unique destination identifier.

wherein each of the plurality of processor subunits is configured to perform logic or arithmetic operations relative to data stored in its one or more dedicated memory banks.

wherein the stream interface is configured to transfer the data generated by the at least one originating processor subunit without the use of a memory mapped interface and a shared memory.

wherein the transfer of the data generated by the at least one originating processor subunit occurs in response to an execution of a write command by the at least one originating processor subunit.

further including at least one destination asset, wherein the stream interface is configured to transfer to the at least one destination asset data generated by the at least one originating processor subunit.

wherein the at least one destination asset includes a memory bank dedicated to a processor subunit other than the originating processor subunit.

wherein the stream interface is configured to transfer to a remote destination asset, remotely located relative to the computational memory chip, data generated by the at least one originating processor subunit.

wherein the remote destination asset includes at least one processor subunit disposed on a different computational memory chip.

wherein the remote destination asset includes at least one memory bank disposed on a different computational memory chip.

wherein the remote destination asset includes a host CPU.

wherein the transfer of the data to the remote destination asset occurs via at least one direct memory access (DMA) module.

wherein the stream interface includes a stream crossbar router.

wherein the stream crossbar router includes a routing matrix.

wherein the stream crossbar router is configured to enable independent, simultaneous communication between two or more pairs of processor subunits among the plurality of processor subunits.

wherein the stream interface is AXI stream protocol compliant.

further including at least one output FIFO buffer.

wherein the stream interface is configured to transfer the data generated by the at least one originating processor subunit to the at least one output FIFO buffer along with an identifier associated with the at least one consumer processor subunit.

wherein the stream interface is configured to transfer the data generated by the at least one originating processor subunit to the at least one output FIFO buffer along with an identifier associated with at least one destination asset onboard the computational memory chip.

wherein the at least one destination asset includes a memory bank associated with a processor subunit different from the at least one originating processor subunit.

wherein each of the plurality of processor subunits is allocated at least one output FIFO buffer.

wherein each of the plurality of processor subunits is allocated two or more output FIFO buffers.

further including at least one input FIFO buffer.

wherein the at least one input FIFO buffer is allocated to the at least one consumer processor subunit.

wherein the at least one input FIFO buffer is configured to store the data generated by the at least one originating processor subunit and transferred by the stream interface until the at least one consumer processor subunit is ready to operate on the data.

wherein each of the plurality of processor subunits is allocated at least one input FIFO buffer.

wherein each of the plurality of processor subunits is allocated two or more input FIFO buffers.

further including a plurality of input FIFO buffers grouped into a plurality of input FIFO subsets including one or more input FIFO buffers from among the plurality of input FIFO buffers, and wherein each of the plurality of input FIFO subsets is coupled to a different port of the stream interface.

further including a plurality of output FIFO buffers grouped into a plurality of output FIFO subsets including one or more output FIFO buffers from among the plurality of output FIFO buffers, and wherein each of the plurality of output FIFO subsets is coupled to a different port of the stream interface.

wherein the stream interface includes a point-to-point communication conduit.

wherein the stream interface includes a communication conduit other than a memory bus.

wherein the stream interface includes a communication conduit passing through one or more switches or routers.

A computational memory system comprising: at least one computational memory chip including at least one processor subunit and at least one memory bank formed on a common substrate; and a data invalidity detector configured to receive a sequence of data units and invalidity metadata relating to the sequence of data units, and wherein the data invalidity detector is further configured to generate an invalidity bitmap associated with the sequence of data units based on the received invalidity metadata, and append the invalidity bitmap to the sequence of data units to provide a mapped data segment to be stored in the at least one memory bank of the at least one computational memory chip.

wherein the data invalidity detector resides on the at least one computational memory chip.

wherein the data invalidity detector is implemented by the at least one processor subunit on the at least one computational memory chip.

wherein the data invalidity detector is implemented by at least one supporting microprocessor disposed on the at least one computational memory chip.

wherein the data invalidity detector is implemented by at least one supporting microprocessor located outside of the at least one computational memory chip.

wherein the data invalidity detector is implemented by a host CPU outside of the at least one computational memory chip.

wherein the invalidity bitmap indicates which of the sequence of data units includes a null value.

wherein a number of values included in the invalidity bitmap equals a number of data units included in the sequence of data units.

wherein the invalidity bitmap includes a series of values equal to either zero or one to indicate which of the sequence of data units includes a null value.

wherein a number of bits included in the invalidity bitmap equals a number of data units in the sequence of data units.

wherein the invalidity bitmap is appended to a beginning of the sequence of data units.

wherein the invalidity bitmap is appended to an end of the sequence of data units.

wherein the invalidity bitmap is associated with the sequence of data units.

wherein the mapped data segment is sized to be stored fully within one line of memory included within the at least one memory bank.

wherein the mapped data segment has a size equal to or less than an integer division of a line of memory included in the at least one memory bank.

wherein the mapped data segment is sized to be stored fully within at least one cache associated with the at least one computational memory chip.

wherein the data invalidity detector is configured to generate a sequence of mapped data segments to be stored together in the at least one memory bank of the at least one computational memory chip.

wherein at least one processor subunit is configured to perform one or more operations relative to at least one data value included in the mapped data segment and at least one corresponding value in the invalidity bitmap.

wherein the one or more operations include a comparison operation.

wherein the one or more operations include an arithmetic operation.

wherein the one or more operations include an aggregation operation.

wherein the at least one processor subunit is associated with one or more dedicated memory banks from among the plurality of memory banks.

wherein the at least one processor subunit is configured to perform at least one arithmetic operation relative to data stored in its one or more dedicated memory banks.

wherein the at least one processor subunit is further configured to store a result of the at least one arithmetic operation in its one or more dedicated memory banks.

wherein the at least one processor subunit is configured to perform at least one logic operation relative to data stored in its one or more dedicated memory banks.

wherein the at least one processor subunit is configured to update the mapped data segment and at least one corresponding value in the invalidity bitmap after performing the at least one logic operation.

A method of storing a sequence of data units in one or more of a plurality of memory banks, the method comprising: receiving, using a data invalidity detector, the sequence of data units and invalidity metadata relating to the sequence of data units; generating, using the data invalidity detector, an invalidity bitmap associated with the sequence of data units based on the received invalidity metadata; modifying the sequence of data units by appending the invalidity bitmap to the sequence of data units to provide a mapped data segment; and storing the modified sequence of data units in the one or more memory banks of at least one computational memory chip.

A non-transitory computer readable medium storing instructions executable by at least one processor to cause the at least one processor to perform a method, the method comprising: receiving a sequence of data units and invalidity metadata relating to the sequence of data units; generating an invalidity bitmap associated with the sequence of data units based on the received invalidity metadata; and appending the invalidity bitmap to the sequence of data units to provide a mapped data segment to be stored in at least one memory bank of at least one computational memory chip.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An information transfer system comprising:
a master controller configured to issue a command in the form of a memory protocol data packet, wherein the master controller is configured to generate routing information indicating whether the memory protocol data packet is to be processed according to a first protocol or according to a second protocol different from the first protocol, wherein the first protocol includes a physical layer protocol, and wherein the second protocol includes a data link layer protocol; and
a slave controller configured to receive the memory protocol data packet from the master controller,
wherein the slave controller is configured to selectively cause the memory protocol data packet to be processed according to the first protocol or according to the second protocol based on the routing information.

2. The system of claim 1, wherein the first protocol is a DDR4 protocol.

3. The system of claim 1, wherein the slave controller further includes a memory protocol controller configured to process the memory protocol data packet according to the first protocol.

4. The system of claim 3, wherein the memory protocol controller is a DDR4 controller.

5. The system of claim 1, wherein the routing information is provided out-of-band from the data packet.

6. The system of claim 1, wherein the routing information is provided in-band with the data packet.

7. The system of claim 1, wherein the memory protocol data packet includes a data field, and the master controller generates an address field associated with the memory protocol data packet.

8. The system of claim 7, wherein the slave controller is configured to cause the memory protocol data packet to be processed according to the second protocol in response to detection of at least one re-route value in the address field.

9. The system of claim 8, wherein the slave controller is configured to cause the memory protocol data packet to be processed according to the first protocol in response to detection in the address field of an address value not designated as a re-route value.

10. The system of claim 7, further comprising a memory storage operationally connected to the slave controller, wherein the first protocol includes writing data from the data field to at least one memory address, from the address field, in the memory storage.

11. The system of claim 7, further comprising a processing subunit operationally connected to the slave controller, and wherein the second protocol includes routing at least the data field to the processing unit.

12. The system of claim 7, wherein the second protocol includes:
parsing the data field to extract a frame,
parsing the frame to identify a frame header and a frame payload, and
executing a function based on the frame header.

13. The system of claim 12, further including a processing subunit operationally connected to the slave controller, wherein the function includes sending at least the frame payload to the processing subunit.

14. The system of claim 7, wherein the first protocol includes handling the data section via a first data path and the second protocol includes handling the data section via a second data path.

15. The system of claim 7, wherein the first protocol includes writing data from the memory protocol data packet to a memory storage and the second protocol includes processing data from the memory protocol data packet by a processing subunit.

16. The system of claim 1, wherein the routing information is a command to configure a memory register in the slave controller.

17. The system of claim 1, wherein the data link layer protocol is an Open Systems Interconnection (OSI) logical layer 2 protocol.

18. The system of claim 1, further comprising an additional slave controller and an additional master controller,
the additional master controller being configured for communications with the additional slave controller using the memory protocol data packet via the first protocol,
the master controller being configured for communications with the slave controller via the additional master controller and the additional slave controller using the second protocol,
wherein the second protocol is layered on top of the first protocol.

19. A computational memory system comprising:
at least one computational memory chip including one or more processor subunits and one or more memory banks formed on a common substrate,
a slave controller in operational communication with the processor subunits and memory banks, the slave controller being configured to:
receive a memory protocol data packet including a data field,
receive an address field associated with the data packet,
receive routing information indicating whether the memory protocol data packet is to be processed according to a first protocol or according to a second protocol, wherein the first protocol includes a physical layer protocol, and wherein the second protocol includes a data link layer protocol, and
based on the routing information, selectively cause the memory protocol data packet to be processed according to the first protocol or according to the second protocol.

20. The system of claim 19, further including a master controller configured to generate the memory protocol data packet, generate the address field, generate the routing information, and in operational communication with the slave controller.

* * * * *